(12) United States Patent
Suzuki

(10) Patent No.: US 6,304,279 B1
(45) Date of Patent: Oct. 16, 2001

(54) INK TRANSFER PRINTER

(75) Inventor: Minoru Suzuki, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/531,528

(22) Filed: Mar. 21, 2000

Related U.S. Application Data

(62) Division of application No. 08/873,565, filed on Jun. 12, 1997, now Pat. No. 6,165,976.

(30) Foreign Application Priority Data

| Jun. 13, 1996 | (JP) | 8-174309 |
| Nov. 20, 1996 | (JP) | 8-324673 |
| Nov. 20, 1996 | (JP) | 8-324674 |
| Nov. 20, 1996 | (JP) | 8-324675 |
| Dec. 27, 1996 | (JP) | 8-358261 |
| Dec. 27, 1996 | (JP) | 8-358262 |
| Mar. 31, 1997 | (JP) | 9-96548 |
| Apr. 9, 1997 | (JP) | 9-106750 |

(51) Int. Cl.⁷ .................. B41J 2/32; B41J 27/20
(52) U.S. Cl. ............ 347/171; 101/114; 101/116; 101/119; 101/128.4
(58) Field of Search ............. 347/171; 101/128.4, 101/114, 116, 119; 400/120.01

(56) References Cited

U.S. PATENT DOCUMENTS

| 4,608,577 | 8/1986 | Hori . |
| 4,731,621 | 3/1988 | Hayamizu et al. . |
| 4,803,499 | 2/1989 | Hayamizu . |
| 5,155,504 | 10/1992 | Oikawa . |
| 5,638,104 | 6/1997 | Suzuki et al. . |
| 5,708,468 | 1/1998 | Iwao . |
| 5,917,533 | 6/1999 | Suzuki et al. . |

FOREIGN PATENT DOCUMENTS

| 254420 | 11/1991 | (EP) . |
| 57-74176 | 5/1982 | (JP) . |
| 60-71260 | 4/1985 | (JP) . |
| 61-69461 | 4/1986 | (JP) . |
| 62-3957 | 1/1987 | (JP) . |
| 62116171 | 5/1987 | (JP) . |
| 63-1550 | 1/1988 | (JP) . |
| 63-22661 | 1/1988 | (JP) . |
| 63125344 | 5/1988 | (JP) . |
| 7-114307 | 5/1995 | (JP) . |
| 8-49960 | 2/1996 | (JP) . |
| 8-156401 | 6/1996 | (JP) . |

Primary Examiner—Huan Tran
(74) Attorney, Agent, or Firm—Greenblum & Bernstein P.L.C.

(57) ABSTRACT

An additive is dispersed in a matrix having a larger thermal expansion coefficient, which forms a film that prevents the permeation of the ink at the room temperature while allowing the permeation of the ink at high temperature. An ink roller is formed by covering a roller-like sponge body containing ink (an ink holder) with the film. Along the outer circumference of the ink roller, a thermal head that heats the surface of the ink roller according to a print pattern and a platen roller that sandwiches recording sheet between itself and the ink roller are disposed. Then, by rotating the ink roller and heating the thermal head, the ink permeates through the heated part of the film and is transferred to the recording sheet to form an ink image on the recording sheet.

19 Claims, 36 Drawing Sheets

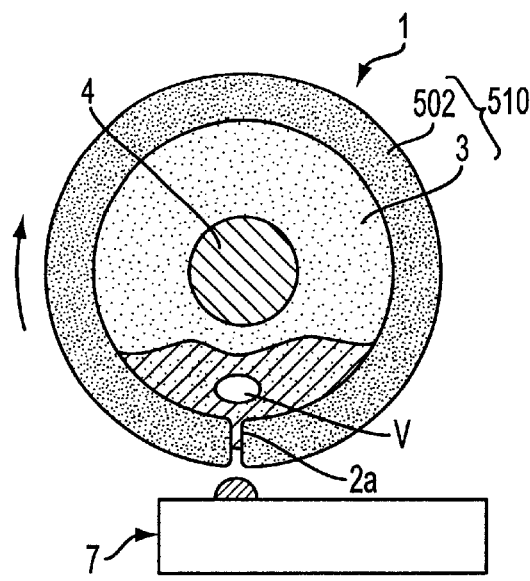
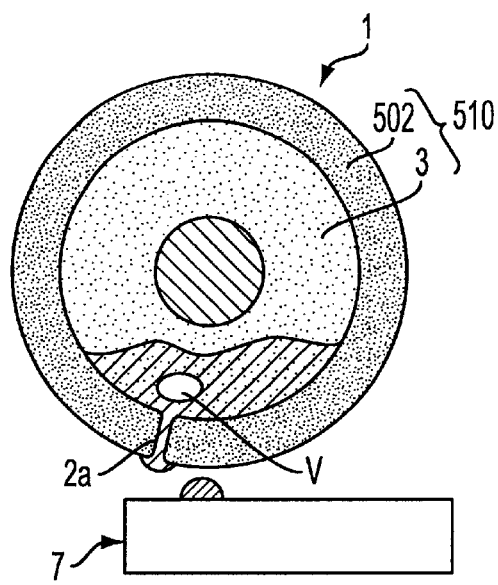
FIG. 31A    FIG. 31B
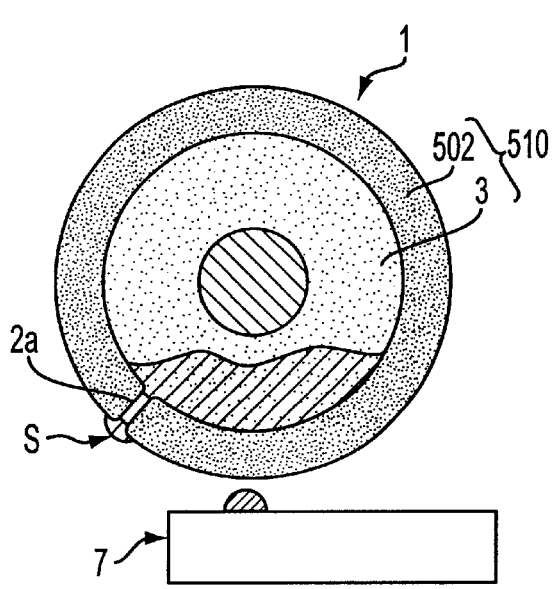
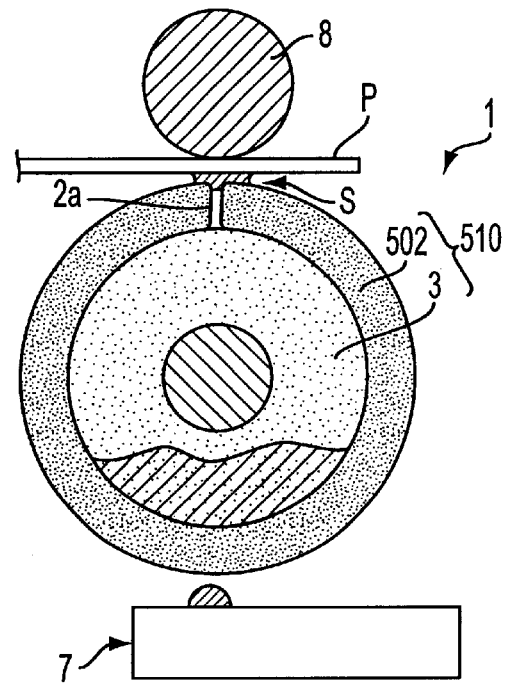
FIG. 31C    FIG. 31D

INK TRANSFER PRINTER

This application is a division of U.S. patent application No. 08/873,565, filed Jun. 12, 1997, now U.S. Pat. No. 6,165,976 the contents of which are expressly incorporated by reference in its entirety.

BACKGROUND OF THE INVENTION

The present invention relates to an ink transfer printer which transfers ink to a recording sheet such as a plain paper to form an image thereon.

As a printer which transfers ink onto a recording sheet such as a plain paper, following printers are known: an ink jet printer that jets ink onto the recording sheet from nozzles as liquid particles, a thermal transfer printer that heats an ink ribbon (which can be molten by heat) using a thermal head thereby to transfer the ink onto the recording sheet and a wire dot printer that uses a steel wire for striking ink ribbons against the recording sheet.

However, these known printers have following problems: the ink jet printer may cause a clogging of ink in the nozzle, the thermal transfer printer may increase a running cost due to the consumption of ink ribbons and the wire dot printer is inferior in processing speed. Thus, a printer wherein the ink clogging is prevented and the running cost is small and the processing speed is fast is desired.

SUMMARY OF THE INVENTION

This invention is provided in view of these problems and the object thereof is to provide a printer wherein the ink clogging is prevented, the running cost is small and the processing speed is fast.

To achieve this object, according to one aspect of the present invention, there is provided an ink transfer printer comprising a film using an ink that is a liquid at the room temperature and that allows the permeation of the ink when heated to a predetermined temperature or higher while preventing the permeation of the ink at the room temperature, an ink holder that is in contact with one surface of the film and that holds the ink, a transfer means that makes the other surface of the film contact with the recording sheet and a heating means that selectively heats the film based on print information, wherein a part of the film that is heated by the heating means allows the permeation of the ink from the ink holder so that the ink that has permeated through the film can be transferred to the recording sheet by the transfer means.

Since the use of the film that permeates the ink at elevated temperatures while preventing the permeation of the ink at the room temperature is used, the ink does not remain in the film except when required, thereby preventing a clogging of the ink in the nozzle. In addition, since the ink holder can be used until the ink contained in the ink holder has been used up, the use of the ink holder is efficient, compared with the use of ink ribbons that may be wasted despite the presence of unused parts. It reduces the number of replacement operations and reduces running costs.

The film may be formed by dispersing an additive in a matrix. The matrix has a larger thermal expansion coefficient than the additive. This provides a characteristic in which the ink is transmitted at elevated temperatures while it is not transmitted at the room temperature. In addition, the additive may be an inorganic substance and the matrix may be resin or rubber. The matrix of the film and the ink holder may be the same material so that the ink holder and the film can be integrally formed.

In addition, the ink holder may be roller-shaped and the film may cover the outer circumference of the ink holder so as to allow the ink holder and the film to constitute a roller member. In this case, the transfer means may include a platen roller faced to the roller member so that the recording sheet can be fed between through the platen roller and the roller member when the roller member is rotated. This arrangement enables the ink to be continuously transferred to the recording sheet with a simple constitution.

By setting the linear expansion coefficient of the matrix of the above film larger in the circumferential direction of the roller member than in the axial direction of the roller member, the accuracy of ink transfer in the main scanning direction can be improved when a thermal line head is used. In addition, by locating the heating means below the roller member, the ink can be used as long as it remains in the bottom of the ink holder even if the remaining amount of the ink in the ink holder is small. That is, the ink can be used efficiently.

Further, a color printer can be configured by providing a plurality of sets of the ink holder and the film, impregnating the plurality of ink holders with different color inks, using the heating means to heat the plurality of films based on print information for each color and sequentially contacting the recording sheet with the plurality of films. The plurality of sets of the ink holder and the film constitute a plurality of roller members disposed in parallel. In addition, in case the heating means is a thermal line head having a plurality of arrays of heating elements corresponding to the plurality of films, a single image forming control circuit can be used for each color to reduce costs.

According to another aspect of the present invention, there is provided an ink transfer printer using an ink roller having an ink holder that holds ink and a film that covers the ink holder and that allows the permeation of the ink when heated to a predetermined temperature or higher while preventing the permeation of the ink at the room temperature. The printer rotates the ink roller and heats the film based on print information to selectively allow the permeation of the ink so that the ink permeated through the film can be transferred to the recording sheet. The printer is further provided with an vibrating means that vibrates the ink holder in the ink roller.

Since the ink holder is vibrated, the fluidity of the ink held in the ink holder can be increased. That is, the density of the ink in the ink roller is uniformized. This can uniformize the concentration of the ink transferred to the recording sheet in order to prevent non-uniform printing. The vibrating means may include a piezoelectric element. In addition, the piezoelectric element may be installed on the outer circumference of the rotating shaft of the ink roller. This arrangement enables the ink holder to be uniformly vibrated from the interior.

In addition, if a vibration detection means is further provided for detecting the magnitude of vibration applied to the ink holder by the vibrating means and the vibrating means is controlled based on a value detected by the vibration detection means, it is possible to perform a feedback control. In this case, the printer may further include an image variable-density setting means for setting the variable density of images transferred to the recording sheet so that a control unit can control the vibrating means based on a value set by the image variable-density setting means and a value detected by the vibration detection means. With this arrangement, it is possible to obtain images with a desired variable density by controlling the vibrating means.

Furthermore, the vibration measuring means may be a piezoelectric sensor disposed so as to be in contact with the outer circumference of the ink roller. Specifically, the piezoelectric sensor may be provided on the outer circumferential surface of the roller member (for example, a platen roller that presses the recording sheet between itself and the ink roller) that is in contact with the outer circumferential surface of the ink roller.

According to further aspect of the present invention, there is provided an ink transfer printer there is provided an ink transfer printer having an ink roller with an ink holder that holds ink and a film that covers the ink holder and that allows the permeation of the ink when heated to a predetermined temperature or higher while preventing the permeation of the ink at the room temperature and with a rotation shaft that holds the ink holder. The printer rotates the ink roller and heats the film based on print information to selectively allow the permeation of the ink so that the ink permeated through the film can be transferred to the recording sheet. The printer is provided with a heating means in the ink roller for heating the ink holder.

Since the heating means heats the ink holder, the fluidity of the ink held in the ink holder can be increased to uniformize the density of the ink in the ink roller. Thus, the density of the ink transferred to the recording sheet can be uniformized, which prevents non-uniform printing.

The heating means may include a heating wire. In this case, the heating wire may be provided inside a hollow rotating shaft penetrating the ink roller in the axial direction. Further, it is possible to disperse hollow particles having an elastically deformable outer shell covering a gas in the ink holder so that the gas inside the hollow particles can be expanded to pressurize the ink holder when the ink holder is heated by the heating means. In this manner, the expansion of hollow particles can be used to further increase the fluidity of the ink.

According to other aspect of the present invention, there is provided an ink transfer printer using an ink roller having an ink holder that holds ink and a film that covers the ink holder and that allows the permeation of the ink when heated to a predetermined temperature or higher while preventing the permeation of the ink at the room temperature. The printer rotates the ink roller and heats the film based on print information to selectively allow the permeation of the ink so that the ink permeated through the film can be transferred to the recording sheet. The ink roller is rotatably supported by a supporting shaft disposed inside the ink roller. A spiral groove is formed in the outer circumference of the supporting shaft and an ink passage in communication with an external ink supply means is opened into the spiral groove so that the relative rotation of the supporting shaft and the ink roller can cause the ink to flow along the spiral groove and then to be supplied uniformly throughout the ink holder.

Since the relative rotation of the supporting shaft and the ink roller causes the ink to flow along the spiral groove in the supporting shaft, the ink can be uniformly supplied in the axial direction of the ink roller. With this, a non-uniform printing concentration caused by a non-uniform ink density is prevented.

The ink roller can include a cylindrical member having an inner circumferential surface that slides on the outer circumferential surface of the supporting shaft and an outer circumference supporting the ink holder. The cylindrical member has an opening that allows the ink to communicate between the supporting shaft and the ink holder. With this arrangement, the ink holder and the supporting shaft do not directly slidably contact with each other, so the ink holder may comprise a soft material such as a sponge.

In addition, if the cylindrical member includes a pair of flanges disposed so as to grip the ink holder from its axial ends, the ink holder can be more reliably supported and the ink can be prevented from leaking from the ink holder. If the supporting shaft comprises a fixed shaft fixed to the printer body, it is possible to connect a connecting groove formed in the supporting shaft and the external ink supply in a simple manner. In addition, by providing a hollow portion inside the ink holder in the ink roller in which the ink is collected, the level of the ink becomes horizontal due to the gravity, thereby enabling the ink to be uniformly supplied to the ink roller in the axial direction. The rotating shaft supporting the ink roller may include struts that support the ink holder while maintaining a hollow portion between the rotating shaft and the ink holder. With this arrangement, it is possible to maintain the hollow portion between the rotating shaft and the ink holder even if the ink holder is composed of a soft material such as a sponge.

Furthermore, if the rotating shaft includes an ink passage connected to the hollow portion and in communication with the exterior of the ink roller, the ink can be periodically supplied via the ink passage. By connecting the ink passage to a certain ink supply means, the ink can be constantly supplied.

According to still further aspect of the present invention, there is provided an ink transfer printer wherein a liquid ink is held in a porous body and wherein the surface of the porous body includes a film that is composed of a material capable of reversibly converting its polarity between hydrophilicity and hydrophobicity and that is configured so as to allow the permeation of the ink when it has the same polarity as the ink while preventing the permeation of the ink when it has the different polarity. By making the polarity of the film same as the ink according to a print pattern, the ink held in the porous body can be selectively permeate through the film and then transferred to recording sheet.

Since the film capable of being converted between hydrophilicity and hydrophobicity is used to selectively transmit the liquid ink contained in the porous body in order to transfer it to recording sheet, it is possible to provide a printer free from the clogging of the ink as in a ink jet printer and noises as in a wire dot printer. In addition, the porous body can be used until the ink contained therein has been used up, this aspect is efficient compared to the use of ink ribbons that may be wasted despite the presence of unused parts and reduces the number of replacement operations to reduce running costs.

If the ink is aqueous, the film may include a material that exhibits hydrophilicity above a predetermined temperature or higher and a hydrophobicity below the predetermined temperature. In this case, if the film includes a shape memory resin (for example, one of polyurethane resin), it is possible to make use of the nature the shape memory resin such that it exhibits hydrophilicity in a rubber state (above the glass transition temperature) and a hydrophobicity in a glassy state (below the glass transition temperature).

The film may have therein pores of a size that prevents the permeation of the ink when the polarity of the film is different from that of the ink. This arrangement enables the ink to surely permeate as required. Alternatively, the film may include a shape memory resin that allows the permeation of liquid molecules of the ink through the gaps between the resin molecules when its temperature is above the glass transition temperature. With this arrangement, the machining to form pores becomes unnecessary.

In a particular arrangement, the porous body may include a porous roller and the ink roller may be formed by covering the porous roller with the film. The ink roller may be rotated by a rotating means. The heating means for heating the film and the transfer means for transferring the ink permeated through the film to recording sheet may be disposed along the ink roller and in the direction in which the ink roller is rotated. With this arrangement, it is possible to constitute an ink transfer printer with a simple layout disposing the ink roller at the center thereof. In order to convert the film between hydrophilicity and hydrophobicity, the irradiation of light may be used instead of heating. In this case, the film may include a material that is converted from hydrophobicity to hydrophilicity when irradiated with light of a first wavelength while being converted from hydrophilicity to hydrophobicity when irradiated with light of a second wavelength.

In a particular arrangement, the porous body may include a porous roller and the ink roller may be formed by covering the porous roller with the film. the ink roller may be rotated by a rotating means and a first irradiation means for irradiating the film with light of a first wavelength, the transfer means for transferring to recording sheet the ink transmitted through the film and a second irradiation means for irradiating the film with light of a second wavelength may be disposed along the direction in which the ink roller is rotated.

In addition, the film may be adhered to a belt-like supporting member to form an endless belt provided around a pair of rollers, one of which is a porous roller. At least one of the pair of rollers may be rotated to rotationally drive the endless belt around the rollers and the first irradiation means for irradiating the film with light of a first wavelength, the transfer means for transferring to recording sheet the ink transmitted through the film and the second irradiation means for irradiating the film with light of a second wavelength may be disposed along the direction in which the endless belt is rotated.

According to yet further aspect of the present invention, there is provided an ink transfer printer comprising a porous body impregnated with a liquid ink and a film that is provided on the porous body and that allows the permeation of the ink at a high temperature while preventing the permeation of the ink at a room temperature. The film is heated according to a print pattern thereby to selectively allow the permeation of the ink contained in the porous body and to transfer the ink permeated through the film to the recording sheet. A part of the ink is vaporized by heating and a vapor pressure thereof facilitates the permeation of the ink. Since the permeation of the ink is facilitated by a vapor pressure generated by the local vaporization of the ink, the ink can be surely permeated and transferred to recording sheet.

According to still other aspect of the present invention, an ink transfer printer comprising a thermal line head comprising a plurality of heating elements disposed in a predetermined direction, a film with predetermined through-holes which is faced to the thermal line head, an urging means for adhering recording sheet to the surface of the film which is faced to the thermal line head, a space formed between the thermal line head and the film to hold the ink therein; and a feeding means for sequentially feeding recording sheet, wherein the heating elements on the thermal line head selectively heat the ink in the space and the film so that the ink can permeate through the through-holes in the film and transferred to the recording sheet.

With this arrangement, since the film contacts with the recording sheet, the reduction of the resolution caused by the splashing of the ink (as in an ink jet printer that require a gap between the nozzles and the recording sheet) is prevented. Thus, a higher resolution can be obtained. In addition, since the through-holes of the film are used instead of nozzles as in the ink jet printer, the structure becomes simple, which significantly reduces manufacturing costs. In addition, the use of the through-holes in the film enables the use of the line head in a simple manner, which increases the printing speed.

The printer may be so constituted that a pressure generated in the ink during heating forces the ink to permeate through the through-holes. With this, the ink does not enter the through-holes when not required, thereby preventing the clogging of the ink. Furthermore, it is possible to use a film with an elastic modulus decreasing when heated. With this, the synergistic effect of the pressure in the ink and the decrease in the elastic modulus of the film allows the ink to permeate through the through-holes. With this arrangement, it is possible to set the pressure relatively small.

Alternatively, if the film includes a material that reversibly converts its polarity between hydrophilicity and hydrophobicity according to the temperature, it is possible that the change in the polarity of the film caused by heating allows the ink to permeate through the through-holes. Furthermore, the printer may be configured so that the decrease in surface tension (that is the effect of the change between hydrophilicity and hydrophobicity and the decrease in the viscosity of the ink caused by heating) allows the ink to permeate through the through-holes.

The film is adhered to the thermal line head via a spacer comprising a material that dose not transmit the ink. The space is a region surrounded by the film, the thermal line head and the spacer (the spacer may be an adhesive). With this arrangement, the structure for holding the ink becomes simple. An ink reservoir may be provided for refilling the ink in the space. The ink reservoir may be long in the direction in which the heating elements are arranged. This arrangement can reduce the size of the ink reservoir as seen in side view. In addition, by disposing the heating elements in the space, the heat from the heating elements can be more effectively transmitted to the ink.

If a plurality of through-holes in the film correspond to a single heating element, it is not necessary to precisely align the through-holes in the film with respective to the heating elements. Alternatively, if a plurality of heating elements correspond to a single through-hole in the direction in which the elements are arranged, it is possible to perform the tone control by changing the number of heating elements to be heated.

The through-holes can be punched through the film using a needle. Since the punching of the film is much easier than the processing of nozzles as in a ink jet printer, manufacturing costs can be significantly reduced. In addition, if the through-holes are inclined at a predetermined angle from the direction of the thickness of the film so that the film is constantly pressurized between the thermal head and for example, the platen roller to squeeze the through-holes, the ink does not leak from the through-holes even if the printer suffers unintended vibration while the printer is not used. In addition, by forming the film of a porous material, the through-holes need not be punched, thereby further reducing manufacturing costs.

The film may include a shape memory resin, that is, a material that reversibly changes between the glassy state and the rubber state according to the temperature. In this case, if the through-holes are punched through the film while the film is in the rubber state (above the glass transition temperature and below the shape fixing temperature) so that at the room temperature, the film can change to the glassy state with the through-holes closed. Thus, the ink does not leak from the through-holes even if the printer suffers unintended vibration while the printer is not used, because the through-holes are closed.

According to yet other aspect of the present invention, there is provided an ink transfer attachment used to dispose a supporting plate and a film with predetermined through-holes in such a manner that they are faced to each other and to hold ink in a space between the supporting plate and the film. By installing the attachment in a thermal line printer in such a manner that the supporting plate is faced to the thermal line head and that the film is faced to a recording sheet feeding path, the ink in the attachment heated by the thermal line head is transmitted through the film and transferred to recording sheet. In addition, when the attachment is removed from the printer, the printer can be used as a thermal line printer.

With this arrangement, a conventional thermal line printer can be used as an ink transfer printer simply by installing the attachment in the printer. By allowing the attachment to be inserted from an inlet opening of the thermal line printer, not only the installation of the attachment but also maintenance operations can performed easily.

According to still another aspect of the present invention, there is provided an ink transfer printer comprising a porous cylindrical support containing ink, a film slidably held on the cylindrical support and having predetermined through-holes, a platen roller disposed in parallel to the cylindrical support so as to sandwich recording sheet between itself and the film and a thermal line head incorporated in the cylindrical support and including a plurality of heating elements disposed in parallel to the axial direction of the cylindrical support. This arrangement allows the film to be moved over the cylindrical support as the recording sheet is fed, thereby preventing sliding contact between the film and the recording sheet. Thus, if the surface of the cylindrical support is smooth, shearing stress acting on the film can be reduced. This also prevents the ink from trailing to prevent the deformation of dots transferred to the recording sheet.

According to still another aspect of the present invention, there is provided a printing plate manufacturing method for manufacturing a stencil printing plate having through-holes (through which the ink permeates) disposed according to a print pattern, using a plate material formed of a shape memory resin and having a plurality of through-holes of a size that prevents ink from being transmitted. The method includes: selectively heating the plate material according to a print pattern to change the heated part to the rubber state, applying a fluid pressure to one of the surfaces of the plate material to deform the rubber-state part and cooling the through-holes in that part while widening them to a size that allows the ink to permeate.

That is, when the selectively heated part of the plate material is cooled, the through-holes is widened by a fluid pressure. Thus, the widened through holes becomes an ink permeable hole for allowing the permeation of the ink. The remaining part of the plate material remains in the glassy state and the through-holes in this part are not widened when a fluid pressure is applied. Thus, this part is used as an ink non-permeable hole that does not allow the permeation of the ink. Thus, it becomes possible to make a stencil printing plate having ink permeable holes and non-permeable holes disposed according to a desired print pattern.

The stencil printing plate formed in this manner can be easily recycled after use. That is, the ink sticking to the printing plate is washed and removed and the printing plate is then heated, so that the printing plate then shifts to the rubber state. Then, if a fluid pressure is not applied, the through-holes, which have been widened to a size that allows the permeation of the ink, return to their original state, that is, a size that prevents the permeation of the ink. Consequently, the used printing plate can be recovered to the original plate material. By heating this plate material according to a print pattern and by applying a fluid pressure thereto, a new printing plate can be obtained. This enables the recycling of a used printing plates.

The through-holes may be punched through the plate material. Alternatively, the material plate may be formed of a porous resin and pores in the porous resin may be used as the through-holes. In addition, by using a thermal head or a scanning laser for heating the plate material, the heating may be executed simply and accurately according to a print pattern.

According to still another aspect of the present invention, there is provided a printing apparatus comprising a holding roller that holds a printing plate on its outer circumference, an ink supply means disposed in the holding roller to supply ink to the printing plate from the interior and a transfer means that sandwiches recording sheet between itself and the printing plate to transfer to the recording sheet the ink transmitted through the printing plate. The holding roller includes a porous body impregnated with the ink. The transfer means is a platen roller faced to the holding roller in parallel thereto.

According to still another aspect of the present invention, there is provided a printing plate manufacturing method for manufacturing a printing plate (a relief printing plate or an intaglio printing plate) with recessed and projecting parts according to a desired print pattern. The method includes: selectively heating a plate material of a shape memory resin according to a desired print pattern to change the heated part to the rubber state and cooling the material while applying a fluid pressure to one of the surfaces of the plate material to deform the rubber-state part.

The printing plate (the relief printing plate or intaglio printing plate) formed in this manner can be easily recycled after use. That is, the ink sticking to the printing plate is washed and removed and the printing plate is then heated, so that the printing plate then shifts to the rubber state. Then, if a fluid pressure is not applied, the recessed and projecting parts formed on the plate material return to a flat state. That is, the used printing plate can be recovered to the original plate material. By heating this plate material according to a print pattern and applying a fluid pressure thereto, a printing plate corresponding to a different print pattern can be provided. This enables the recycling of the used printing plate.

According to still another aspect of the present invention, there is provided a printing apparatus comprising a drum roller around which a printing plate is wrapped, an ink supply means for supplying ink to the printing plate and a transfer means that sandwiches recording sheet between itself and the printing plate to transfer to the recording sheet the ink transmitted through the printing plate. If the printing plate is a stencil printing plate, the ink supply means may be incorporated in the drum roller so as to supply the ink from inside the printing plate. In addition, if the printing plate includes a relief printing plate or an intaglio printing plate, the ink supply means may supply the ink from outside the drum roller to the surface of the printing plate.

BRIEF DESCRIPTION OF THE DRAWING

FIGS. 31A, 31B, 31C and 31D show the principle of the operation of the transfer printer in FIG. 28;

DESCRIPTION OF THE EMBODIMENTS

The embodiments of the ink transfer printer according to the present invention are described below.

Figure 1:
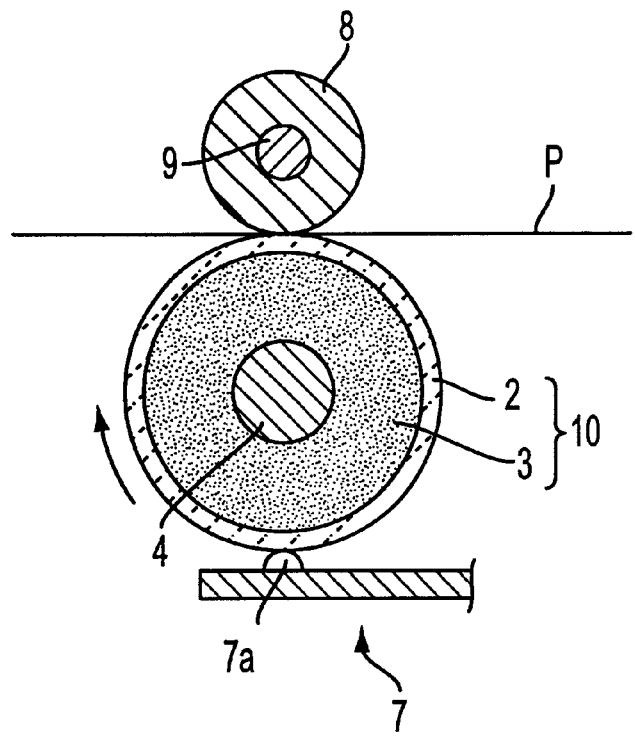
FIG. 1 is a side sectional view showing the basic arrangement of the ink transfer printer according to a first embodiment of the present invention.

FIG. 1 shows the basic arrangement of a printer according to an embodiment. An ink transfer printer includes an ink roller 10 and a platen roller 8 faced to each other with a recording sheet P sandwiched therebetween and a thermal head 7 for partially heating the circumferential surface of the ink roller 10.

The ink roller 10 includes an ink holder 3 including a roll-shaped sponge body in which an ink is contained, a film 2 covering the ink holder 3 and a rotating shaft 4 supporting the ink holder 3 from the interior thereof. The film 2 includes a material that allows the permeation of the ink when heated to a predetermined temperature or higher while preventing the permeation of the ink at the room temperature, as described below in detail. The rotating shaft 4 is rotated clockwise in the drawing by a rotating mechanism (not shown).

The platen roller 8 includes an elastic material such as rubber to press the recording sheet P between the platen roller 8 and the ink roller 10 with a predetermined pressure and is rotatably supported by a rotating shaft 9 disposed above the ink holder 3. The thermal head 7 is provided to heat the film 2 according to print information, having heating elements 7a arranged in a line in the direction perpendicular to a sheet of the drawing and is located in such a manner that the heating elements 7a are in contact with the surface of the film 2.

Figure 2:
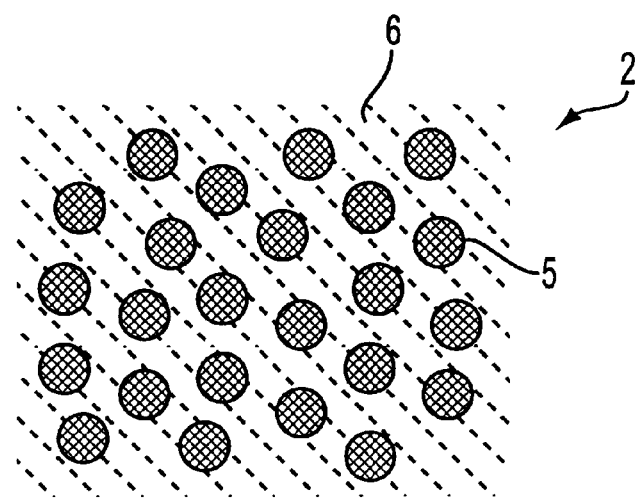
FIG. 2 is a schematic drawing showing the structure of a film.

FIG. 2 schematically shows the microstructure of film 2. The film 2 is formed by uniformly dispersing an additive 5 in a matrix 6. The additive 5 is formed of an inorganic substance such as talc and the matrix 6 is formed of resin such as Teflon or silicon, or rubber. In addition, the thermal expansion coefficient α of the additive 5 and the thermal expansion coefficient β of the matrix 6 are satisfies the relationship of α<β.

Figure 3:
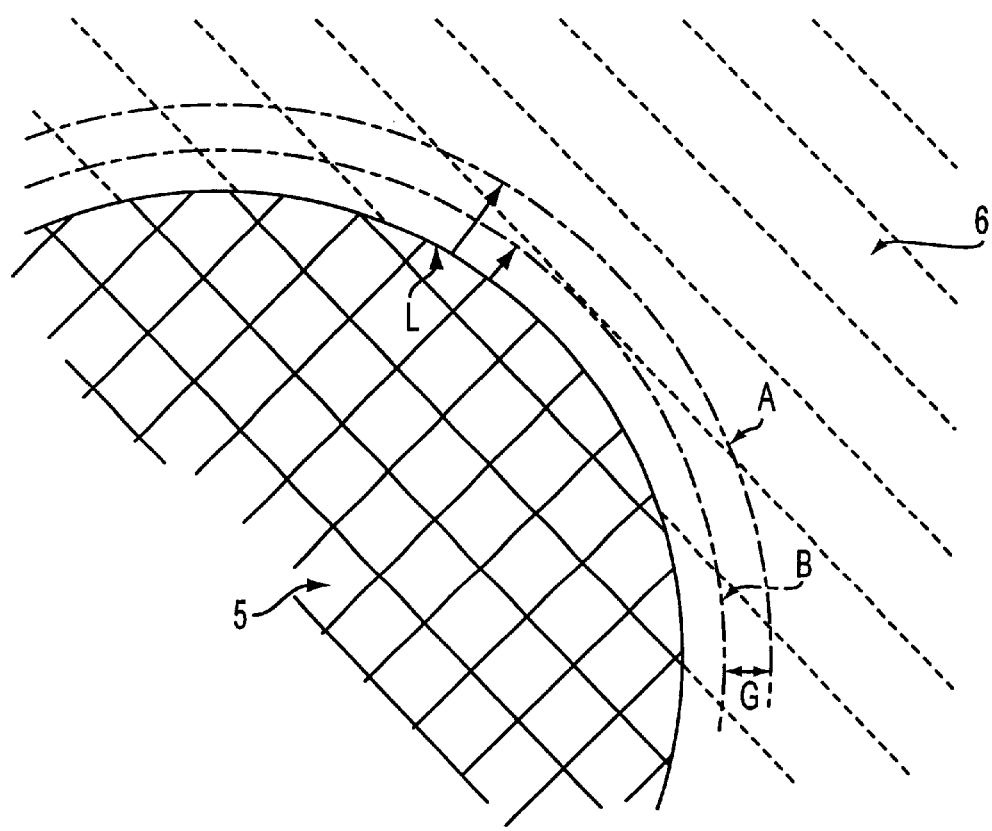
FIG. 3 is a schematic drawing showing the structure of the film.

FIG. 3 schematically shows the interface between the additive and the matrix. The interface between the additive 5 and the matrix 6 is referred to as L as shown in FIG. 3. Since the thermal expansion coefficient β of the matrix 6 is larger than the thermal expansion coefficient α of the additive 5, the matrix 6 side of the interface L moves to an interface A (shown by a dashed line) due to thermal expansion, whereas the additive 5 side of the interface L moves only to an interface B (shown by a double-dashed line). Thus, a gap G is formed between the interfaces A and B. When the temperature returns to the room temperature, the interfaces A and B each return to the interface L and the gap G disappears.

Figure 4:
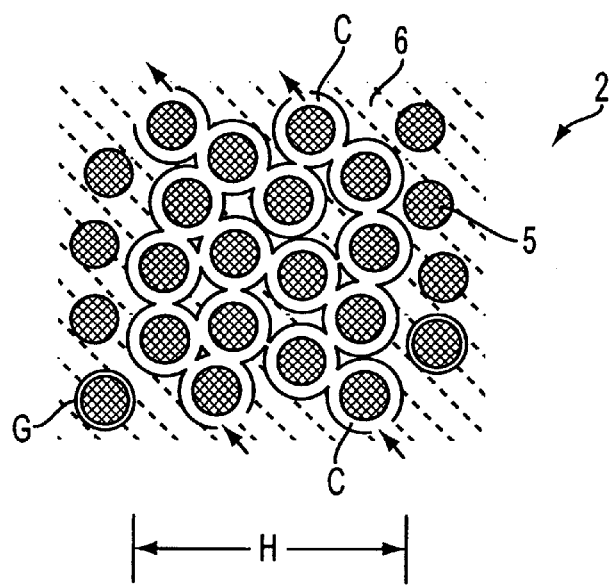
FIG. 4 is a schematic drawing showing the boundary between an additive and a matrix in the film.

FIG. 4 schematically shows the microstructure of the film 2 during heating. If the additive 5 is uniformly dispersed with a predetermined density as shown in FIG. 4, the gaps formed around the additives 5 caused by thermal expansion are connected together to form connected pores C. Thus, when the film 2 is formed so as to have a sufficiently small thickness and the thermal head 7 is used to heat a portion shown at H in the drawing, connected pores C are formed in the heated portion. Portions adjacent to the heated portion H do not become so hot as the heated portion H. Thus, gaps G formed in these portions do not grow large enough to be connected together and connected pores are not formed.

Figure 5A:
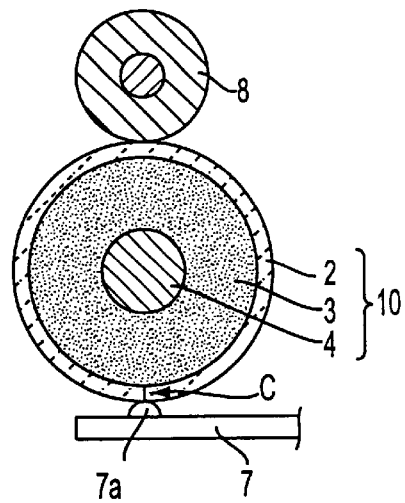
FIGS. 5A, 5B and 5C show the operation of the ink transfer printer in FIG. 1.
Figure 5B:
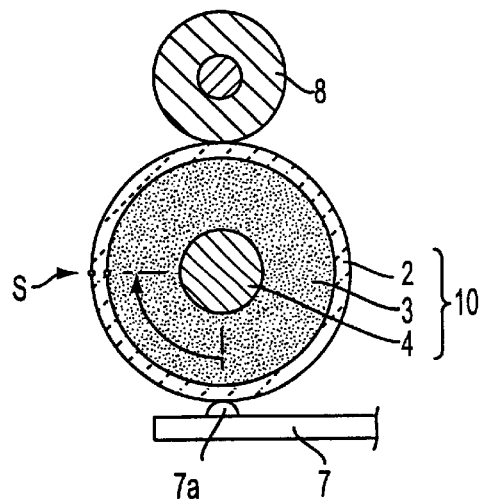
Figure 5C:
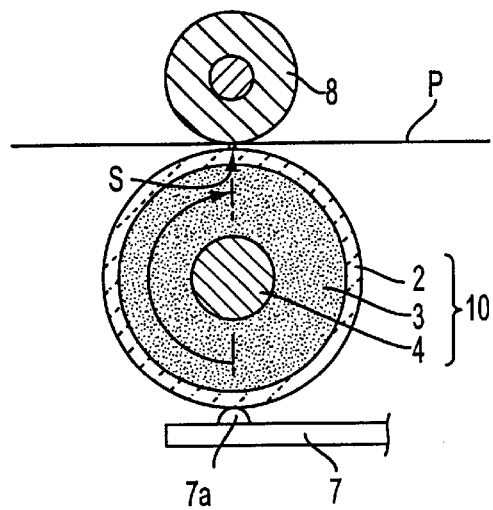

The principle of printing of the ink transfer printer according to the first embodiment is described with reference to FIGS. 5A to 5C. As shown in FIG. 5A, when the heating elements 7a on the thermal head 7 heat the film 2, a connected pore C is formed in the heated part. Due to capillarity, ink flows into the pore C from the ink holder 3. As the ink roller 10 is rotated and the part in which the connected pore is formed is cooled to the room temperature, the connected pore gradually vanishes. Once the connected pore has vanished, the ink which has existed in the connecting pore is partially left (like a stain) on the surface of the film 2, which forms an ink spot (a fine pool of ink) S as shown in FIG. 5B. As shown in FIG. 5C, the ink spot S is pressed between the film 2 and the platen roller 8 and transferred onto the recording sheet P. The ink is thus transferred to form an image on the recording sheet P.

It is preferable that the linear expansion coefficient of the matrix 6 in the direction along the outer circumference of the ink roller 10 is set larger than the linear expansion coefficient of the matrix 6 in the axial direction of the ink roller 10. With this, the width of the pore C in the main scanning direction of the thermal head 7 (that is, the direction in which the heating elements 7a are arranged) can be reduced to improve the resolution of images.

As described above, the printer according to the first embodiment uses the film in which the connected pores allowing the permeation of the ink are formed at high temperatures and in which the connected pores disappear to prevent the permeation of the ink at the room temperature. Thus, clogging caused by the ink is prevented. In addition, since the pore includes fine gaps formed between the additive and the matrix due to thermal expansion, images with a high resolution can be obtained. In addition, since the ink holder can be used until the ink contained in the ink holder has been used up, the printer according to this embodiment is efficient and requires a smaller number of replacements, compared with the ink ribbons that may be wasted despite the presence of unused parts. That is, this embodiment improves running costs.

Figure 6:
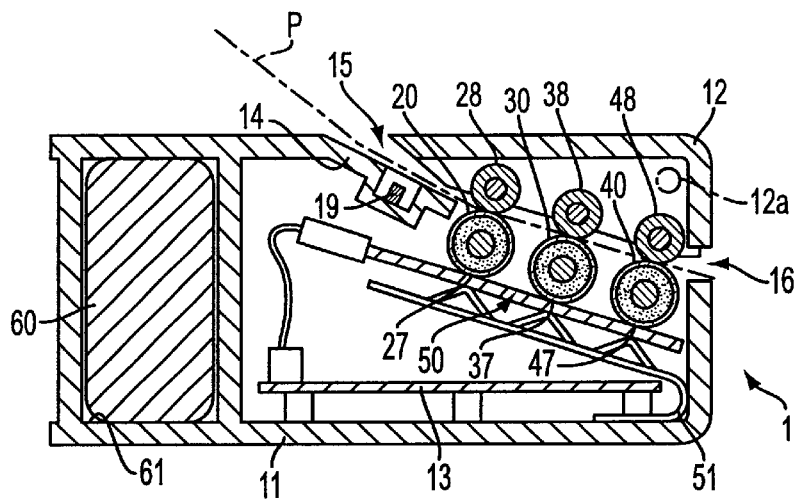
FIG. 6 is a side sectional view showing the basic arrangement of a color printer to which the ink transfer printer in FIG. 1 is applied.

A color printer employing the ink transfer printer according to the first embodiment is described. FIG. 6 is a side sectional view showing a color printer 1 employing the ink transfer printer according to the first embodiment. The color printer 1 includes a housing 11 having a rectangular shape that is longer in the direction perpendicular to the sheet of the drawing, an inlet opening 15 formed in the top surface of the housing 11 through which the recording sheet P is inserted and a discharge opening 16 formed in the front surface (shown in the right in the drawing) of the housing 11 from which the recording sheet P is discharged. Three ink rollers 20, 30 and 40 extending in the direction perpendicular to the sheet of the drawing are disposed in the housing 11 in parallel with each other along the line extending between the inlet opening 15 and the discharge opening 16.

Figure 7:
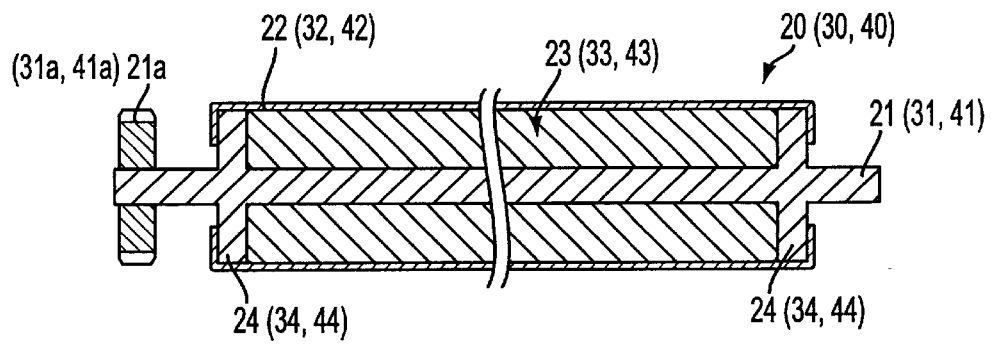
FIG. 7 is a sectional view showing the arrangement of an ink roller.

FIG. 7 shows the arrangement of the ink rollers 20, 30 and 40. As shown in FIG. 7, the ink rollers 20, 30 and 40 have supporting shafts 21, 31 and 41 with gears 21a, 31a and 41a attached to one end, respectively, and a pair of wheels 24, 34 and 44 attached to the supporting shafts 21, 31 and 41, respectively, in the axial direction at a predetermined interval.

Ink holders 23, 33 and 43 are sponge bodies and respectively provided between the pair of wheels 24, 34 and 44. The ink holders 23, 33 and 43 respectively contain the ink of Y (yellow), M (magenta) and C (cyan). Outer circumferential surfaces of ink holders 23, 33 and 43 are covered with films 22, 32 and 42, respectively. The films 22, 32 and 42 are arranged in the same manner as the film described with reference to FIGS. 2 to 4. In addition, the films 22, 32 and 42 have both axial ends stuck to the pair of wheels 24, 34 and 44. As shown in FIG. 6, a cover 12 is pivotably provided around a pivoting axis 12a of the front part of the housing 11 (shown in the right in the figure). Three platen rollers 28, 38 and 48 made of rubber are rotatably supported by the cover 12.

Figure 8:
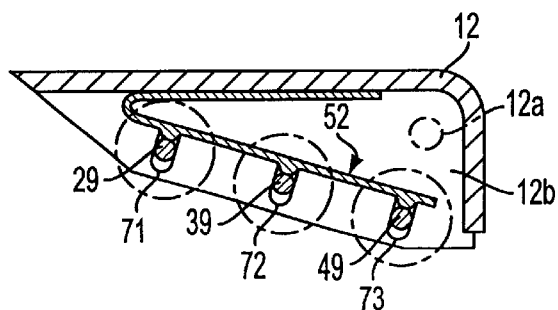
FIG. 8 shows a arrangement for supporting a platen roller.

FIG. 8 shows a arrangement for supporting the platen rollers 28, 38 and 48. As shown in this figure, supporting grooves 71, 72 and 73 are formed in a side plate 12b of the cover 12 so that the grooves 71, 72 and 73 respectively extend in the direction toward and away from the ink rollers 20, 30 and 40 (FIG. 6). Supporting shafts 29, 39 and 49 of the platen rollers 28, 38 and 48 fit into the supporting grooves 71, 72 and 73, respectively. That is, the supporting shafts 29, 39 and 49 can be moved in the direction that toward and away from the ink rollers 20, 30 and 40 (FIG. 6), respectively. The supporting shafts 29, 39 and 49 are biased downward by a spring member 52 provided on the cover 12. Thus, the platen rollers 28, 38 and 48 shown in FIG. 6 press the recording sheet P sandwiched between the platen rollers 28, 38 and 48 and the ink rollers 20, 30 and 40, respectively, with a predetermined pressure.

As shown in FIG. 6, a thermal head 50 is disposed below the ink rollers 20, 30 and 40. The thermal head 50 includes three arrays of heating elements 27, 37 and 47 faced to the ink rollers 20, 30 and 40, respectively. The heating elements 27, 37 and 47 are driven to print a red, a blue and a green images, respectively. The thermal head 50 is supported by a plate spring 51 provided below the housing 11 and is pressed against the ink rollers 20, 30 and 40 at a predetermined pressure.

A plate 13 on which a control unit U (described below) is provided in the center of the housing 11. A battery holding section 61 is provided on the rear side (shown in the left in the figure) to hold a battery 60. The housing 11 includes a guide slope 14 extending from the inlet opening 15 toward the ink rollers 20, 30 and 40 and having a reflecting-type photosensor 19 for detecting the insertion of the recording sheet P.

Figure 9:
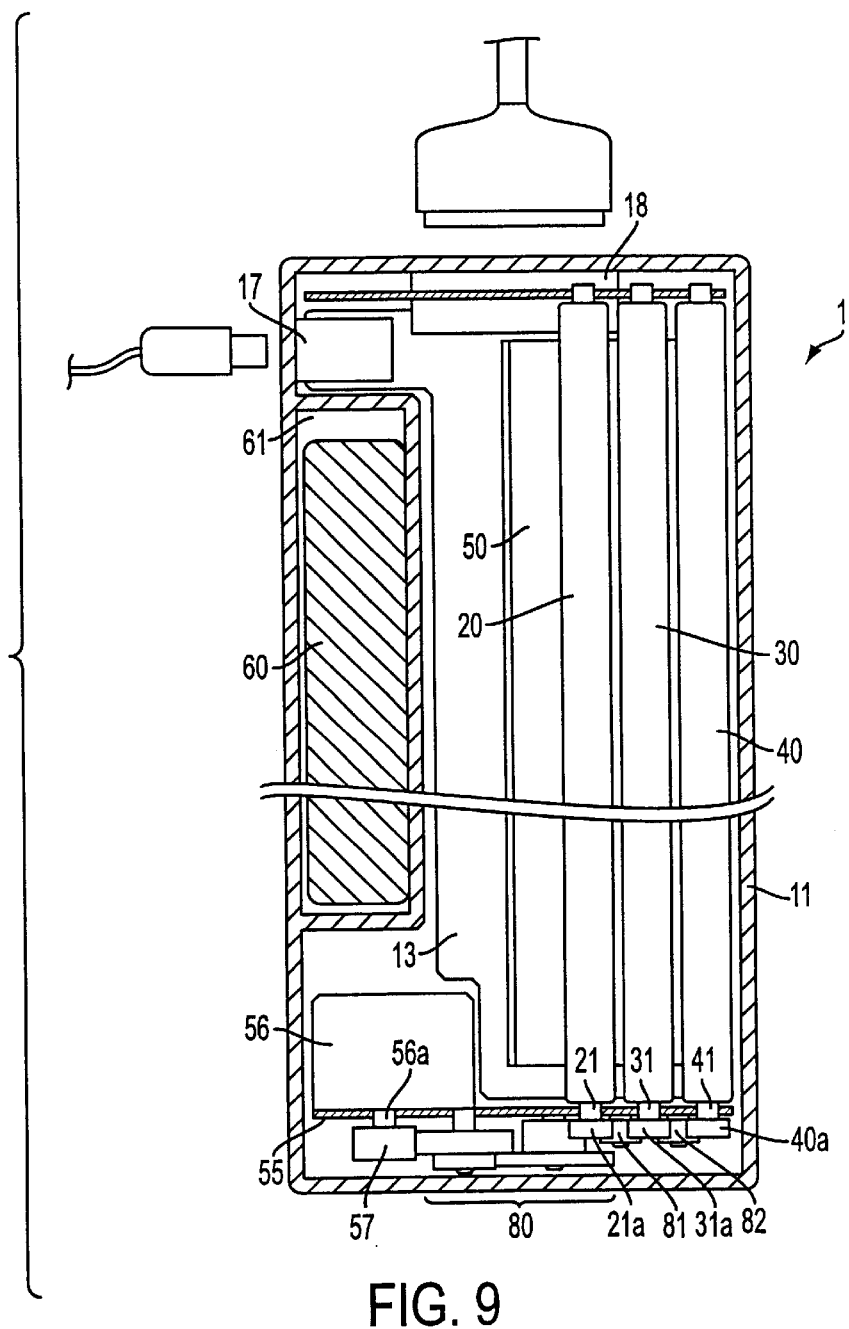
FIG. 9. is a plan view showing the internal arrangement of the color printer in FIG. 7.

FIG. 9 is a plan view showing the internal structure of the color printer 1. A drive motor 56 for driving the ink rollers is mounted on a panel 55 vertically provided at one side end of the housing 11 (the bottom in the figure) in such a manner that an output shaft 56a protrudes from the panel 55 downward in the figure. A motor gear 57 fixed to the output shaft 56a is connected to a train of reduction gears 80 provided on the panel 55.

The respective supporting shafts 21, 31 and 41 of the ink rollers 20, 30 and 40 protrude through the panel 55. Roller gears 21a, 31a and 41a are respectively provided at the tips of the supporting shafts 21, 31 and 41. The roller gear 21a engages a reduction gear train 80. The roller gear 21a engages the roller gear 31a of the ink roller 30 via a first intermediate gear 81. The roller gear 31a engages the roller gear 41a of the ink roller 40 via a second intermediate gear 82. Thus, the ink rollers 20, 30 and 40 are rotated by the driving force of the drive motor 56.

A terminal 18 is provided on one side of the color printer 1, to which print information is inputted from an equipment such as a computer. A terminal 17 is formed on the rear side of the color printer 1, for supplying power.

Figure 10:
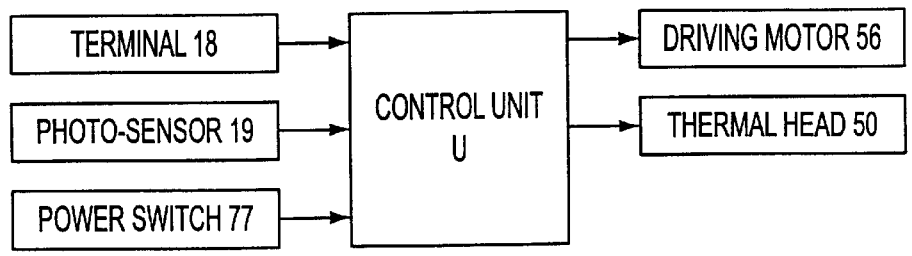
FIG. 10 is a block diagram showing a control system for the color printer in FIG. 7.
Figure 11A:
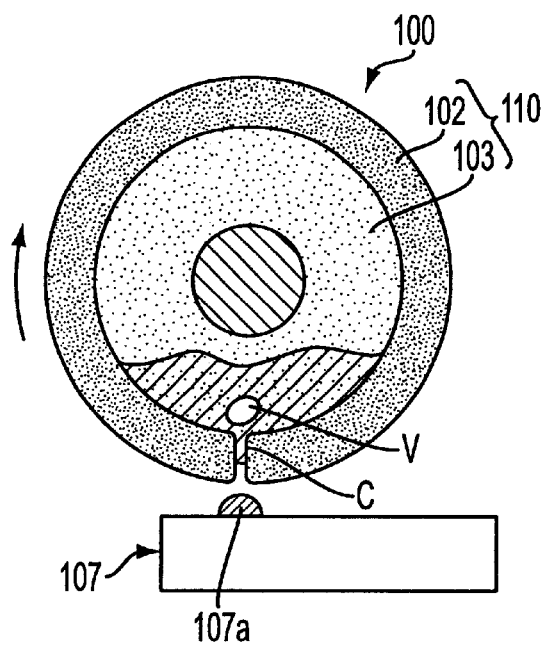
FIGS. 11A, 11B, 11C and 11D are a side sectional views showing a variation of the ink transfer printer according to the first embodiment.
Figure 11B:
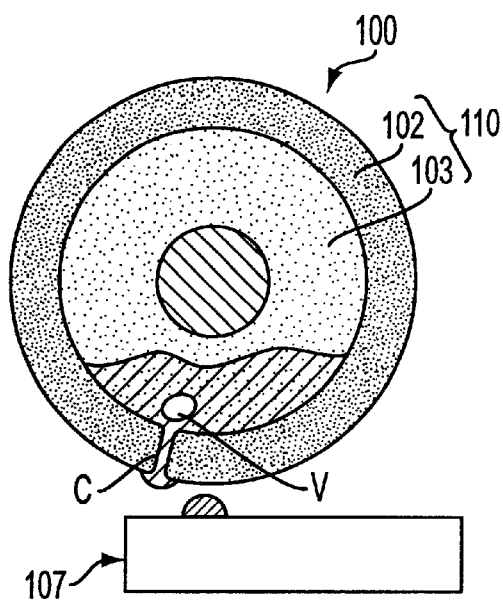
Figure 11C:
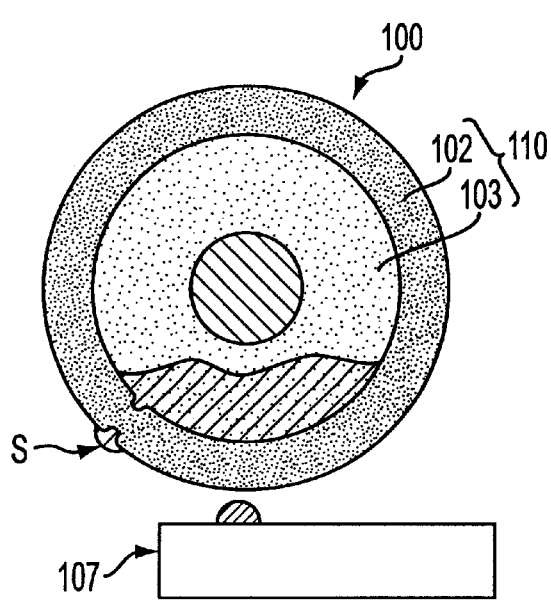
Figure 11D:
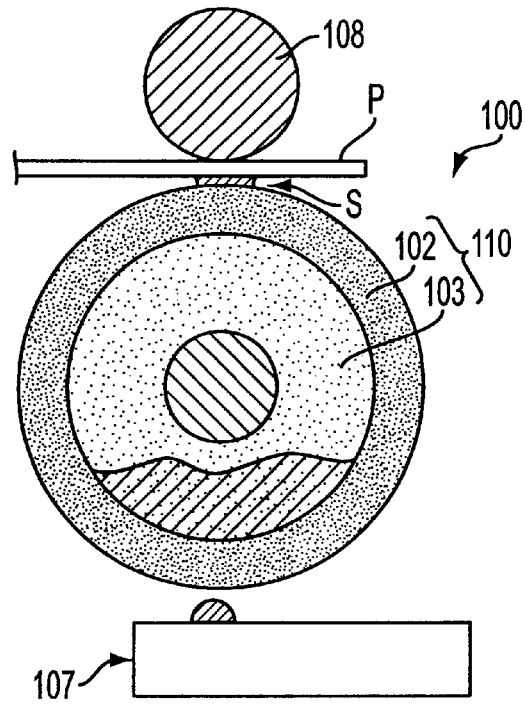

FIG. 10 is a block diagram showing a control system for the color printer 1.

The control unit U receives print information from the terminal 18 (FIG. 9), signals from the photosensor 19 for detecting the recording sheet P and signals from the power switch 77. The control unit U controls the driving of the drive motor 56 (described below) for rotating the ink rollers 20, 30 and 40 and the driving of the thermal head 50 according to respective print information of Y, M and C.

The operation of the color printer 1 of this arrangement is described below. As shown in FIG. 6, the recording sheet P is inserted through the inlet opening 15 formed on the top of the color printer 1, is guided along the guide slope 14 provided below the inlet opening 15 between the ink rollers 20, 30 and 40 and the platen roller 28, 38 and 48, respectively. When the recording sheet P is detected by the photosensor 19, the control unit U (FIG. 10) drives the drive motor 56 (FIG. 8) and the ink rollers 20, 30 and 40 are rotated at a predetermined speed. In addition, the control unit U heats the three arrays of heating elements 27, 37 and 47 on the thermal head 50 according to the print information of Y, M and C. The timing of the heating of the heating elements 27, 37 and 47 are set according to the position of each heating element. Ink spots (FIG. 5B) corresponding to print information of each color are formed on the surfaces of the respective films 22, 32 and 42 on the ink rollers 20, 30 and 40.

The recording sheet P is fed by the rotation of the ink rollers 20, 30 and 40 while being pressed between the ink rollers 20, 30 and 40 and the platen rollers 28, 38 and 48 at a predetermined pressure. The ink spots formed on the films 32, 42 and 52 on the ink rollers 20, 30 and 40 are transferred to the recording sheet P. The recording sheet that has undergone transfer is discharged from the discharge opening 16. In this manner, the color printer 1 prints color images.

As described above, according to the first embodiment, a color printer of a compact and simple structure can be provided by disposing a plurality of ink rollers in parallel and opposing them to the heating elements on the thermal head. In addition, since the three arrays of heating elements are installed on the thermal head, a single control circuit can be used to print images of each color, thereby reducing manufacturing costs.

The gear ratio of the roller gears 21a, 31a and 41a of the ink rollers 20, 30 and 40 can be set in such a manner that the circumferential speeds of the ink rollers increases in the order of the ink rollers 20, 30 and 40. With this arrangement, an appropriate tension can be applied to the recording sheet being fed, thereby to stabilize the feeding of the recording sheet.

A variation of the first embodiment of the present invention is described.

FIG. 11 is a schematic view showing the principle of a printing operation performed by the ink transfer printer according to this variation of the first embodiment. As in the first embodiment, when heating elements 107a on a thermal head 107 heats a film 102, a connected pore C is formed in the heated part (FIG. 11A). Due to capillarity, ink contained in a porous roller 103 flows into the connected pore C. In this variation, when the thermal head 107 is heated, the temperature of the ink increases beyond the boiling temperature of the ink. Thus, a part of the ink is locally vaporized (V in the figure). The vapor pressure then biases the ink toward the exterior of the film 102, thereby to facilitate the permeation of the ink. Since this variation facilitates the permeation of the ink using vapors, the heating elements 107a are heated to about 200° C. As in the first embodiment, the ink contained in the porous roller 103 permeate through the connected pore C due to capillarity and reaches the outer surface of the film 102 (FIG. 11B). As the connected pore C is cooled, the ink spot S left on the surface of the film 102 (FIG. 11C) is pressed between the film 102 and the platen roller 108 and transferred to the recording sheet P (FIG. ID).

As described above, since the thermal head 107 heats the ink beyond its boiling point, the permeation of the ink is facilitated by a vapor pressure generated due to the local vaporization of the ink. This ensures the permeation of the ink through the connected pore C and transferring thereof onto the recording sheet.

The ink transfer printer according to a second embodiment of the present invention is described.

Figure 12:
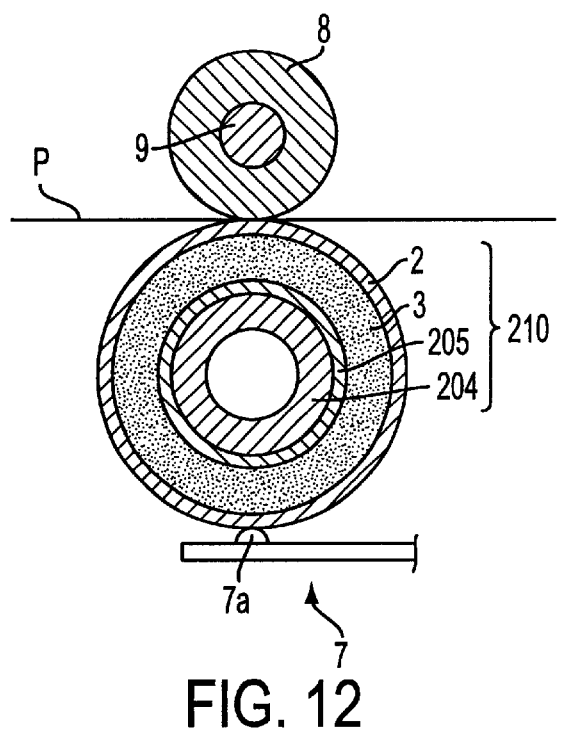
FIG. 12 shows the basic arrangement of the ink transfer printer according to a second embodiment of the present invention.

FIG. 12 shows the basic arrangement of the ink transfer printer according to the second embodiment. As shown in this figure, the ink transfer printer includes an ink roller 210 and the platen roller 8 faced to each other via the recording sheet P, and the thermal head 7 for partially heating the circumferential surface of the ink roller 210.

The ink roller 210 includes the ink holder 3 that is a roll-shaped sponge body impregnated with ink (the ink is liquid at the room temperature), the film 2 covering the ink holder 3, and a rotating shaft 204 that supports the ink holder 3 from the interior. As in the first embodiment, the film 2 includes a material that allows the permeation of the ink when heated to a predetermined temperature or higher while preventing the permeation of the ink at the room temperature. A piezoelectric element 205 (described below) for vibrating the ink holder 3 is provided on the outer circumference of the rotating shaft 204. The arrangement of the platen roller 8 and thermal head 7 is the same as in the first embodiment.

Figure 13:
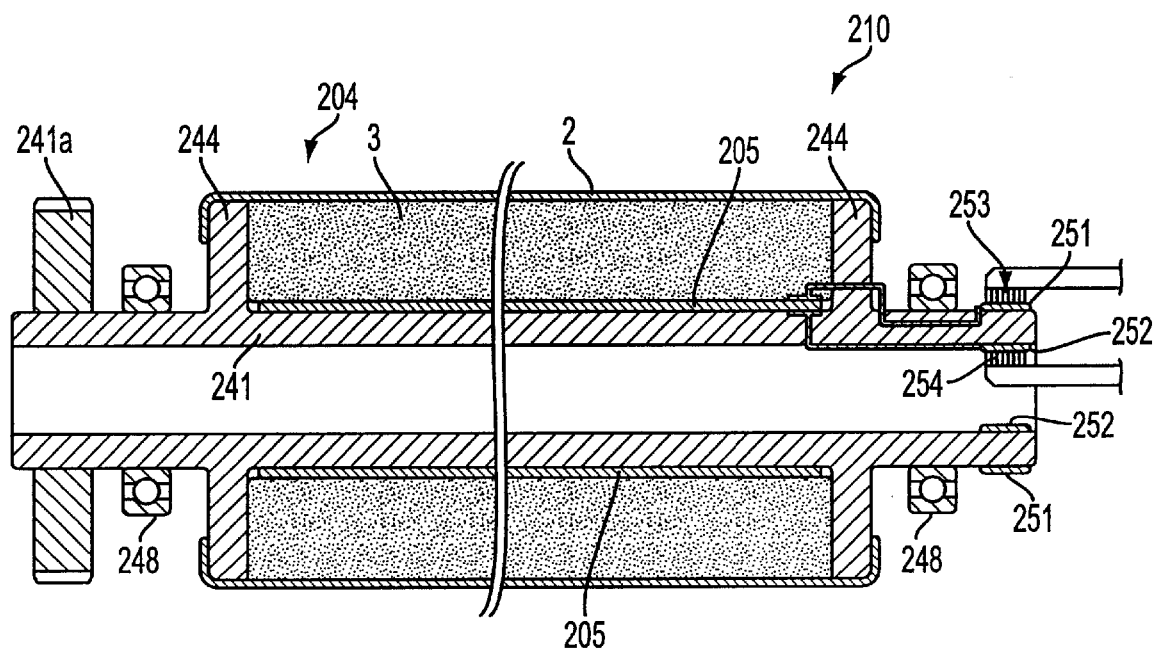
FIG. 13 is a sectional view showing the arrangement of an ink roller.

FIG. 13 is a sectional view showing the ink roller 210. As shown in FIG. 13, the rotating shaft 204 includes a cylindrical portion 241 rotatably supported by a radial bearing 248, and a pair of flanges 244 mounted on the cylindrical portion 241 at a predetermined interval in the axial direction. The ink holder 3 that is a roll-shaped sponge body is supported between the pair of flanges 244. The outer circumference of the ink holder 3 is covered with the film 2 and both axial ends of the film 2 are fixed to the end surface of the flange 244. A gear 241a for rotationally driving the ink roller 210 is fixed to one end of the cylindrical portion 241.

The piezoelectric element 205 (a vibrating means for vibrating the ink holder 3) is provided on the outer circumferential surface of the cylindrical portion 241 between the flanges 244 and 244. The piezoelectric element 205 changes its thickness when a voltage is applied thereto, thereby to vibrate the ink holder 3 from the interior in the direction of the thickness of the piezoelectric element 241. To supply a voltage to the piezoelectric element 205 in the rotating ink roller 210, one electrode lead on the piezoelectric element 205 penetrates the flange 244 and then connects to a terminal 251 provided on the outer circumferential surface of the cylindrical portion 241. The other electrode lead of the piezoelectric element 205 penetrates the thickness of the cylindrical portion 241 into the hollow interior thereof and then connects to a terminal 252 provided on the inner circumferential surface of the cylindrical portion 241. The terminals 251 and 252 extend around the outer and the inner circumferential surfaces of the cylindrical portion 241, respectively and connect to a voltage source (not shown) via brushes 253 and 254.

In the ink transfer printer of this arrangement, when an AC power supply is provided to the piezoelectric element 205, the element 205 is vibrated in the direction of its thickness, vibrating the ink holder 3 in the radial direction thereof. This increases the fluidity of the ink impregnated in the ink holder 3 to uniformize the density of the ink throughout the ink roller 210.

Figure 14:
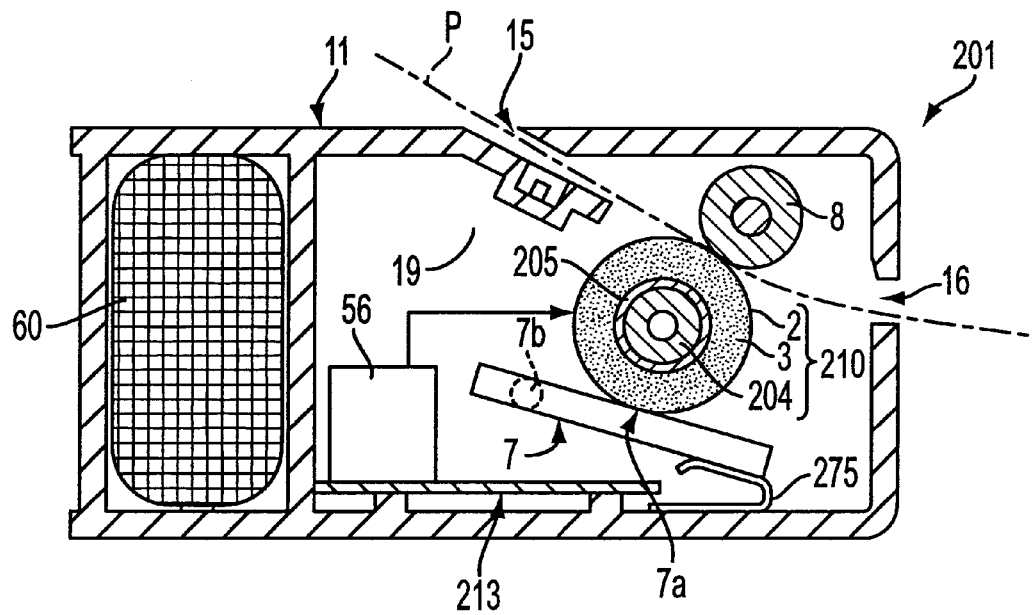
FIG. 14 is a side sectional view showing the basic arrangement of a line printer to which the ink transfer printer in FIG. 12 is applied.

A line printer employing the ink transfer printer according to a second embodiment is described. FIG. 14 is a side sectional view showing the internal structure of the line printer. The line printer 201 includes the housing 11, the above-described ink roller 210 having the piezoelectric element 205 and the platen roller 8 provided in the housing 11. The platen roller 8 is pressed by a spring member (not shown) against the ink roller 210 at a predetermined pressure.

The thermal head 7 with the heating elements 7a is disposed below the ink roller 210. The thermal head 7 is pivotably supported around the pivoting shaft 7b and pressed by the plate spring 75 against the ink roller 210 at a predetermined pressure. The inlet opening 15 is formed in the top of the housing 11 and the discharge opening 16 is formed in the front surface (shown in the right in the figure).

A board 213 on which the control unit U is provided is disposed in the approximate center of the housing 11. The board 213 includes the drive motor 56 for rotating the ink roller 210. The drive motor 56 is controlled by the control unit U and rotates the ink roller 210 via a gear train (not shown) and the gear 41a in FIG. 13. The guide slope extending from the inlet opening 15 to the ink roller 210 is provided with the photosensor 19 for detecting the insertion of the recording sheet P. Reference numeral 60 designates a battery.

Figure 15:
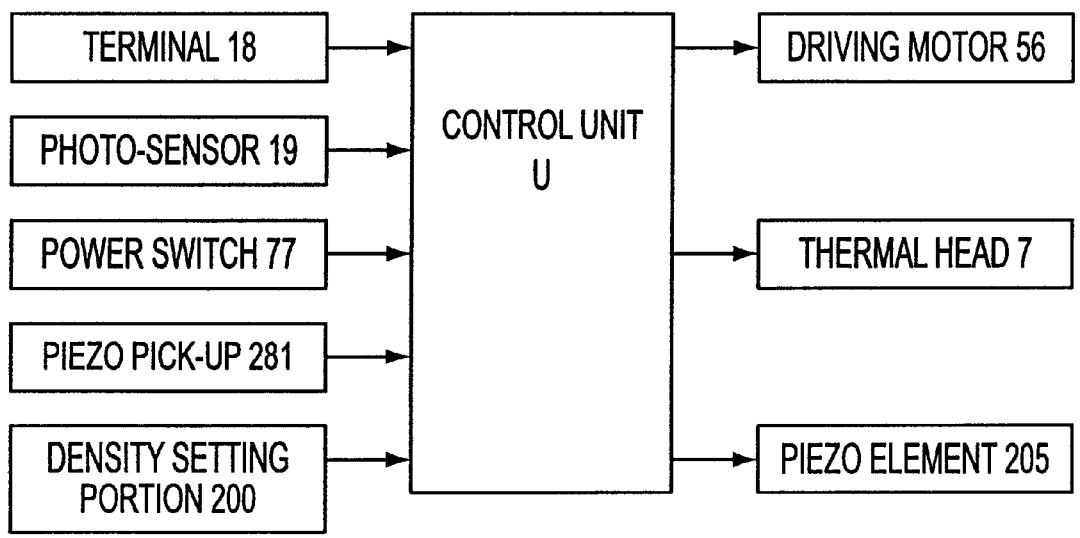
FIG. 15 is a block diagram showing a control system for the line printer in FIG. 14.

FIG. 15 is a block diagram showing a control system for the line printer 201. The control unit U receives print information from the terminal 18 connected to a computer, signals from the photosensor 19 for detecting the recording sheet P and signals from the power switch 77. The control unit U controls the drive motor S6 and the thermal head 7 according to print information. In order to vary the density of images printed on the recording sheet, an image density setting section 200 is provided, which sends a density instructing information to the control unit U.

Figure 16:
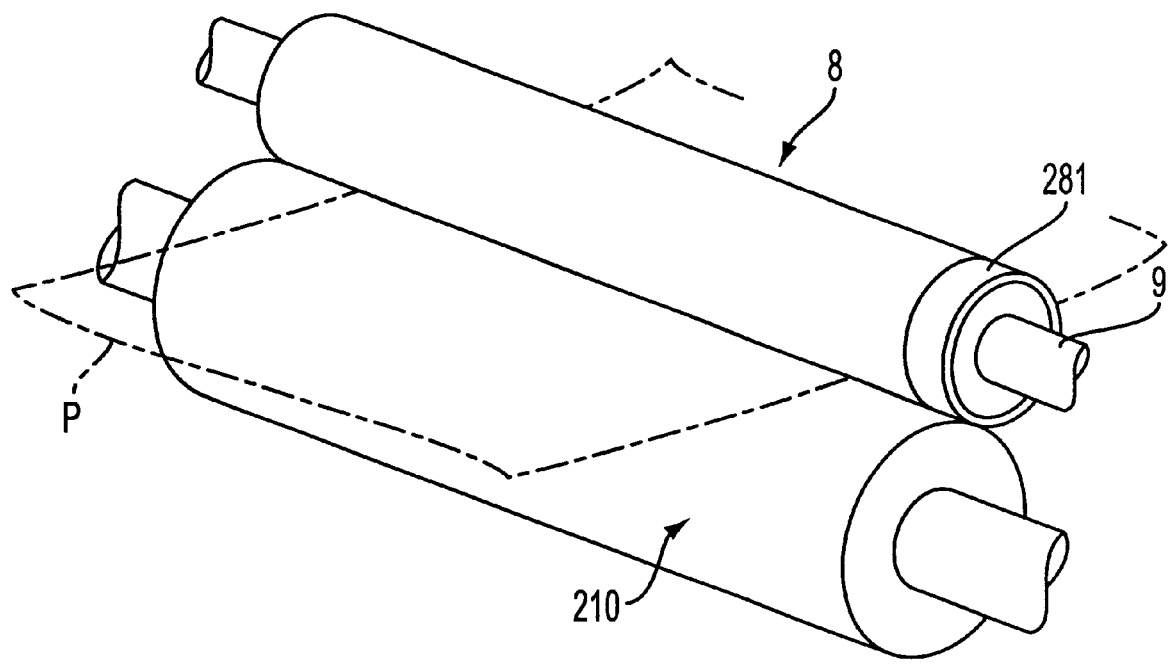
FIG. 16 is a perspective view of the ink roller and a platen roller.

In order to feed back the magnitude of vibration applied to the ink roller 210, a piezoelectric sensor 281 is provided on the outer circumferential surface of the platen roller 8 as shown in FIG. 16. The piezoelectric sensor 281 is mounted at one axial end of the platen roller 8 so as to avoid interference with the recording sheet.

According to density instruction information from the image density setting section 200 and detected values of pressure fed back from the piezoelectric sensor 281, the control unit U controls the piezoelectric element 205 by changing the magnitude of vibration. That is, if it is instructed to increase the density of an image in the image density setting section 200, the control unit U increases a voltage supplied to the piezoelectric element 205 to increase the magnitude of vibration. If it is instructed to decrease the density of an image in the image density setting section 200, the control unit U reduces a voltage supplied to the piezoelectric element 205 to reduce the amplitude.

The operation of the line printer 1 of this arrangement is described below.

As shown in FIG. 14, the recording sheet P is inserted through the inlet opening 15 of the line printer 1 and guided along the guide slope between the ink roller 10 and the platen roller 8. When the recording sheet P is detected by the photosensor 19, the control unit U (FIG. 15) drives the drive motor 56 to rotate the ink roller 210 at a predetermined speed and starts printing control to heat the heating elements 7a on the thermal head 7 based on print information. While being pressed between the ink roller 210 and the platen roller 8 at a predetermined pressure, the recording sheet P is fed as the ink roller 210 is rotated. Ink spots formed on the surface of the film 2 on the ink roller 210 according to print information are transferred to the recording sheet P to form an image thereon. The recording sheet that has undergone transfer is ejected from the discharge opening 16.

In the line printer 1 according to the embodiment, since the ink holder 3 is vibrated by the piezoelectric element 205, the fluidity of the ink contained in the ink holder 3 is improved to uniformize the density of the ink impregnated the ink roller 210. Consequently, the density of the ink transferred to the recording sheet P (that is, the printing density) is uniformized to prevent a non-uniform printing density.

The ink transfer printer according to a third embodiment of the present invention is described.

Figure 17:
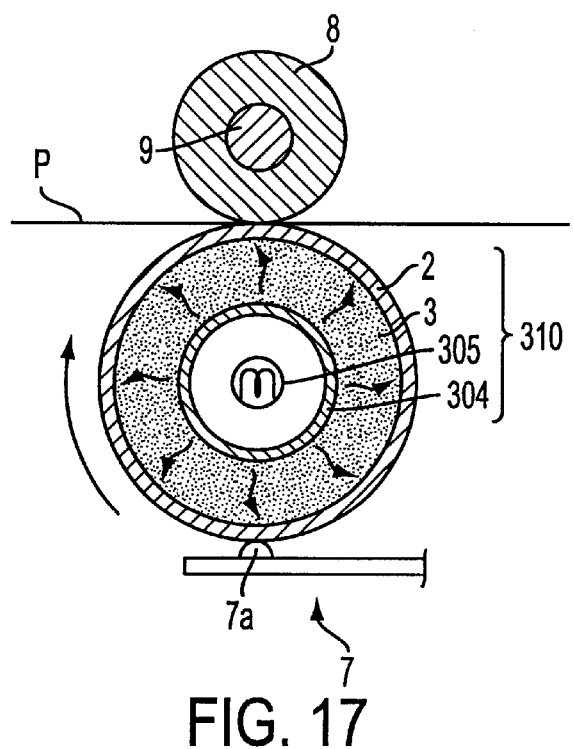
FIG. 17 is a side sectional view showing the basic arrangement of an embodiment of the ink transfer printer according to the present invention.

FIG. 17 shows the basic arrangement of the ink transfer printer according to this embodiment. As shown in this figure, the ink transfer printer includes an ink roller 310 and the platen roller 8 faced to each other via the recording sheet P sandwiched therebetween and the thermal head 7 for partially heating the circumferential surface of the ink roller 310.

The ink roller 310 includes the ink holder 3 that is a roll-shaped sponge body impregnated with ink (the ink remains liquid at the room temperature), the film 2 covering the ink holder 3, and a hollow rotating shaft 304 that supports the ink holder 3 from the interior. As in the first embodiment, the film 2 includes a material that allows the permeation of the ink when heated to a predetermined temperature or higher while preventing the permeation of the ink at the room temperature. A heater 305 (described below) is provided inside the rotating shaft 304. The arrangement of the platen roller 8 and thermal head 7 is the same as in the first embodiment.

Figure 18:
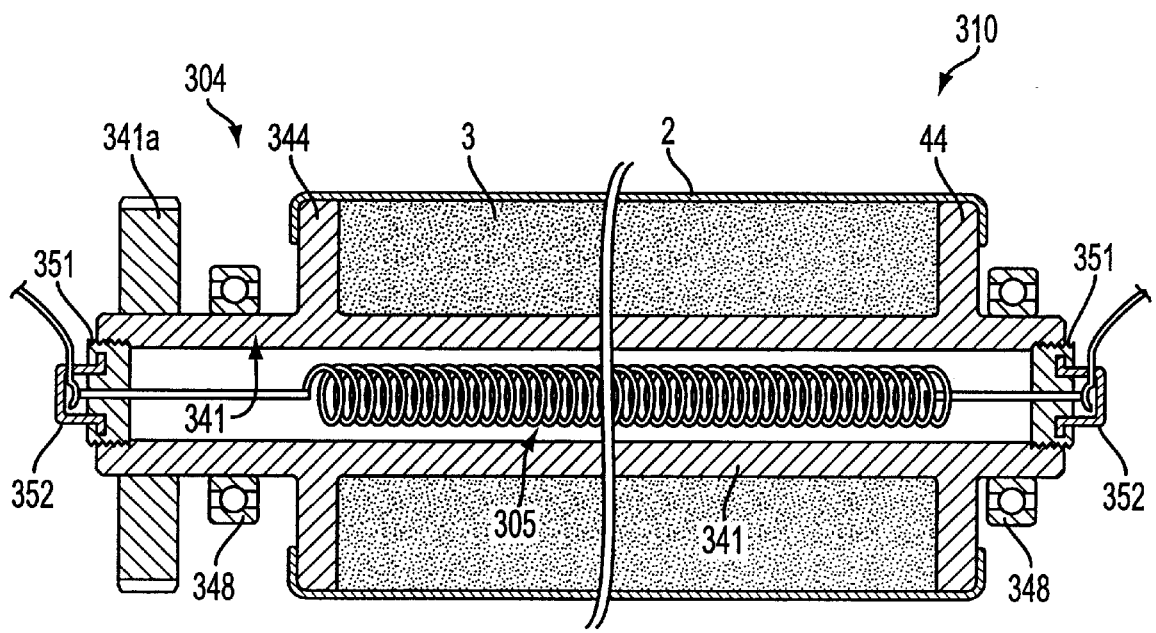
FIG. 18 is a sectional view showing the arrangement of an ink roller in FIG. 17.

FIG. 18 is a sectional view showing the ink roller 310. As shown in FIG. 18, the rotating shaft 304 includes a cylindrical portion 341 rotatably supported by a radial bearing 348, and a pair of flanges 344 mounted on the cylindrical portion 341 at a predetermined interval in the axial direction. The ink holder 3 is a roll-shaped sponge body and is supported between the pair of flanges 344. The outer circumference of the ink holder 3 is covered with the film 2 and both axial ends of the film 2 are fixed to the end surface of the flange 344. In addition, a gear 341a for rotationally driving the ink roller 310 is fixed to one end of the cylindrical portion 341.

The heater 305 (heating means for heating the ink holder 3) is provided in the cylindrical portion 341 of the rotating shaft 304. The heater 305 includes a heating wire, both of which are connected to the respective ends of the cylindrical portion 341 via a pair of caps 351. Each cap 351 includes a socket 352 that supplies power to the heater 305 and that can be freely rotated relative to the cap 351. Instead of the heating wire, a heating lamp such as a halogen lamp can be used as the heater 305.

In the ink transfer printer of this arrangement, since the ink in the ink holder 3 is heated by the heater 305, the fluidity of the ink impregnated in the ink holder 3 can be improved to uniformize the density of the ink in the ink roller. Consequently, the density of the ink transferred to the recording sheet can be uniformized to prevent a non-uniform printing density. In addition, the presence of the heater 305 inside the rotating shaft 304 minimizes the permeation of heat from the heater 305 to the film 2.

Figure 19:
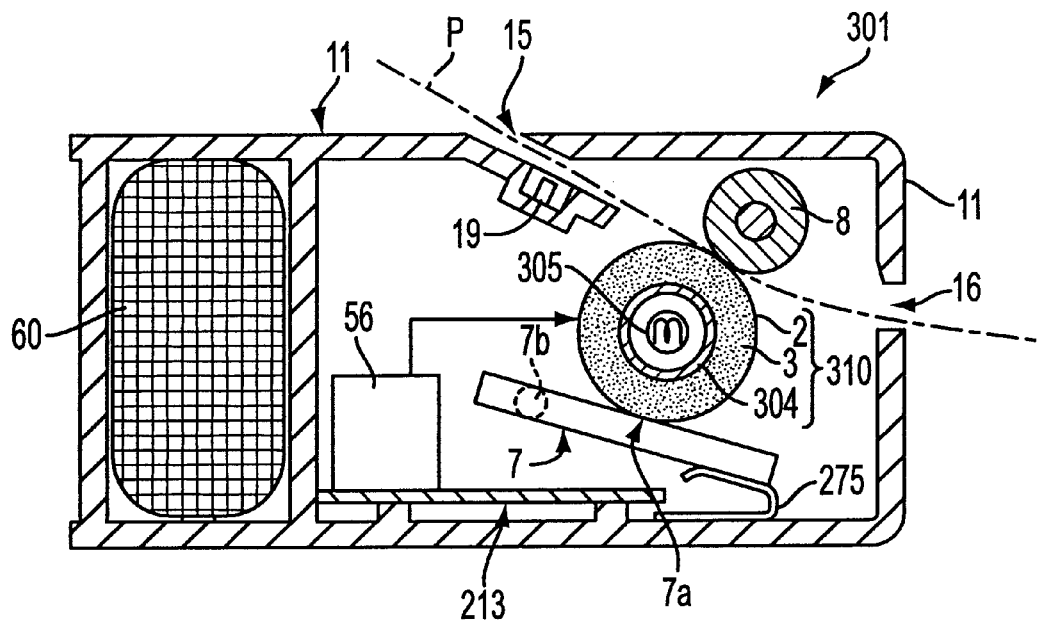
FIG. 19 is a side sectional view showing the basic arrangement of a line printer to which the ink transfer printer in FIG. 17 is applied.

A line printer employing the ink transfer printer according to the third embodiment is described. FIG. 19 is a side sectional view showing the internal structure of the line printer. A line printer 301 includes the above described ink roller 310 having the heater 305 instead of the ink roller 210 in the line printer 201 according to the second embodiment.

Figure 20:
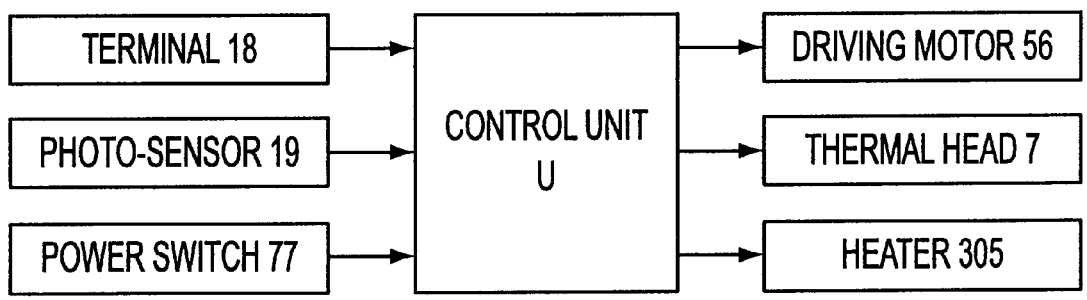
FIG. 20 is a block diagram showing a control system for the line printer in FIG. 19.

FIG. 20 is a block diagram showing a control system for the line printer 1. The control unit U receives print information from the terminal 18 connected to a computer, signals from the photosensor 19 for detecting the recording sheet P and signals from the power switch 77. The control unit U controls the driving of the drive motor 56, activates the heater 305 and controls the thermal head 7 based on print information. The heating temperature of the heater 305 is set sufficiently lower than that of the heating elements 7a in the thermal head 7, so that there is no possibility that unintentional connected pores are formed on film 2 by the heat from the heater 305.

The operation of the line printer 1 of this arrangement is described below.

As shown in FIG. 19, the recording sheet P is inserted through the inlet opening 15 of the line printer 1 and guided along the guide slope between the ink roller 310 and the platen roller 8. When the recording sheet P is detected by the photosensor 19, the control unit U (FIG. 20) drives the drive motor 56 to rotate the ink roller 310 at a predetermined speed and starts printing control to heat the heating elements 7a on the thermal head 7 based on print information.

The heater 305 in the ink roller 310 has already been activated and had the temperature thereof increased up to a predetermined value. Thus, the fluidity of the ink impregnated in the ink holder 3 has been improved to uniformize the density of the ink in the ink roller 310.

The recording sheet P is fed by the rotation of the ink roller 310 while being pressed between the ink roller 310 and the platen roller 8 at a predetermined pressure. Ink spots formed on the surface of the film 2 on the ink roller 310 according to print information are transferred to the recording sheet P to form an image thereon. The recording sheet that has undergone transfer is discharged from the discharge opening 16. Since the heating of the heater 305 uniformizes the density of the ink in the ink roller 310 in this manner, the density of the ink transferred to the recording sheet P (that is, the printing density) is also uniformized to prevent a non-uniform printing density.

Figure 21:
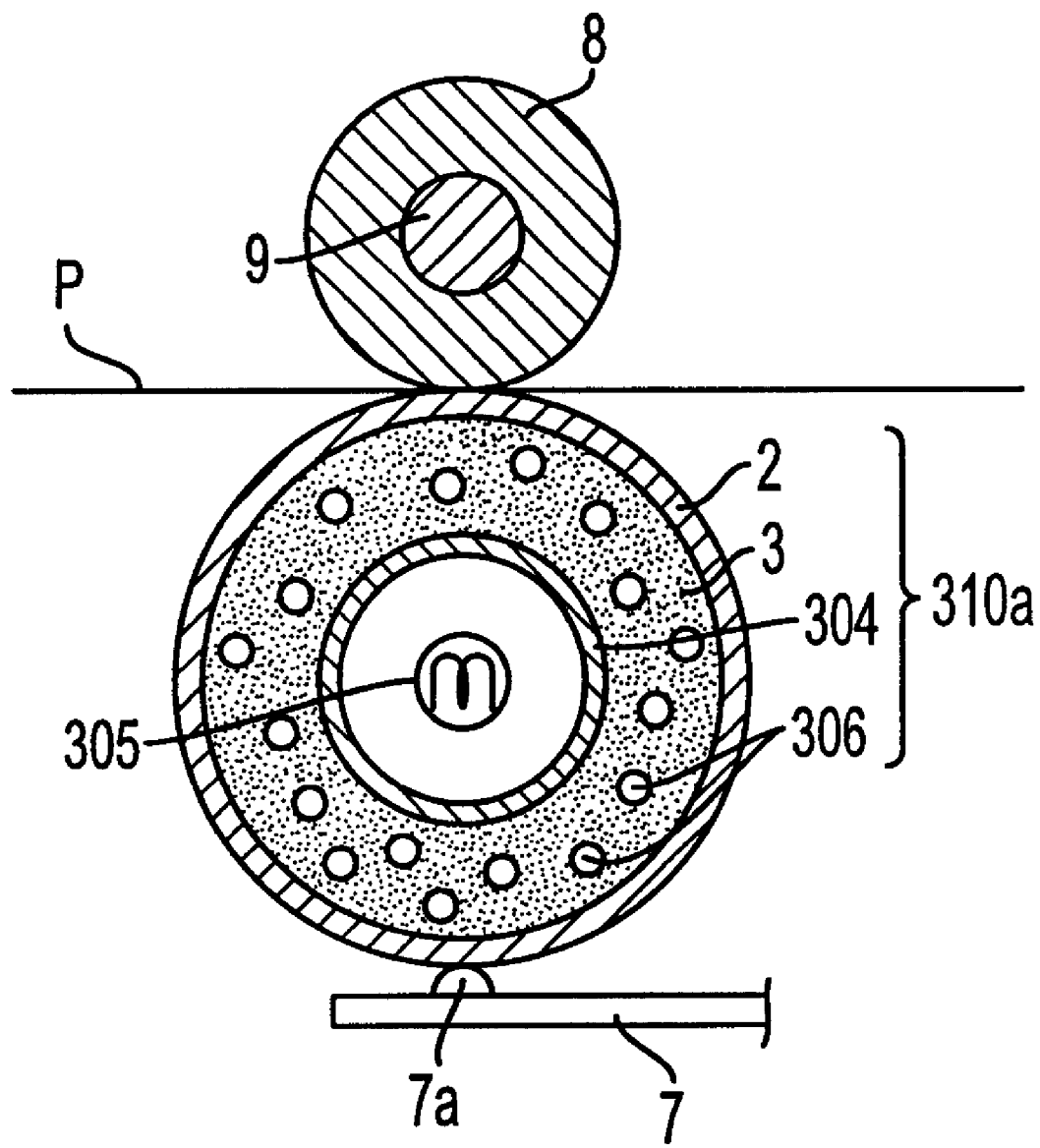
FIG. 21 is a side sectional view showing the ink transfer printer according to a variation of a third embodiment.

FIG. 21 shows a variation of the third embodiment. In this variation, hollow particles 306 with a diameter of several millimeters are dispersed in the ink holder 3 in an ink roller 310 similar to the ink roller 310 in the third embodiment. The hollow particle 306 is a spherical particle with a gas sealed in an elastic outer shell and is expanded like a balloon due to the expansion of air when heated. When the heater 305 is heated, the hollow particles 306 dispersed in the ink holder 3 are expanded to uniformly pressurize the ink. The increase in temperature and the pressurization associated with the expansion of the hollow particles 306 further increase the fluidity of the ink in the ink roller 310. This arrangement can uniformize the density of the ink in the ink roller and thus the density of the ink transferred to the recording sheet P (that is, the printing density).

The ink transfer printer according to a fourth embodiment of the present invention is described.

Figure 22:
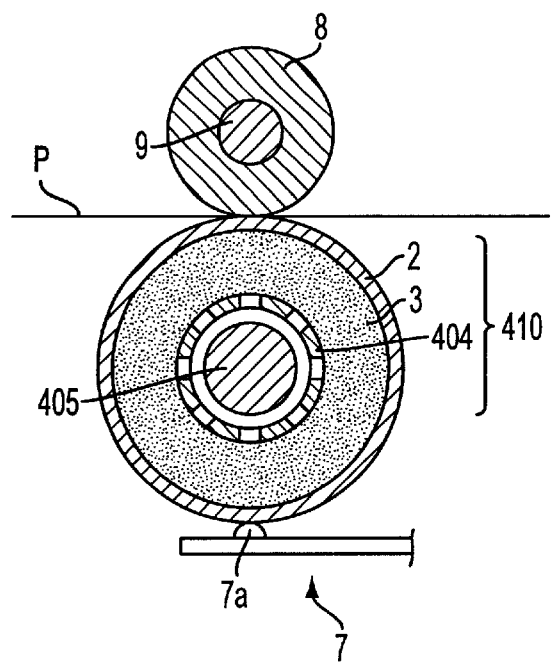
FIG. 22 is a side sectional view showing the basic arrangement of the ink transfer printer according to a fourth embodiment of the present invention.

FIG. 22 shows the basic arrangement of the ink transfer printer according to the fourth embodiment. The ink transfer printer includes an ink roller 410 and the platen roller 8 faced to each other via the recording sheet P sandwiched therebetween and the thermal head 7 for partially heating the circumferential surface of the ink roller 410.

The ink roller 410 includes the ink holder 3 that is a roll-shaped sponge body impregnated with ink, the film 2 covering the ink holder 3, and a hollow rotating shaft 404 that supports the ink holder 3 from the interior thereof. As in the first embodiment, the film 2 includes a material that allows the permeation of the ink when heated to a predetermined temperature or higher while preventing the permeation of the ink at the room temperature. In addition, a rotating shaft 404 is rotatably supported by a supporting shaft 405 inserted into the center of the rotating shaft 404. The arrangement of the platen roller 8 and thermal head 7 is the same as in the first embodiment.

Figure 23:
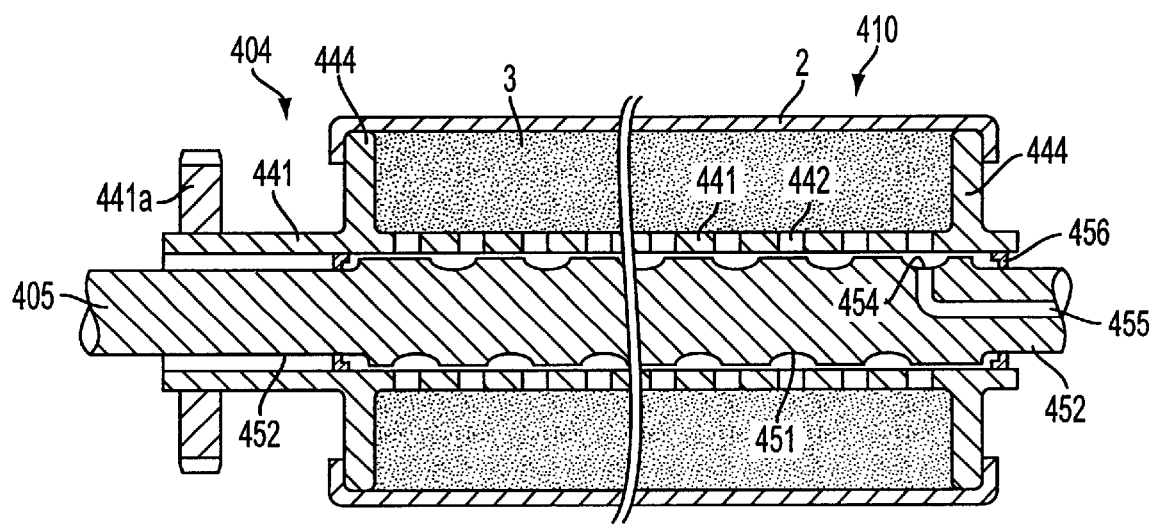
FIG. 23 is a sectional view showing the arrangement of an ink roller in FIG. 22.

FIG. 23 is a sectional view showing the ink roller 10 and the supporting shaft 5. As shown in FIG. 23, the rotating shaft 404 includes a cylindrical portion 441 rotatably provided on the outer circumferential surface of the supporting shaft 405, and a pair of flanges 444 mounted on the cylindrical portion 441 at a predetermined interval in the axial direction. The inner circumferential surface of the cylindrical portion 441 of the rotating shaft 404 includes a sliding surface that slides over the outer circumferential surface of the supporting shaft 405 so that the rotating shaft 404 can be rotated relative to the fixed supporting shaft 405.

The ink holder 3 is supported between the pair of flanges 444 and the film 2 is installed on the outer circumferential surface of the ink holder 3, with both axial ends of the film 2 fixed to the respective end surface of the flange 444. A gear 441a for rotationally driving the ink roller 410 is fixed to one end of the cylindrical portion 441.

Figure 24:
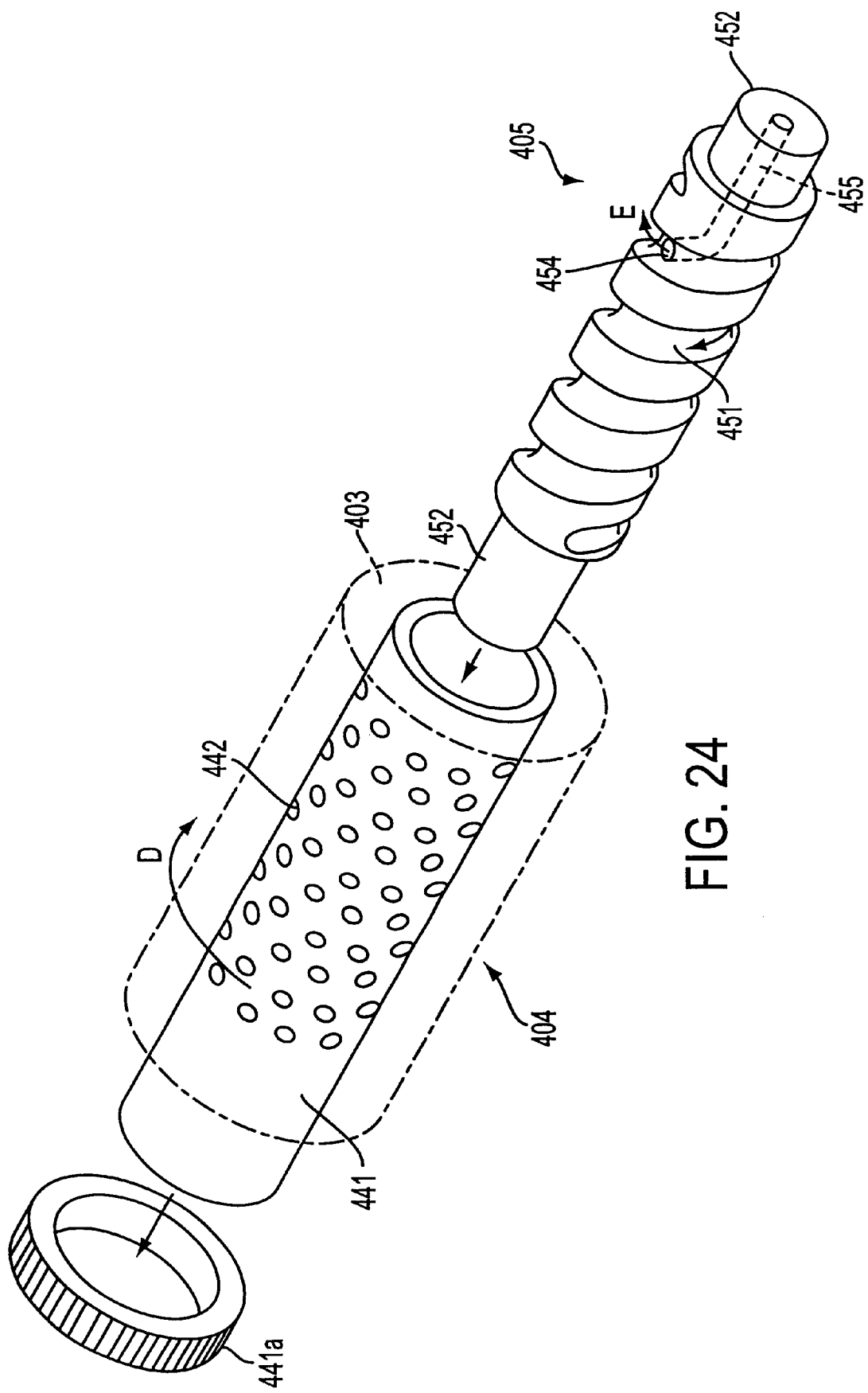
FIG. 24 is an exploded perspective view showing the arrangement of a rotating and supporting shafts of the ink roller in FIG. 23.

FIG. 24 is an exploded perspective view showing the ink transfer roller 410. As shown in FIG. 24, a spiral groove 451 is formed in the outer circumferential surface of the supporting shaft 405. An ink passage 455 connected to an ink source (not shown) is formed inside the supporting shaft 405 and has an opening 454 at one end of the groove 451. A large number of openings 442 that allow the ink to flow from the supporting shaft 405 to the ink holder 3 are formed in the cylindrical portion 441 of the rotating shaft 404. When the rotating shaft 404 is rotated around the supporting shaft 405 in the direction shown by arrow D in the figure, the ink supplied from the ink passage 455 to the spiral groove 451 around the supporting shaft 405 flows along the spiral groove 451 in the direction shown by arrow E in the figure. That is, the ink is uniformly guided in the axial direction of the ink roller 410 and supplied to the ink holder 3 (shown by a double-dashed line) through the openings 442 formed in the cylindrical portion 441 of the rotating shaft 404. Thus, the ink is uniformly supplied in the axial direction of the ink roller 410.

As shown in FIG. 23, both axial ends 452, 452 of the supporting shaft 405 are formed so as to have a smaller diameter by a predetermined length than the center portion of the supporting shaft 405 and the ends 452, 452 include an oil seal 456 for preventing the ink leakage from the ink roller 10.

In the ink transfer printer of this arrangement, when the rotating shaft 404 is rotated around the supporting shaft 405 in the direction shown by arrow D in the figure, the ink supplied from the ink passage 455 to the spiral groove 451 in the supporting shaft 405 flows along the spiral groove 451 in the direction shown by arrow E in the figure and is supplied to the ink holder 3 (shown by a double-dashed line) through the openings 442 in the cylindrical portion 441, as shown in FIG. 24. Thus, the ink is uniformly supplied in the axial direction of the ink roller 410.

As described above, since the ink is uniformly supplied in the axial direction of the ink roller 410, the density of the ink can be uniformized, even in a portion in which large amount of ink is consumed and a portion in which small amount of ink is consumed. Further, since an internal pressure can be applied to the ink holder by supplying the ink, the flow of the ink toward the surface of the roller is facilitated, thereby preventing a non-uniform printing density.

Figure 25:
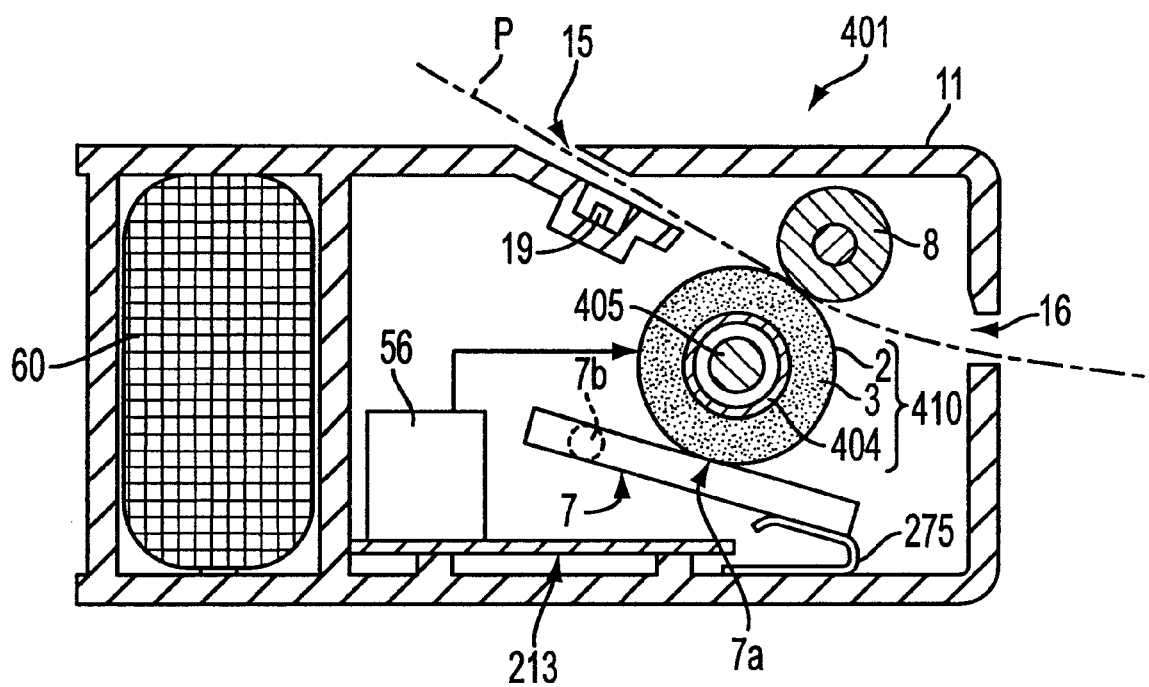
FIG. 25 is a side sectional view showing the basic arrangement of a line printer to which the ink transfer printer in FIG. 22 is applied.

A line printer employing the ink transfer printer according to the fourth embodiment is described. FIG. 25 is a side sectional view showing the internal structure of the line printer. A line printer 401 includes the ink roller 410 instead of the ink roller 210 in the line printer 201 of the second embodiment.

The recording sheet P is inserted through the inlet opening 15 of the line printer 1 and guided along the guide slope between the ink roller 10 and the platen roller 8. When the recording sheet P is detected by the photosensor 19, the control unit U (not shown) drives the drive motor 56 to rotate the ink roller 10 at a predetermined speed and controls the heating of the heating elements 7a on the thermal head 7 according to print information. While being pressed between the ink roller 410 and the platen roller 8 at a predetermined pressure, the recording sheet P is fed by the rotation of the ink roller 410. The heating of the thermal head 7 causes ink spots S (FIG. 5) to be formed on the surface of the film 2 on the ink roller 410 and the ink spots S are transferred to the recording sheet P. As a result, an ink image is formed on the recording sheet.

Then, as shown in FIG. 24, the rotating shaft 404 of the ink roller 410 is rotated relative to the supporting shaft 405 to supply the ink from the ink passage 455 to the spiral groove 451 around the supporting shaft 405. The ink further flows along the spiral groove 451 in the direction shown by arrow E in the figure and is uniformly distributed in the axial direction of the ink roller 410 and supplied to the ink holder 3 through the openings 442 of the cylindrical portion 441.

A variation of the fourth embodiment is explained.

Figure 26:
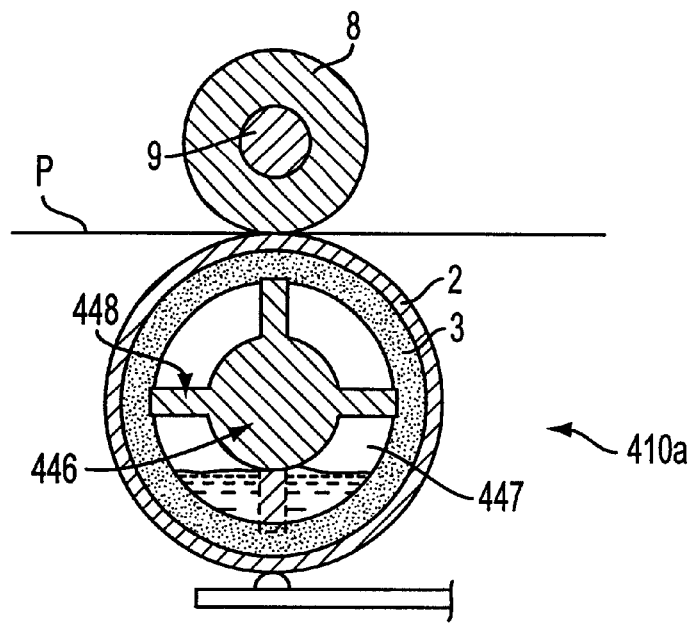
FIG. 26 is a side sectional view showing the ink transfer printer according to a variation of the fourth embodiment.

FIG. 26 shows the ink transfer printer according the variation of the fourth embodiment. An ink roller 410a according to this variation includes an ink holder 3 and a film 2 similar to the ink holder 3 and the film 2 in the first embodiment, and a hollow portion 447 inside the ink holder 3 in which ink is collected.

Figure 27:
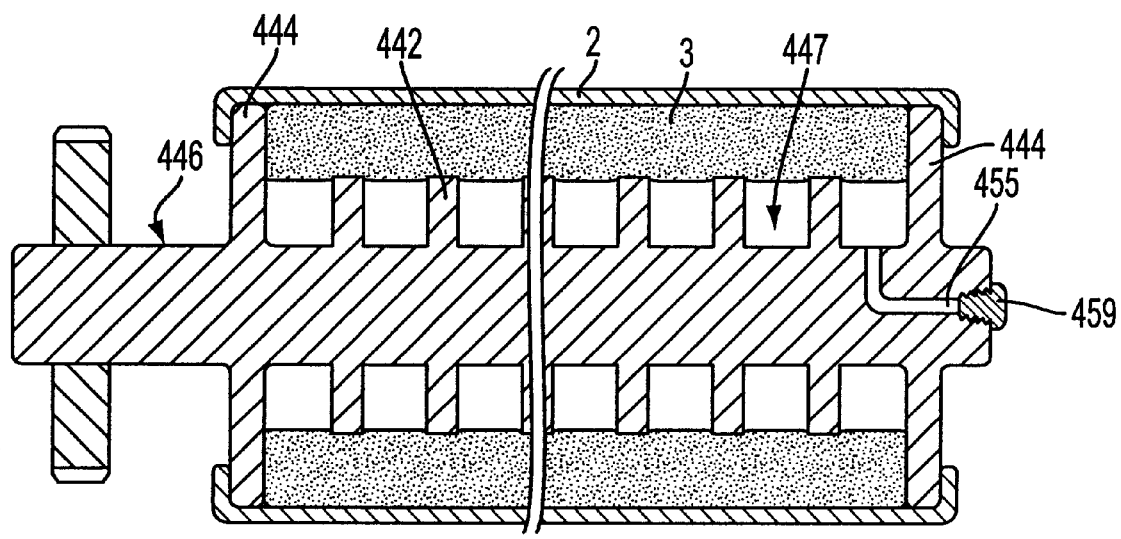
FIG. 27 is a sectional view showing the arrangement of an ink roller in FIG. 26.

FIG. 27 is a side sectional view of the ink roller 410a. Unlike the fourth embodiment, this variation uses a rotating shaft 446 rotatably supported by a bearing (not shown). A pair of flanges 444 are mounted on the rotating shaft 446 at a predetermined interval in the axial direction, with the ink holder 3 supported between the pair of flanges 444. Furthermore, a plurality of struts 442 are planted on the rotating shaft 446 at an interval in the circumferential direction. The struts 442 extend in the radial direction thereby to support the ink holder 3. Thus, the hollow portion 447 is formed between the rotating shaft 446 and the ink holder 3 and the flanges 444.

An ink passage 455 is formed inside the rotating shaft 446 and opened into the hollow portion 447. A cap 459 is attached to the ink passage 455. When the cap 459 is removed, it is possible to supply the ink to the hollow portion 447 using a syringe or the like. The ink passage 455 may be connected to an ink source (not shown) to constantly supply ink.

According to the ink transfer printer of this arrangement, since the level of a pool of ink in the hollow portion 447 is maintained horizontal due to gravity, the density of the ink is uniformized in the axial direction of the ink roller also disposed horizontally. Thus, as in the fourth embodiment, the density of the ink can be uniformized even in a portion in which large amount of ink is consumed and a portion in which small amount of ink is consumed, thereby preventing a non-uniform printing density.

The ink transfer printer according to a fifth embodiment of the present invention is described.

Figure 28:
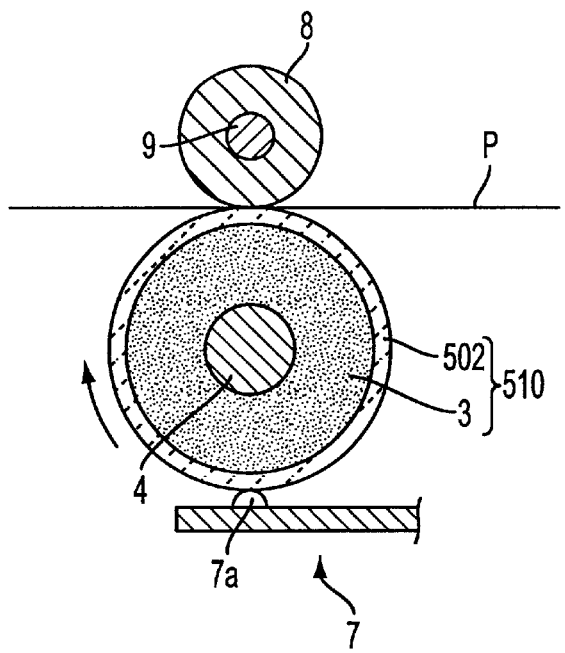
FIG. 28 is a side sectional view showing the basic arrangement of the ink transfer printer according to a fifth embodiment of the present invention.

FIG. 28 is a side sectional view showing the basic arrangement of the ink transfer printer according to the fifth embodiment. This ink transfer printer uses an ink roller 510 comprising the porous roller 3 covered with a porous film 502 formed of resin that can be reversibly converted between hydrophilicity and hydrophobicity by heat. The porous roller 3 is impregnated with an aqueous liquid ink. The film 502 includes a shape memory resin which exhibits different characteristics above/below the glass transition temperature. For example, the film 502 can be made of a resin consisting of polynorbornene, trans-1,4-polyisoprene, polyurethane or the like. In this embodiment, a polyurethane resin (which is low cost and has excellent moldability) is used.

Figure 29:
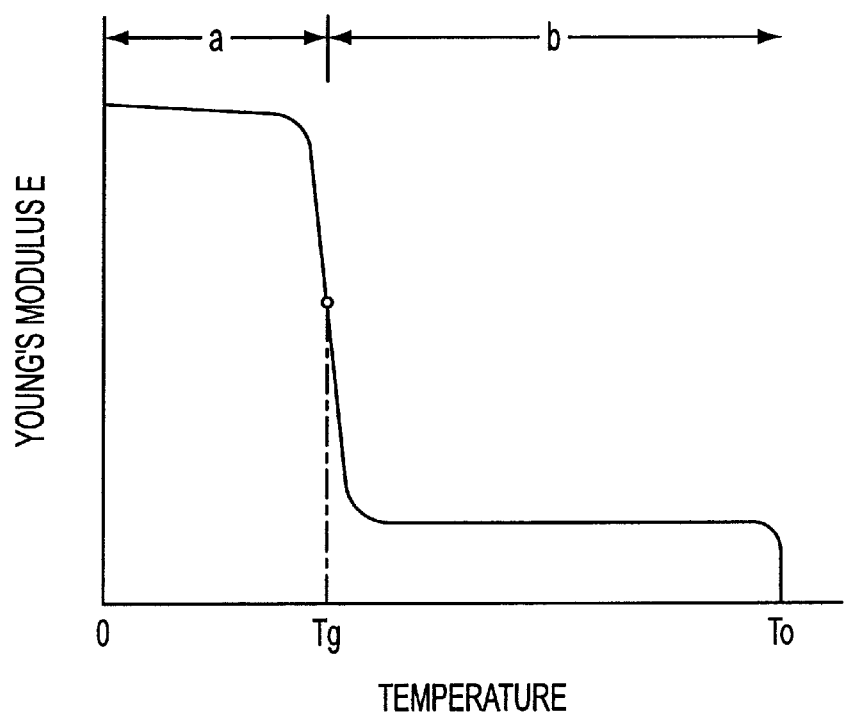
FIG. 29 is a graph showing the relationship between the temperature and Young's modulus of a shape memory resin.

FIG. 29 shows the relationship between the temperature and Young's modulus of the shape memory resin. The shape memory resin exhibits rubber elasticity above the glass transition temperature Tg due to the active micro-Brownian motion of molecular chains (region (b)), whereas it exhibits the glassy state below the glass transition temperature Tg due to the freezing of micro-Brownian motion (region (a)). That is, the shape memory resin can be arbitrarily deformed by heating it above the glass transition temperature Tg and its shape can be fixed by cooling it below Tg. The shape memory resin can then be recovered to its original shape by again heating it to Tg or higher. In this embodiment, the range of the glass transition temperature Tg is between −30° C. and 70° C.

According to the change between the rubber state and the glassy state, the polarity (hydrophilicity/hydrophobicity) of the shape memory resin also changes. That is, the shape memory resin is hydrophilic in the rubber state (region (b)), whereas it is hydrophobic in the glassy state (region (a)). In addition, the film is reversibly converted between hydrophilicity and hydrophobicity.

Figure 30A:
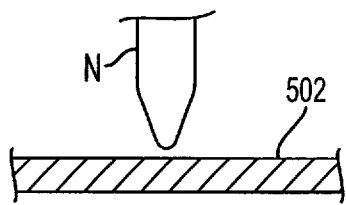
FIGS. 30A, 30B, 30C and 30D are schematic drawings showing a method for forming pores in a film.
Figure 30B:
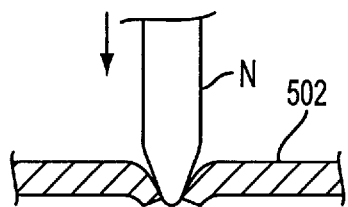
Figure 30C:
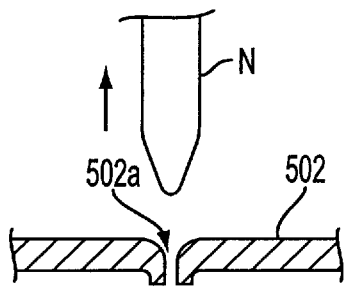
Figure 30D:
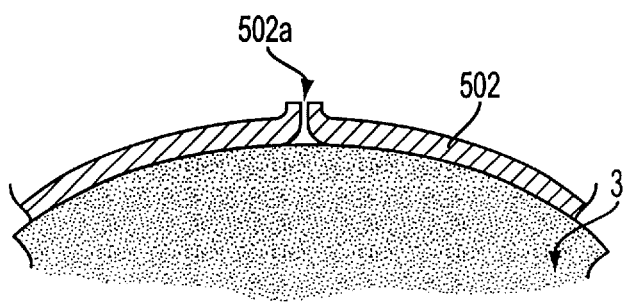

The film 502 formed of such a shape memory resin has a large number of pores formed therein to allow the permeation of the ink. A pore 2a is formed by sticking a needle N into the film 502, as shown in FIGS. 30A and 30B while the film 502 is heated above the glass transition temperature Tg (that is, the film is in the rubber state). When the needle N is removed from the film 502 as shown in FIG. 30C, the pore 2a contracts due to the rubber elasticity of the film 502. The film 502 formed in this manner is wound around the porous roller 3 in such a manner that the side of the film which is raised due to the sticking of the needle N is located outside, as shown in FIG. 3D. This embodiment is not limited to this arrangement and any pore may be used as long as the inner diameter of the pore 2a is set so that liquid ink (aqueous) permeate therethrough when the film 502 is hydrophilic while the liquid ink do not permeate therethrough when the film 502 is hydrophobic.

As shown in FIG. 28, the ink roller 510 is rotatably supported by the supporting shaft 4 and rotated by a rotating mechanism (not shown) in the direction shown by the arrow in the figure. The platen roller 8 having a rubber surface is disposed above the ink roller 510 so as to press the recording sheet P between the platen roller 8 and the ink roller 510. The thermal head 7 is provided below the ink roller 510 to heat the film 502 according to print information. The thermal head 7 includes the heating elements 7a arranged in a line in the direction perpendicular to the direction of the sheet of the drawing so as to be in contact with the film 502.

Since a certain pressure is applied to the film 502 when the thermal head 7 heats the surface of the film 502, the porous roller 3 is formed of a porous material having a certain strength, such as a honeycomb ceramic. The film 502 is formed so as to have a thickness of about 80 É m.

Since the shape memory resin of the film 502 is hydrophobic below the glass transition temperature Tg as described above, the ink contained in the porous roller 3 is prevented from being transmitted through the film 502 to the outer surface of the ink roller 510 at the room temperature.

FIGS. 31A to 31D are schematic drawings showing the principle of the operation of the ink transfer printer. The film 502 is shown with its thickness enlarged and only one pore 502a is shown. When the surface of the film 502 of the ink roller 510 is heated above the glass transition temperature Tg by the thermal head 7, the heated part of the film 502 is converted from hydrophobicity to hydrophilicity, allowing the aqueous ink to permeate through the pore 502a. Furthermore, since the heating causes the ink to be locally vaporized (shown at V in the figure), the vapor pressure biases the ink toward the exterior of the film 502, thereby facilitating the permeation of the ink (FIG. 31A).

The ink transmitted through the pore 502a in the film 502 reaches the outer surface of the film 502, as shown in FIG. 31B. As the ink roller 510 is further rotated and the heated part of the film 502 is cooled to the room temperature, the polarity of the film changes from hydrophilicity to hydrophobicity, preventing the permeation of the ink through pore 502a. The vapor pressure, which has been generated by the local vaporization of the ink, disappears because the ink is again liquefied. As a result, the ink that has been transmitted through the pore 502a and reached the outer surface of the film 502 left thereon like a stain, thereby to form an ink spot (a fine pool of ink) S as shown in FIG. 31C.

The ink spot S remaining on the surface of the film 502 is pressed between the ink roller 510 and the platen roller 8 and transferred to the recording sheet P, as shown in FIG. 31D. The film 502 has already become hydrophobic, so the ink leaves the surface of the film well. The ink is transferred in this manner to form an ink image on the recording sheet P.

The ink is collected at the bottom of the porous roller 3 due to gravity. Thus, by providing the thermal head 7 below the ink roller 510, the ink can permeate through the pore (heated by the thermal head 7) in the film 502 heated by the thermal head 7 as long as the ink remains in the porous roller 3.

In this manner, the printer according to the fifth embodiment is arranged to transfer the ink to the recording sheet P by using the film 502 which hydrophilicity/hydrophobicity can be converted in order to selectively transmit the aqueous ink impregnated in the porous roller 3. With this arrangement, the clogging of the ink (as in ink jet printers) is prevented as well as noises (as in wire dot printers). Since the ink roller can be used until the ink contained in the porous roller has been used up, the printer of this embodiment is efficient compared to the ink ribbons, thereby improving running costs.

There is one type of shape memory resin that, when in the rubber state, liquid molecule can permeate through the gaps among the molecules of the resin, and when in the glassy state, the gaps among the molecules are contracted to prevent the permeation of the liquid molecules (Japanese Patent Application Laid-Open No. 8-49960). If a film 502 is made of such a shape memory resin, it is not necessary to form pores 502a. Thus, the ink transfer printer can be configured more easily. A specific example of the shape memory resin is Diary MS5500 (trademark) manufactured by Mitsubishi Juu Kogyo Kabushiki Kaisha.

The ink transfer printer according to the fifth embodiment can be applied to the color printer according to the first embodiment (FIGS. 6 to 10).

A variation of the fifth embodiment of the present invention is described.

Figure 32:
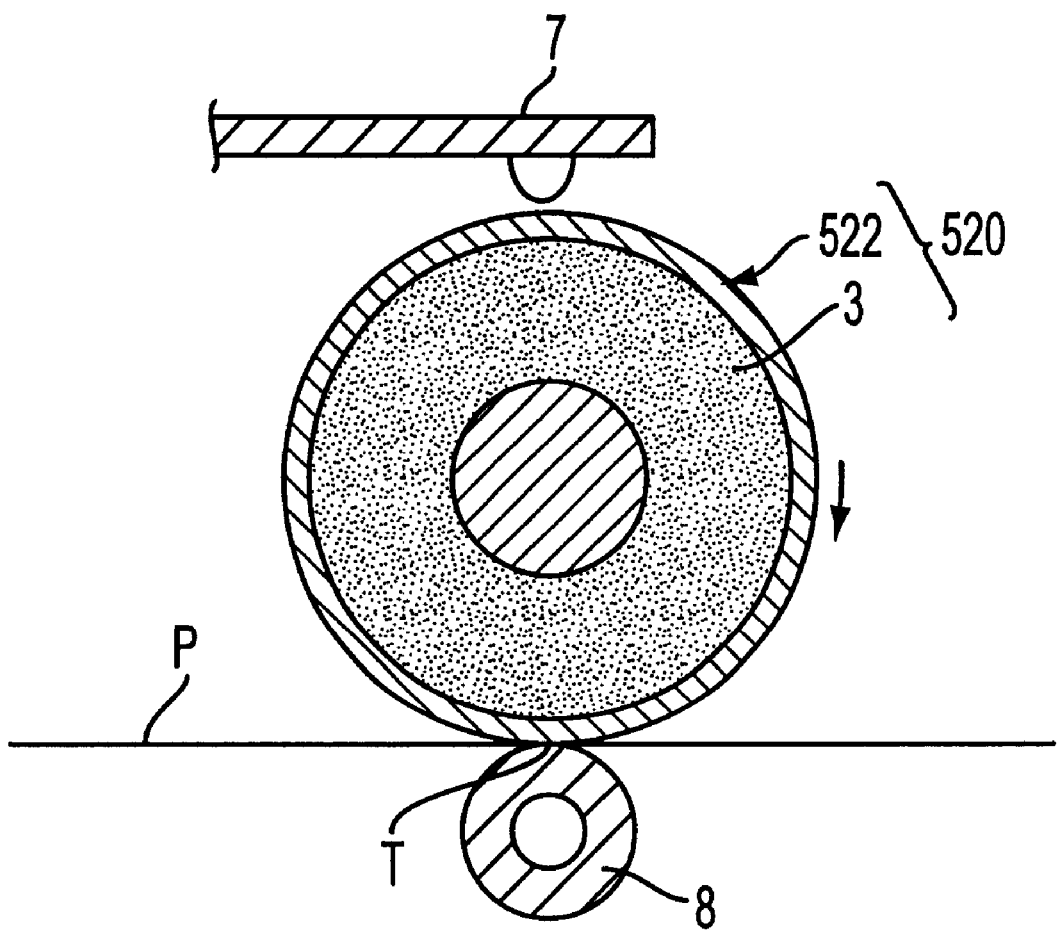
FIG. 32 is a side sectional view showing the basic arrangement of the ink transfer printer according to a variation of the embodiment.

FIG. 32 shows the basic arrangement of the ink transfer printer according to a variation of the fifth embodiment. As shown in this figure, this variation includes the thermal head 7 and the platen roller 8 that are the same as in the fifth embodiment but that have an inverse locational relationship. That is, in the variation, the thermal head 7 is disposed above the ink roller 510 while the platen roller 8 is disposed above the ink roller 510.

In addition, a film 522 in this variation includes a material similar to that of the film 502 in the fifth embodiment and has a larger thickness than the film 502. Thus, although in the fifth embodiment, the hydrophilic part of the film 502 immediately returns to hydrophobicity after leaving the thermal head 7 (see FIG. 31C), in this variation, it takes an extra time to cool the film 522 due to its larger thickness. That is, in the second embodiment, the hydrophilic part of the film 522 returns to hydrophobicity when cooled by the ink permeating through the pore.

In the ink transfer printer of this arrangement, a hydrophilic part of the film 522 is formed at the top of the ink roller 510 by the heating of the thermal head 7 disposed above the ink roller 510. When the ink roller 510 is rotated and the hydrophilic part of the film 522 reaches the bottom of the ink roller 510, the ink permeates through the pore in the hydrophilic part of the film 522 and transferred to the recording sheet P. The ink transmitted through the pore cools the hydrophilic part of the film 522 to change its polarity to hydrophilicity, thereby to enable the next printing.

A second variation of the fifth embodiment is described. While the fifth embodiment uses heating to convert hydrophilicity/hydrophobicity of the film, this second variation uses light irradiation to convert hydrophilicity /hydrophobicity of the film.

Figure 33:
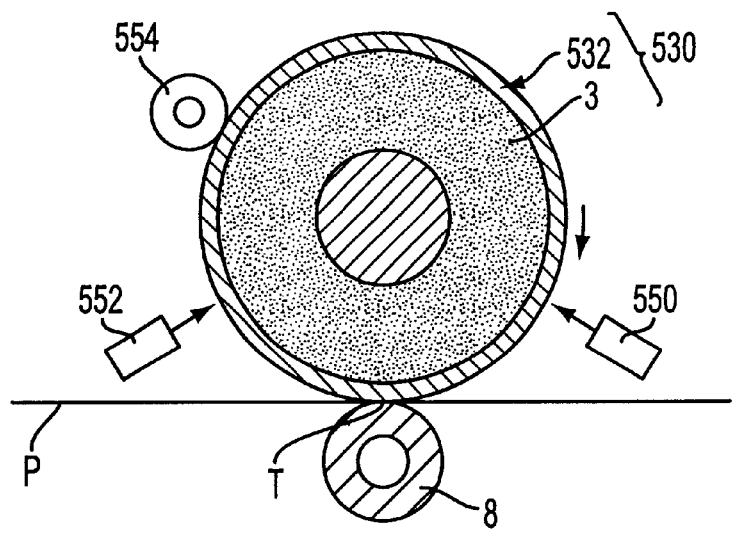
FIG. 33 is a side sectional view showing the basic arrangement of the ink transfer printer according to a second variation of the fifth embodiment.

FIG. 33 shows the basic arrangement of the ink transfer printer according to the second variation of the fifth embodiment. The ink transfer printer according to the second variation uses an ink roller 530 comprising the porous roller 3 covered with a porous film 532 formed of resin that can be reversibly converted between hydrophilicity and hydrophobicity by light irradiation. As in the fifth embodiment, the porous roller 530 is impregnated with an aqueous liquid ink.

The resin that can be reversibly converted between hydrophilicity and hydrophobicity by light irradiation is a macromolecule that includes a 2,3-epoxyindanone derivative as a light response group. Such a macromolecule becomes hydrophilic when irradiated with light with a wavelength of É . . . 1 while becoming hydrophobic when irradiated with light with a wavelength of É . . . 2. Such a macromolecule is publicly known material disclosed in Japanese Patent Application Laid-Open No. 8-156401.

A first irradiation device 550 for outputting light with a wavelength of É . . . 1 according to a print pattern, the platen roller 8 and a second irradiation device 552 for outputting light with a wavelength of É . . . 2 are installed along the direction in which the ink roller 530 is rotated (shown by the arrow in the figure).

When the first irradiation device 550 irradiates the ink roller 530 with light with a wavelength of É . . . 1 according to a print pattern, the irradiated part of the film 532 is changed from hydrophobicity to hydrophilicity. That is, the part corresponding to the print pattern are converted to hydrophilicity and allow the permeation of the ink. The ink permeated through the film 532 reaches the outer surface of the film 532 and is then pressed between the ink roller 530 and the platen roller 8 and transferred to the recording sheet P.

After the ink is transferred to the recording sheet P, the second irradiation device 552 irradiates the film with light with a wavelength of É . . . 2. With this, the part that has exhibited hydrophilicity (due to the irradiation from the first irradiation device 550) returns to hydrophobicity, which enables the next printing. The ink remaining on the ink roller 210 is removed by a cleaning roller 554 provided adjacent to the second irradiation device 552.

The ink is collected at the bottom of the porous roller 3 due to gravity. Thus, in case a transfer position T (the position at which the ink from the porous roller 3 is transmitted through the film 532 and transferred to the recording sheet P) is disposed at the bottom of the porous roller 3, the ink can be transferred to the recording sheet P until it has been completely exhausted. That is, the ink in the porous roller 3 can be used up.

Although the second variation uses an aqueous liquid ink, it may use an oil ink. In this case, it is necessary to exchange the wavelength to be used between the first and the second irradiation devices 550 and 552. That is, the first irradiation device 550 irradiates the film with light with a wavelength of É . . . 2 to transmit the oil ink according to the print pattern, whereas, after the ink is transferred to the recording sheet, the second irradiation device 552 irradiates the film with light with a wavelength of É . . . 1 to return the surface of the ink roller to hydrophilicity.

A third variation of the fifth embodiment is described.

Figure 34:
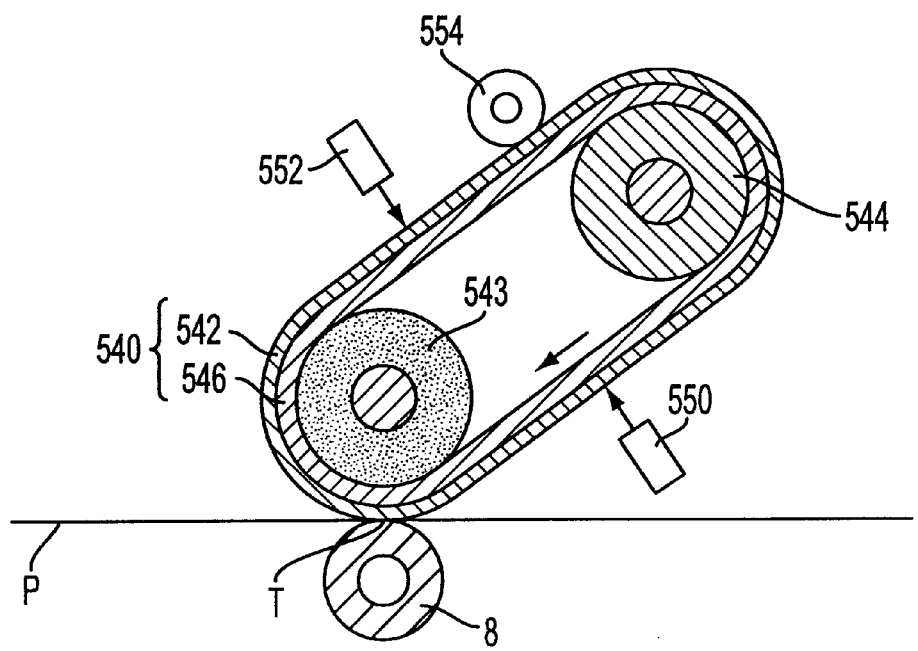
FIG. 34 is a side sectional view showing the basic arrangement of the ink transfer printer according to a third variation of the fifth embodiment.

FIG. 34 shows the basic constitution of the ink transfer printer according to a third variation of the fifth embodiment. This ink transfer printer uses an endless belt 540. The endless belt 540 is constituted by adhering a film 542 onto the outer surface of a belt-like supporting member 546 of porous resin. The film 542 is formed of resin that can be reversibly converted between hydrophilicity and hydrophobicity due to the light irradiation.

As in the second variation of the fifth embodiment, the film 542 according to the third variation is made of a material that becomes hydrophilic when irradiated with light of a wavelength of É . . . 1 while becoming hydrophobic when irradiated with light of a wavelength of É . . . 2. In addition, the belt-like supporting member 546 is formed of a material that allows the permeation of the ink. The endless belt 540 is provided around a pair of rollers and rotationally driven around them. One of the pair of rollers is a drive roller 544 for rotationally driving the endless belt 540 around the rollers, while the other is a porous roller 543 formed of a porous ceramic. The porous roller 543 is impregnated with an aqueous liquid ink.

The first irradiation device 550 for outputting light with a wavelength of É . . . . 1 according to a print pattern, the platen roller 8 and the second irradiation device 552 for outputting light with a wavelength of É . . . 2 are arranged along the driving direction (shown by the arrow in the figure) of the endless belt 540. The platen roller 8 is disposed in such a manner that the recording sheet P is sandwiched between the platen roller 8 and the porous roller 543 via the endless belt 540. When the first irradiation device 550 irradiates the endless belt 540 with light with a wavelength of É . . . 1, the irradiated part of the film 542 of the endless belt 540 is changed from hydrophobicity to hydrophilicity. That is, the part corresponding to the print pattern is converted to hydrophilicity. As the endless belt 540 is rotationally driven around the rollers and the hydrophilic part comes in contact with the porous roller 543, the ink contained in the porous roller 543 is transmitted through the endless belt 540. The ink transmitted through the endless belt 540 reaches the outer surface of the film 542 and is then pressurized between the ink roller 540 and the platen roller 8 and transferred to the recording sheet P.

After the ink is transferred to the recording sheet P, the second irradiation device 552 irradiates the film with light with a wavelength of É . . . 2. With this, the part (that has exhibited hydrophilicity due to the irradiation from the first irradiation device 550) returns to hydrophobicity for the next printing. As in the second variation, by disposing the transfer position T (the position at which the ink from the porous roller 542 permeate through the film 546 and transferred to the recording sheet P) at the bottom of the porous roller 542, the ink can be transferred to the recording sheet P until it has been exhausted. That is, the ink in the porous roller 542 can be used up.

In the ink transfer printer using the endless belt 540, since the film 542 may be as long as the endless belt 540, the outer diameter of the porous roller 546 may be small. Thus, if this embodiment is incorporated in a small printer, the freedom in positioning components can be increased to enable adaptation to various designs.

A sixth embodiment of the ink transfer printer according to the present invention is described below.

Figure 35:
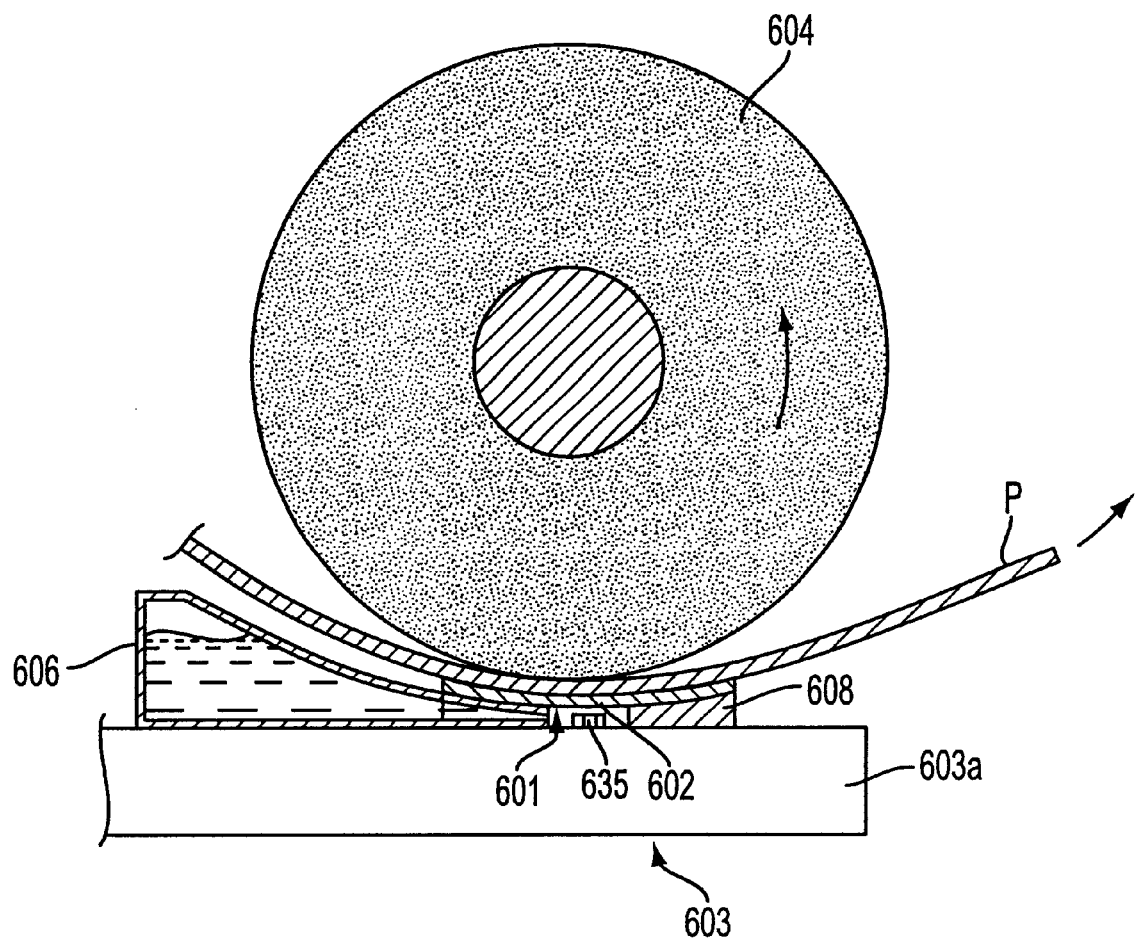
FIG. 35 is a side sectional view showing the basic arrangement of the ink transfer printer according to a sixth embodiment.

FIG. 35 is a side sectional view showing the basic arrangement of the ink transfer printer according to the sixth embodiment. The ink transfer printer includes a thermal line head 603 with a plurality of heating elements 635 arranged in the direction perpendicular to the sheet of the drawing; and a film 602 adhered to the thermal line head 603 via a spacer 608. There is a gap of about 0.1 mm between the thermal line head 603 and the film 602.

A case 603a of the thermal line head 603 and the spacer 608 is formed of a material that prevents the permeation of the ink. The area surrounded by the spacer 608, the case 3a of the thermal line head 603 and the film 602 forms an ink space 601 in which the ink is held. The film 602 is located at a small distance from the heating elements 635 on the thermal line head 603 or is in contact with the thermal line head 603.

The platen roller 604 is provided above the film 602 to adhere the recording sheet P to the top surface of the film 602. The platen roller 604 is a rubber roller and is disposed in such a manner that its axial direction is aligned with the direction in which the heating elements 635 of a thermal head 603 are arranged. The rotation of the platen roller 604 causes a traction between the platen roller and the recording sheet P, which feeds the paper P in the direction shown by the arrow in the figure.

FIG. 2 is an exploded perspective view showing an ink transfer printer without the platen roller 604. The spacer 608 is a thin plate such that surrounds the heating elements 635 arranged in a line and all the heating elements 635 are housed in the ink space 601. An ink reservoir 606 for supplying the ink in the ink space 601 is provided behind the spacer 608 (shown in the left of the figure) and the ink in the ink reservoir 606 is drawn to the ink space 601 through a supply hole 85 in the spacer 608 due to capillarity. The spacer 608 may be an adhesive.

A number of pores 625 are formed in a part of the film 602 so that the pores 625 are positioned above the heating elements 635. At the room temperature and the normal pressure, the size of the pore is such that the pore does not allow the permeation of the ink (liquid) and solvent vapor thereof. FIG. 3 shows the locational relationship between the pores 625 and the heating elements 635. In the direction in which the heating elements 635 are disposed (the main scanning direction: direction X), a plurality of pores 625 correspond to a single heating element 635. In addition, the pores 625 are staggered in the direction perpendicular to the above direction (the sub-scanning direction: direction Y).

It is preferable that the material of the film 602 has a certain elasticity and high abrasion and heat resistance and transferability. In this embodiment, polytetrafluoroethylene (Teflon (trademark)) is used. The film 602 has a thickness of 0.03 to 0.08 mm.

Figure 38A:
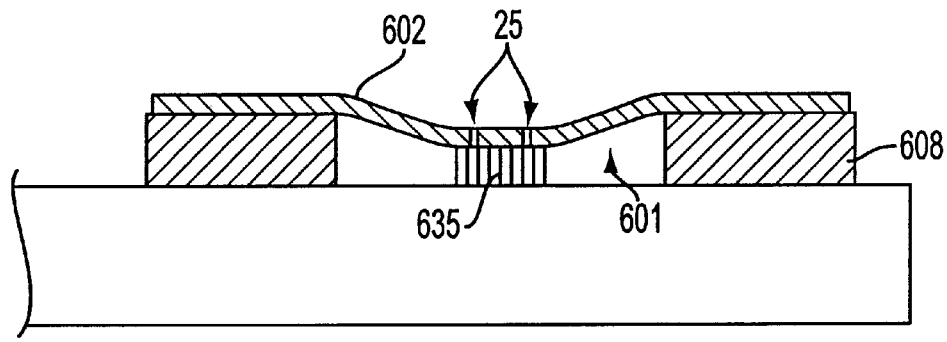
FIGS. 38A and 38B are schematic drawings showing the principle of the permeation of ink through the film.
Figure 38B:
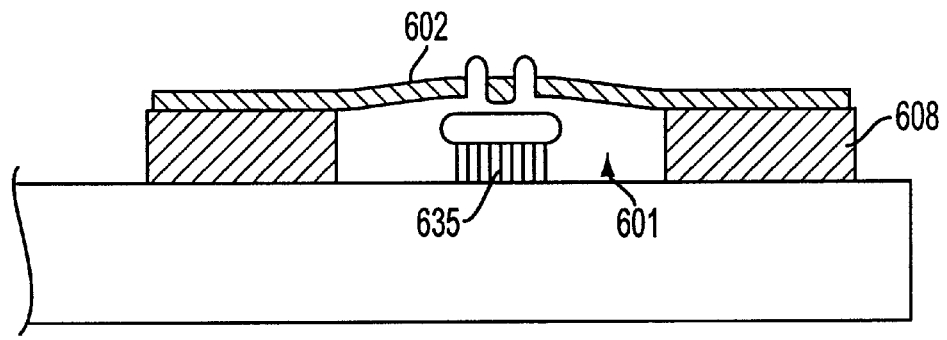

FIGS. 38A and 38B are image drawings showing the principle of printing by the ink transfer printer. In FIG. 38A, when the heating element 635 is heated, the ink near the heating element 635 and the film 602 generally in contact with the heating element 635 are heated. As shown in FIG. 38B, the heated ink is vaporized and expanded and this vapor pressure causes a local pressure on the ink. The elasticity of heated part of the film 602 is decreased. Thus, this pressure pushes the ink into the pore 625 of the film 602 and the pore 625 in the film 602 is widened. The ink permeate through the pore 625 in the film 602 and transferred to the recording sheet P (omitted in FIGS. 38A and 38B) at the top surface of the film 602. After the ink is transferred onto the paper P, the ink and the heated part of the film 602 are cooled by the surrounding ink, the pore 625 in the film 602 returns to its original size that prevents the permeation of the ink.

Thus, as shown in FIG. 35, a two-dimensional ink image can be formed on the recording sheet P by controlling the heating of the thermal line head 603 according to desired print information and also controlling the rotation of the platen roller 604 so as to feed the recording sheet P by one line.

In this manner, since the ink transfer printer according to the first embodiment is arranged to transfer the ink with the film 602 and the recording sheet P in contact with each other, the splashing of the ink (as in an ink jet printer with gaps between the nozzles and the recording sheet) is prevented. This prevents the decrease in the resolution associated with the splashing of the ink, thereby improving the resolution accordingly. In addition, it is easier to form pores 625 in the film 602 than to manufacture a nozzle of an ink jet printer. Thus, manufacturing costs can be reduced.

Figure 39:
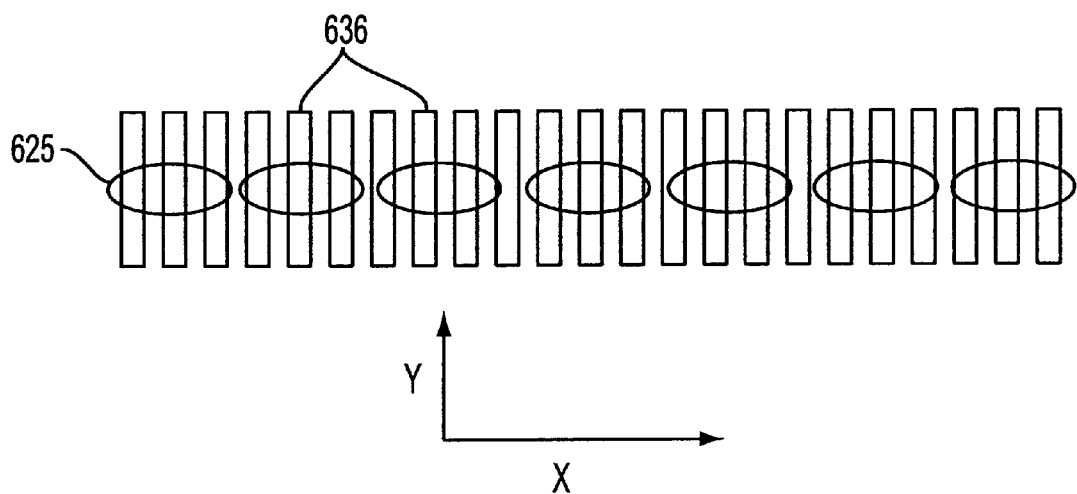
FIG. 39 shows heating elements in a thermal line head and pores in a film.

In addition, as shown in FIG. 39, a plurality of heating elements 635 correspond to a single pore 625 in the main scanning direction (direction X) and the pores 625 are staggered in the sub-scanning direction (direction Y). Thus, each heating element 635 can correspond to any of the pores 625 even if the film 602 is not accurately aligned with the thermal line head 603. Thus, the film 602 can be relatively roughly aligned with the thermal line head 603.

Furthermore, as the recording sheet P is fed, the shape of the pore 625 is deformed in such a manner that it becomes longer in the direction in which the recording sheet P is fed (the sub-scanning direction: direction Y) and the ink transferred from the film 602 to the recording sheet P trails in direction Y. As a result, the shape of ink dots on the recording sheet P tends to be longer in the direction Y. Thus, by forming the pores in the film 602 in such a manner that the pores are longer in the main scanning direction (direction X) as shown in FIG. 603, the deformation of ink dots caused by the deformation of the pores 625 and the trailing of the ink can be compensated.

As shown in FIG. 5, a plurality of heating elements 636 may also correspond to a single pore 625 in the main scanning direction (direction X). With this arrangement, the size of dots transferred to the recording sheet P can be varied. That is, it is possible to perform the tone control by changing the number of heating elements 636 (corresponding to a single pore 625 which are heated) to be heated. If the heating elements 635 in FIG. 3 are used, it is possible to perform the tone control (energy tone control) by varying heating energy (voltage or application time) to be applied to the individual heating elements 635.

Figure 36:
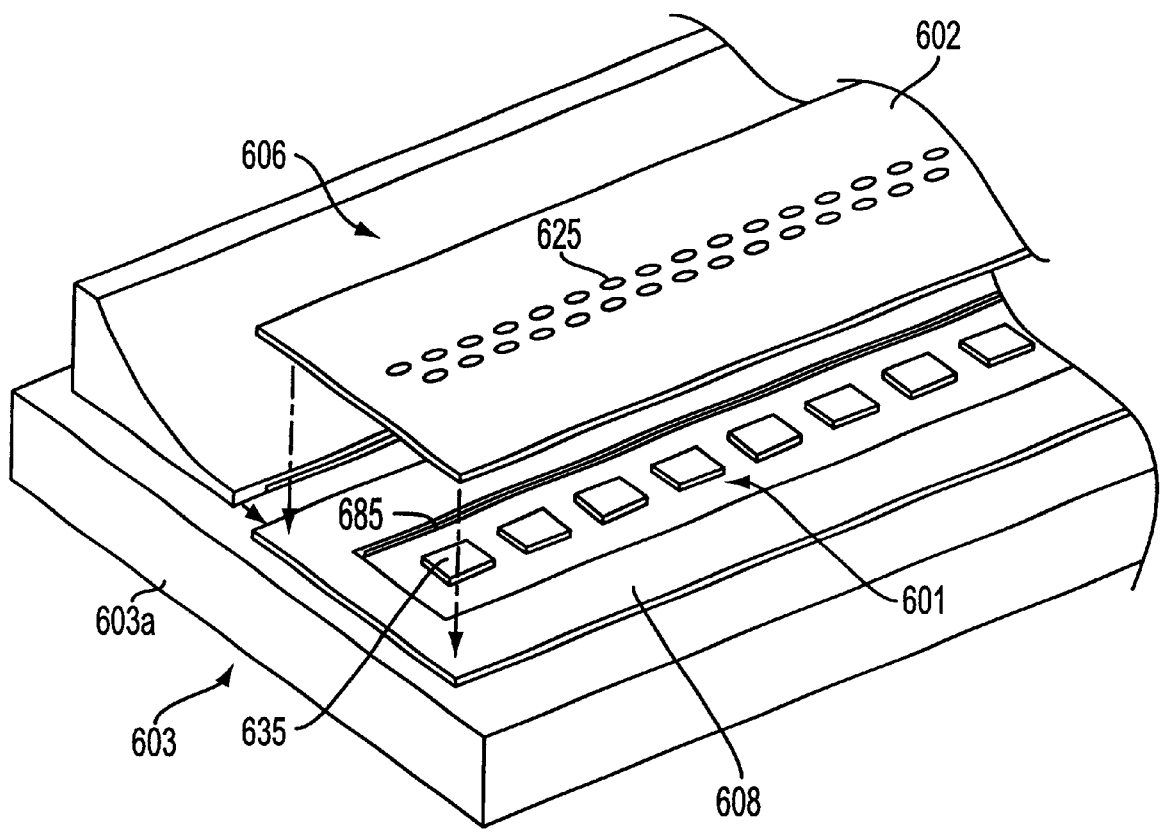
FIG. 36 is an exploded perspective view showing an ink transfer printer without a platen roller.
Figure 37:
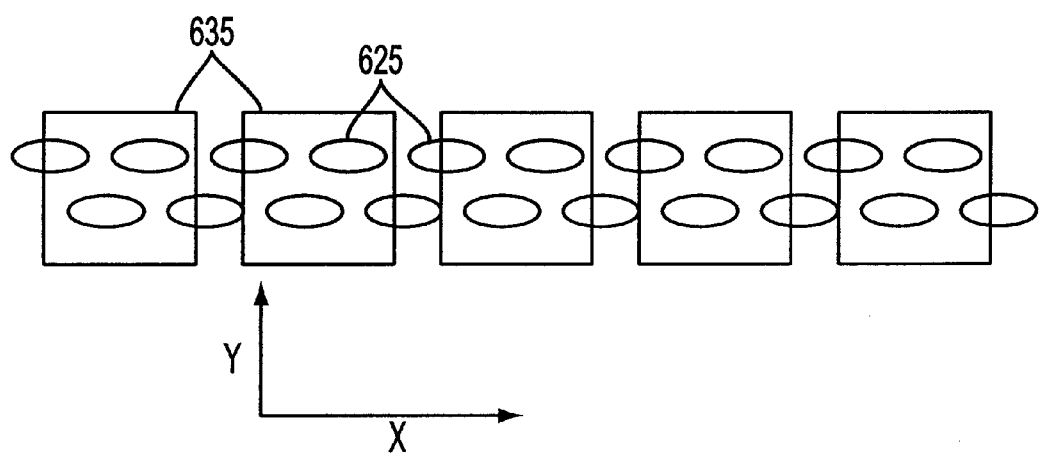
FIG. 37 shows heating elements in a thermal line head and pores in a film.
Figure 40:
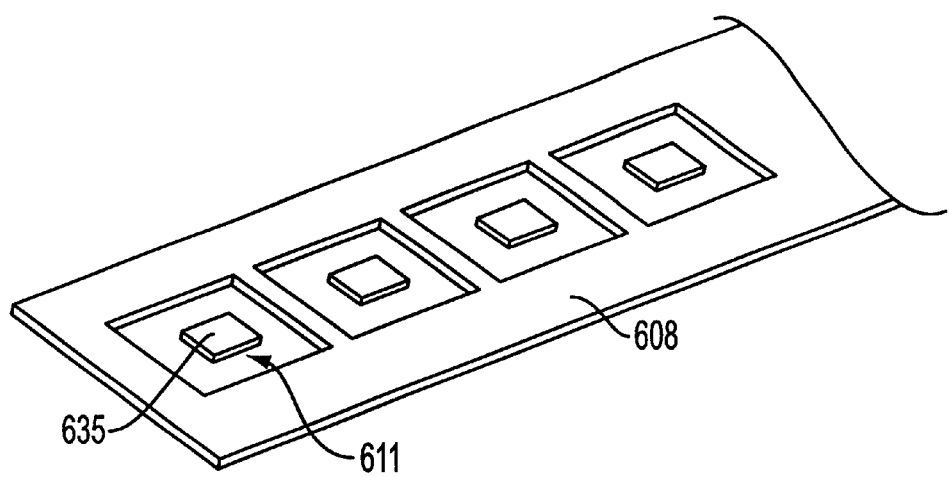
FIG. 40 shows another example of a thermal line head and an ink space.
Figure 41:
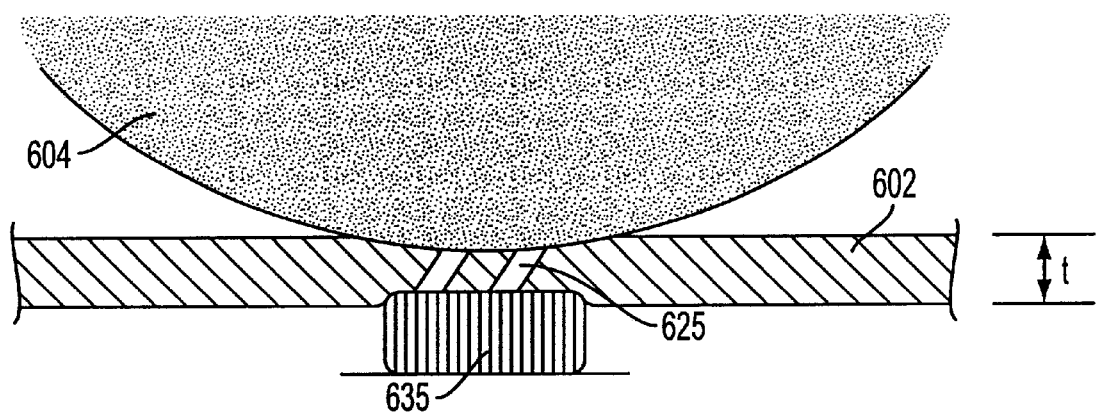
FIG. 41 is sectional view showing pores in the film.

In addition, although, in FIG. 36, all the heating elements 635 are disposed in a single ink space 601, the heating elements 635 may be accommodated in the separate ink spaces 611 as shown in FIG. 40. With this arrangement, the heat of the heating elements 635 or the pressure associated therewith can be efficiently converted to the pressure facilitating the permeation of the ink. Further, the pore 625 in the film 602 can be formed in such a manner that the pore 25 is inclined at a predetermined angle with respect to the direction of the thickness (t) of the film 602 as shown in FIG. 41. With this, since the pore 625 of the film 602 is sandwiched between the platen roller 604 and the thermal head 603, the pore 625 of the film 602 is contracted. Thus, the ink does not permeate through the pore 625 even if an unintended pressure is applied while the apparatus is not used.

The film 602 may be formed of a material such as the shape memory resin similar to in the fifth embodiment which polarity (hydrophilicity/hydrophobicity) changes according to the temperature. The surface tension of the ink with respect to the film 602 decreases as the temperature increases, due to the effect of the change in viscosity of the ink and in the polarity of the film. It is possible to utilize such a decrease in surface tension to allow the permeation of the ink through the film.

Figure 42:
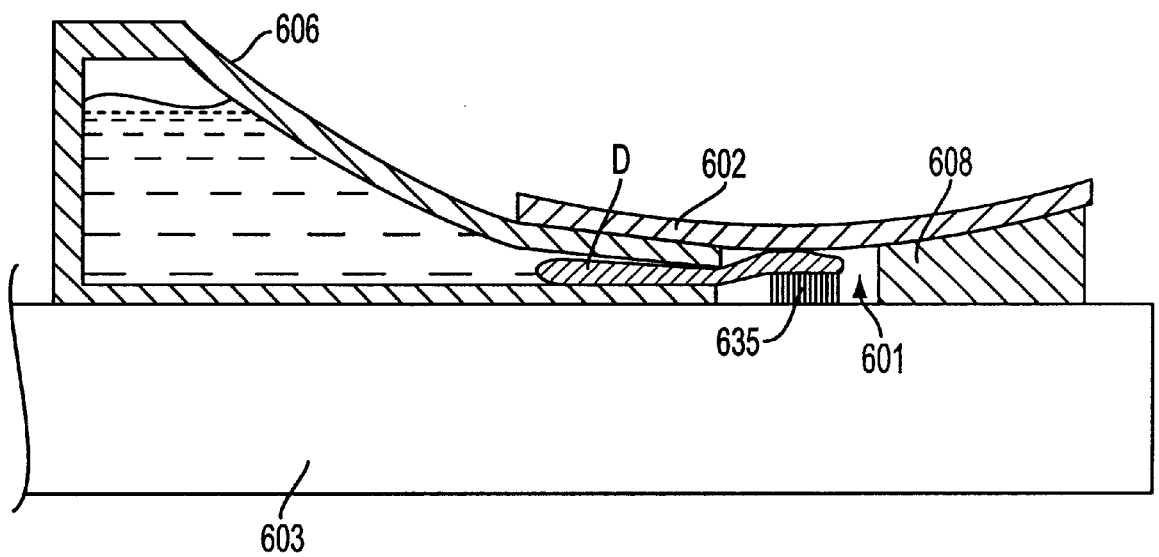
FIG. 42 is a side sectional view showing an example in which a porous is provided in the ink space.

In order to smoothly supply the ink from the ink reservoir 606 to the ink space 601, a porous body D may be disposed between the heating elements 635 on the thermal head 603 and the film 602, as shown in FIG. 42. This arrangement allows the ink contained in the porous body D to be supplied to each pore 625 in the film 602. Thus, the entry of the ink into the pore 625 is not prevented by bubbles remaining in the ink. In addition, instead of forming the pores 625 in the film 602 using a needle, the film 602 may include a porous body. With this, the pores of the porous body can be used as the pores 625.

A color printer employing the ink transfer printer according to the sixth embodiment is described.

Figure 43:
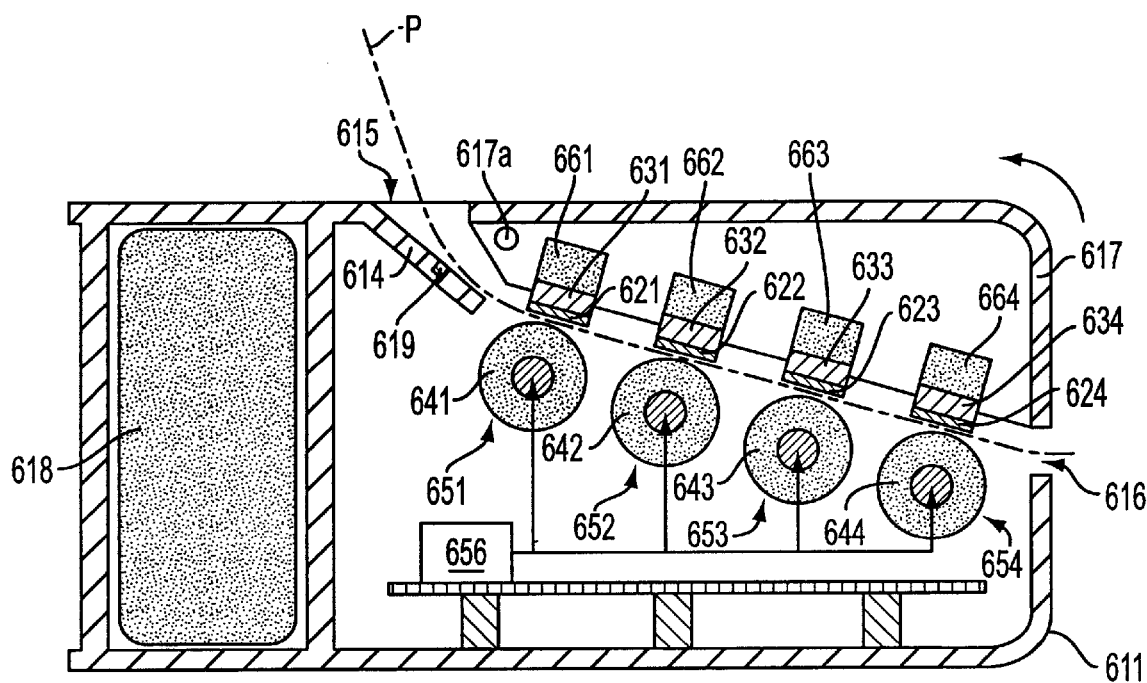
FIG. 43 is a side sectional view showing the basic arrangement of a color printer to which the ink transfer printer in FIG. 35 is applied.

FIG. 43 is a side sectional view of the color printer. The color printer includes four sets of ink transfer units disposed in parallel. Each ink transfer unit includes the thermal line head 603, the film 602, the platen roller 604 and the ink reservoir 606 (in FIG. 1) corresponding to Y (yellow), M (magenta), C (cyan) and BK (black), respectively.

The ink transfer units 651, 652, 653 and 654 corresponding to Y, M, C and BK include an ink reservoir 661, 662, 663 and 664, a thermal line head 631, 632, 633 and 634, a film 621, 622, 623 and 624, and a platen roller 641, 642, 643 and 644, respectively. The ink transfer units are disposed in this order with the unit 651 located at the highest position and the unit 654 at the lowest position.

The color printer includes a housing 611 is rectangular shaped extending in the direction perpendicular to the sheet of the drawing. An inlet opening 615 through which the recording sheet P is inserted is formed in the top of the housing 611 and an discharge opening 616 from which the recording sheet P is discharged is formed in the front surface (shown in the right of the figure) of the housing 11. The line extending between the inlet opening 615 and the discharge opening 616 forms a recording sheet feeding path (shown by a double-dashed line).

The site at the upper right corner of the housing 611 relative to the recording sheet feeding path forms a swingable cover 617 that can be opened and closed around a supporting shaft 617a provided near the inlet opening 615, in the direction shown by the arrow. The ink reservoirs 661, 662, 663 and 664, thermal line heads 631, 632, 633 and 634 and films 621, 622, 623 and 624 all attached to the swingable cover 617 are located above the recording sheet feeding path, whereas the platen rollers 641, 642, 643 and 644 attached to the housing 11 body are located below the recording sheet feeding path.

Figure 44:
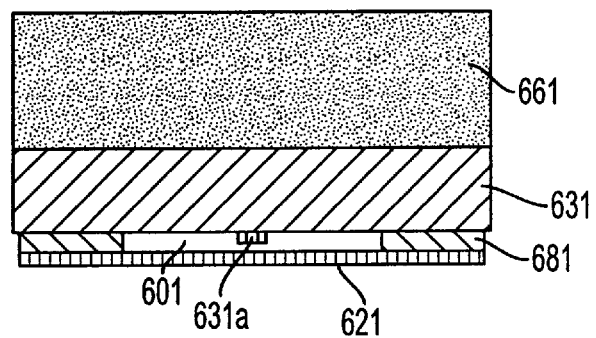
FIG. 44 is a side sectional view of an ink transfer unit without a platen roller.
Figure 45:
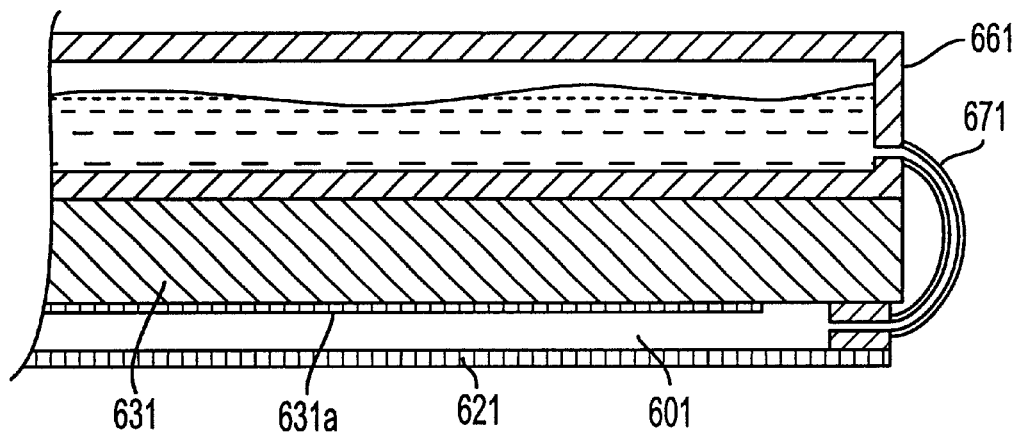
FIG. 45 is a sectional view of an ink transfer unit without a platen roller.

FIGS. 44 and 45 are an enlarged side sectional view and an enlarged sectional view, respectively, showing the ink reservoir 661, thermal line head 631 and film 621 for Y in FIG. 43. The thermal line head 631 is held with heating elements 631a directed downward. In addition, the film 621 is adhered to the bottom surface of the thermal line head 631 via the spacer 681 so that the gap between the bottom surface of the thermal line head 631 and the film 621 can form the ink space 601 for holding the ink for Y. The ink space 601 and the ink reservoir 1 are connected together by a pipe 471 installed at both longitudinal ends (in FIG. 45, only one end is shown) of the ink reservoir 661, as shown in FIG. 45. The ink transfer units 652, 653 and 654 corresponding to M, C and BK are configured in the same manner as the ink transfer unit 651 corresponding to Y.

As shown in FIG. 43, a slope 614 that guides the recording sheet P to the thermal line head 631, 632, 633 and 634 is provided below the inlet opening 615. The slope 614 has a reflecting photosensor 619 for detecting the insertion of the recording sheet P. In addition, the platen rollers 641, 642, 643 and 644 are rotated via a train of gears (not shown) using a drive motor 656 as a driving source. The train of gears is set so as to rotate at a peripheral speed similar to that of the platen rollers on the downstream side in order to apply an appropriate tension to the recording sheet P. Reference numeral 618 denotes a battery.

Figure 46:
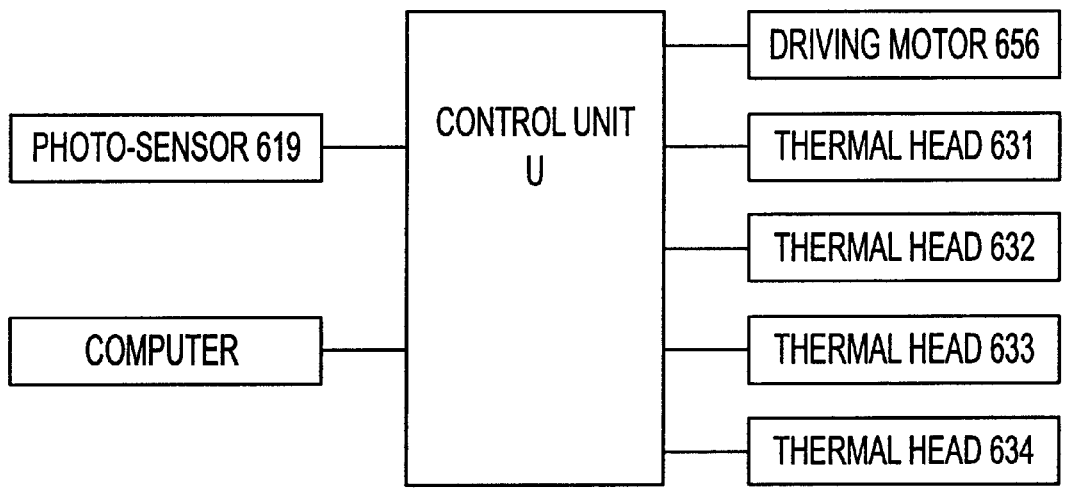
FIG. 46 is a block diagram showing a control system for the color printer in FIG. 42.

FIG. 46 is a block diagram showing a control system for the color printer.

Print information from a computer that is used as external equipment and signals from the photosensor 19 that detects the recording sheet P are input to a control unit 50, which then controls the driving of the drive motor 56 for rotationally driving the platen rollers 641, 642, 643 and 644 and the driving of the thermal line heads 631, 632, 633 and 634 corresponding to Y, M, C and BK.

When the recording sheet P is detected by the photosensor 19, the control unit U rotates the platen rollers 641, 642, 643 and 644 and controls the heating of the thermal line heads 631, 632, 633 and 634 based on Y, M, C and BK print information with predetermined timings.

As the platen rollers 641, 642, 643 and 644 are rotated, the recording sheet P is sequentially fed between the films 621, 622, 623 and 624 and the platen rollers 641, 642, 643 and 644. In this case, the ink selectively heated by the thermal line heads 631, 632, 633 and 634 is transmitted through the films 621, 622, 623 and 624, respectively and transferred to the recording sheet P. The recording sheet P that has undergone transfer is ejected from the discharge opening 616 to complete the formation of a color image.

As described above, full color ink images can be obtained using a simple constitution by disposing the ink transfer units 651 652, 653 and 654 for the respective colors each comprising the thermal line head 631, 632, 633 and 634, the film 621, 622, 623 and 624 and the platen roller 641, 642, 643 and 644 and the ink reservoir 661, 662, 663 and 664, respectively, in parallel along the feeding path for the recording sheet P. The thermal line head may include four arrays of heating elements installed on a common base.

A variation of the sixth embodiment is described.

Figure 47:
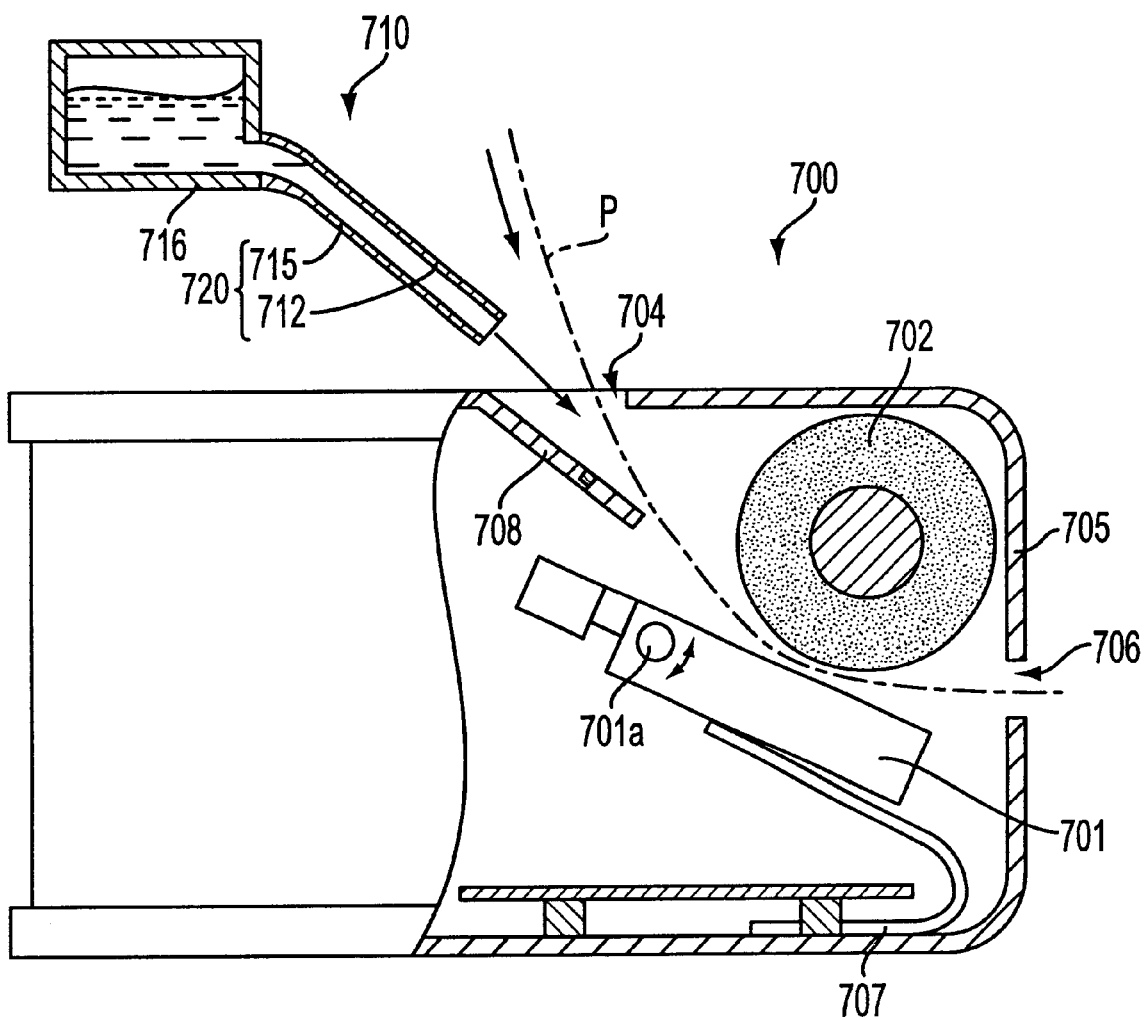
FIG. 47 is a side sectional view showing an attachment according to a variation of the sixth embodiment and a thermal line printer.

In this variation of the sixth embodiment, the ink transfer printing is performed by mounting an attachment on a conventional thermal line printer disclosed in Japanese Patent Application Laid-Open No. 7-117307. FIG. 47 shows an attachment 710 and a conventional thermal line printer 700. The thermal line printer 700 includes a housing 705 is rectangular-shaped that is longer in the direction perpendicular to the sheet of the drawing wherein recording sheet is fed along a path (shown by a dashed line) extending between an inlet opening 704 and an discharge opening 706 that are formed in the top and right side of the housing 705, respectively. A platen roller 702 and a thermal line head 701 are disposed above and below the recording sheet feeding path, respectively, so as to be faced to each other. The thermal line head 701 is pivoted around a pivoting shaft 701a in the direction toward and away from the platen roller 702 and is urged against the platen roller 702 by a plate spring 707 provided in the housing 705.

The attachment 710 includes an ink reservoir 716 shaped like a rectangular parallelepiped that is longer in the direction orthogonal to the sheet of the drawing; a stainless supporting plate 715 extending from the bottom of the ink reservoir 716; and a film 712 faced to the supporting plate 715. The supporting plate 715 is a stainless plate with a thickness of 0.01 to 0.02 mm which is longer in the direction orthogonal to the sheet of the drawing and which can be arbitrarily flexed. The film 712 is configured in the same manner as the film 702 in the sixth embodiment. A ink space 701 for holding ink is formed between the supporting plate 715 and the film 712 and connected to the ink reservoir 716.

An extending portion 720 (the supporting plate 715 and the film 712) of the attachment 710 is inserted through an inlet opening 704 in the thermal line printer 700 along a slope 708 between the thermal line head 701 and the platen roller 702. When the recording sheet P is further inserted through the inlet opening 704, it is inserted between the platen roller 702 and the extending portion 720. Thus, the platen roller 702, the recording sheet P, the film 712, the ink space 701, the supporting plate 715 and the thermal line head 701 are vertically overlapped in this order with the platen roller located at the top. In this condition, when the thermal line head 701 is heated, the heat from the attachment 710 is transmitted to the ink in the ink space 701 through the supporting plate 715. The heated ink permeate through the pores in the film 712 and transferred to the recording sheet P, as in the sixth embodiment.

Since the attachment 710 is fixed to the top surface of the thermal line printer 700 with a locking means (not shown), only the recording sheet P is fed when the platen roller 702 is rotated. Thus, an ink image can be formed on the recording sheet P by inserting the extending portion 720 of the attachment 710 and the recording sheet P between the thermal line head 701 and the platen roller 702 and then driving the thermal line printer 700 (that is, controlling the heating of the thermal line head 701 and the rotation of the platen roller 702).

In this manner, this variation enables the ink to be transferred simply by installing the attachment 710 in the inlet opening 704 in the conventional thermal line printer 700. That is, plain paper can be used in the existing thermal line printer 700 that would otherwise allow only heat sensitive paper to be used.

A second variation of the sixth embodiment is described. According to the sixth embodiment, fed recording sheet slidably comes in contact with the film. Thus, the ink transferred from the film to the recording sheet may trail in the direction in which the recording sheet is fed, causing dots formed on the recording sheet to be deformed. Thus, to prevent the deformation of dots caused by the trailing of the ink, in this variation, the film is moved together with the recording sheet.

Figure 48:
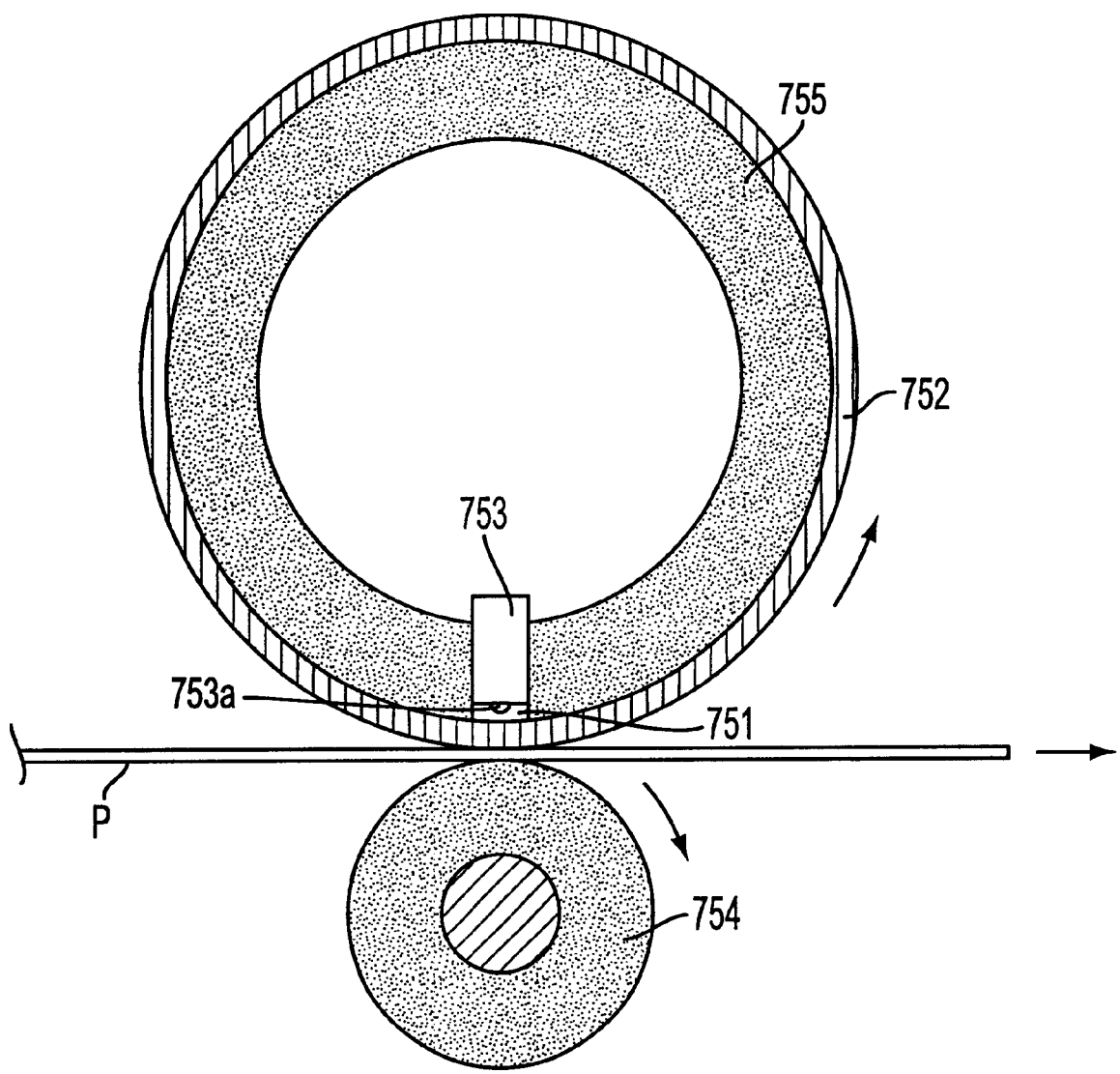
FIG. 48 is a side sectional view showing a roller-type ink transfer printer according to a second variation of the sixth embodiment.

In a printer according to the second variation, a film 752 is circumferentially slidably supported on the outer circumference of a fixed roller 755, as shown in FIG. 48. The film 752 is similar to the film 2 in the sixth embodiment. In addition, the roller 755 is a hard porous member (a porous ceramic or the like) and is impregnated with ink.

A thermal line head 753 is incorporated in the roller 755 inside the film 752 and disposed in such a manner that heating elements 753a on the thermal line head 753 are located near the outer circumference of the roller 755. A small cavity is formed at the position at which the roller 755 abuts the tip of the heating elements 753a and this cavity forms an ink space 751 for holding ink. A platen roller 754 that sandwiches the recording sheet P between said platen roller 754 and the film 752 is disposed at the position faced to the heating elements 753a via the film 752.

In this arrangement, when the recording sheet P is fed as the platen roller 754 is rotated, the film 752 is moved with the recording sheet P and slides along the outer circumference of the roller 755. Since pores are formed all over the surface of the film 752, any pores are always located below the heating elements 753a despite the movement of the film 752. Thus, the ink heated by the heating elements 753a is transmitted through the pores located below and transmitted to the recording sheet P. Consequently, an ink image can be formed on the recording sheet P by controlling the heating of the thermal line head 753 in synchronism with the rotation of the platen roller 754.

According to this second variation, since the film 752 moves with the recording sheet P (slides on the outer circumferential surface of the roller 755), the ink transferred from the film 752 to the recording sheet P does not trail. Thus, this embodiment can prevent the deformation of dots caused by the trailing of the ink.

Figure 49:
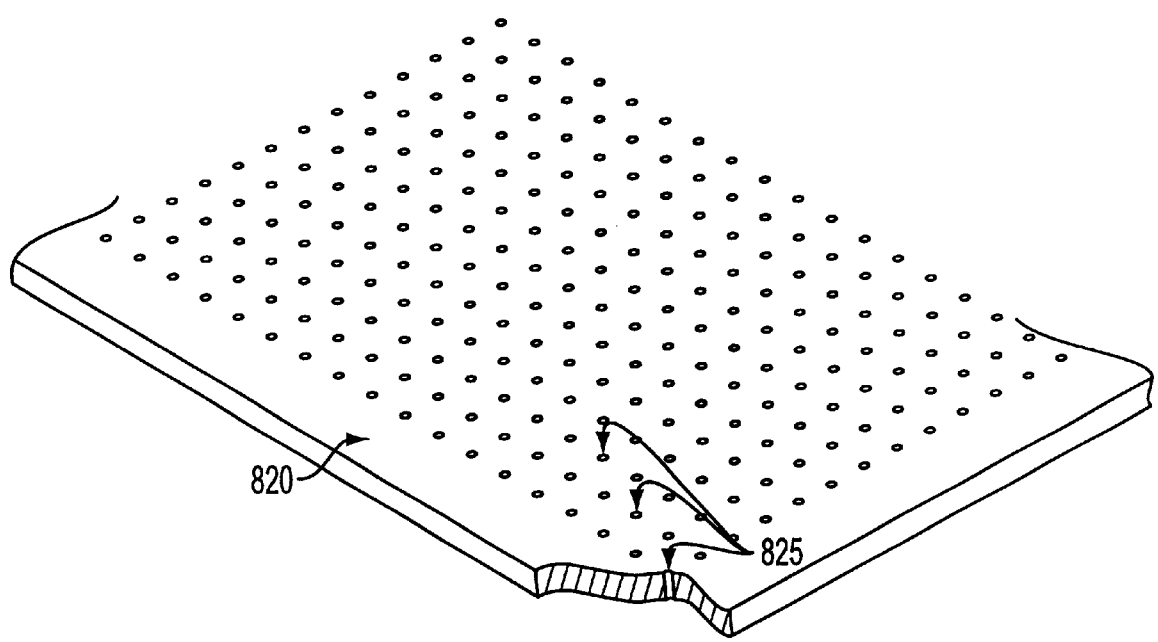
FIG. 49 is a side sectional view showing a material of a stencil printing plate according to a seventh embodiment.

A seventh embodiment of the present invention is described. In the seventh embodiment, a stencil printing plate with through-holes formed therein according to a desired pattern is produced. FIG. 49 is a side sectional view showing a plate material 820 that is a matrix of a stencil printing plate. A large number of through-holes 825 penetrating the plate material 820 are formed throughout the surface thereof. The plate material 820 is made of a shape memory resin similar to the fifth embodiment. The size of the through-hole 825 is small enough to prevent the permeation of the ink (used for printing).

Figure 50A:
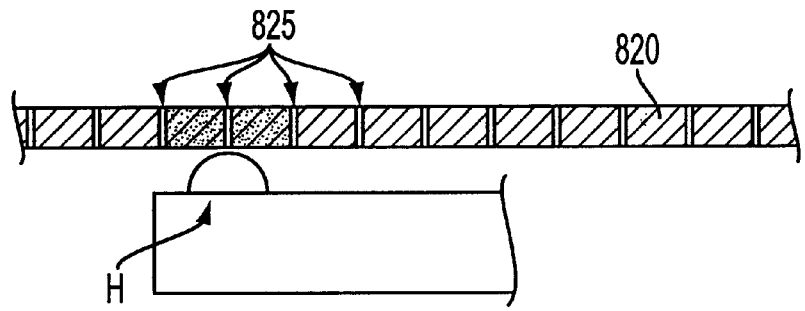
FIGS. 50A, 50B and 50C are a side sectional view showing a method for manufacturing the stencil printing plate according to the seventh embodiment.
Figure 50B:
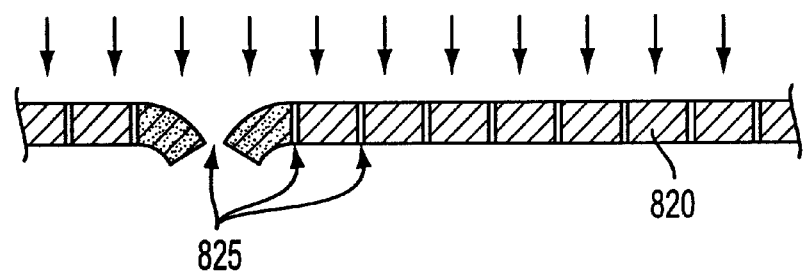
Figure 50C:
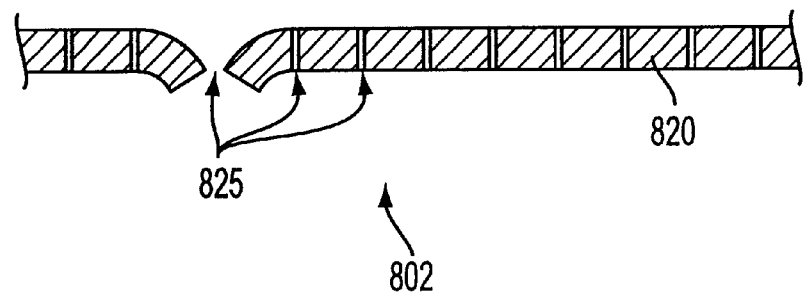

FIGS. 50A to 50C show a method for manufacturing a stencil printing plate 802 according to the first embodiment. As shown in FIG. 50A, the plate material 820 is heated by a thermal head H according to a desired print pattern in order to change the heated part to a rubber state. Thus, the heated part is changed to the rubber state (in which state the plate material can be easily deformed), whereas the remaining part remains in a glassy state. A scanning laser may be used instead of the thermal head H.

When a fluid pressure (a wind, an oil, or a water pressure) is applied to one surface of the plate material 820 as shown in FIG. 50B, the part of the plate material 820 which has been heated and changed to the rubber state is deformed and the through-holes 825 in that part are widened, cooled by the fluid (air, oil, or water) and changed to the glassy state. The through-hole 825 is widened up to a size that allows the ink to permeate. That is, in the plate material 820, the through-holes 825 in the part selectively heated in FIG. 50A are widened up to a size that allows the ink to permeate, due to the application of the fluid pressure and cooling in FIG. 50B. In the plate material 820, the remaining part that has not been heated in FIG. 50A remains in the glassy state, so that the through-holes 825 in this part are not widened when a fluid pressure is applied. As a result, the through-holes in this part prevent the permeation of the ink.

Thus, the stencil printing plate 802 in which the through-holes that allow the permeation of the ink are formed according to a print pattern (as shown in FIG. 50C) is formed. The stencil printing plate 802 formed in this manner can be mounted in a stamp or a printing apparatus for use, but this is described below.

Figure 51A:
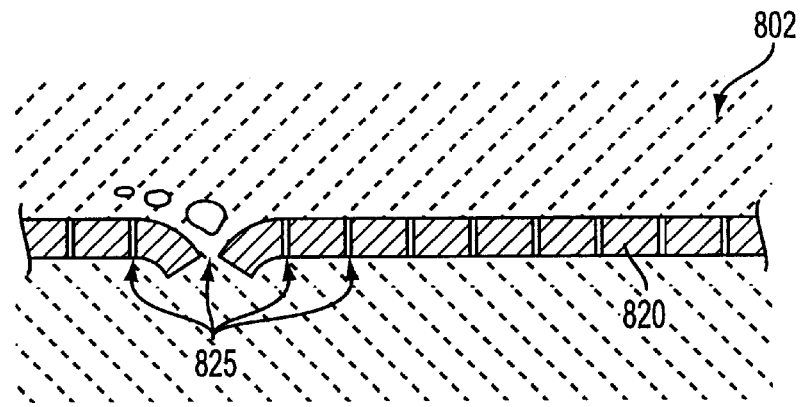
FIGS. 51A, 51B and 51C show a method for recycling the stencil printing plate.
Figure 51B:
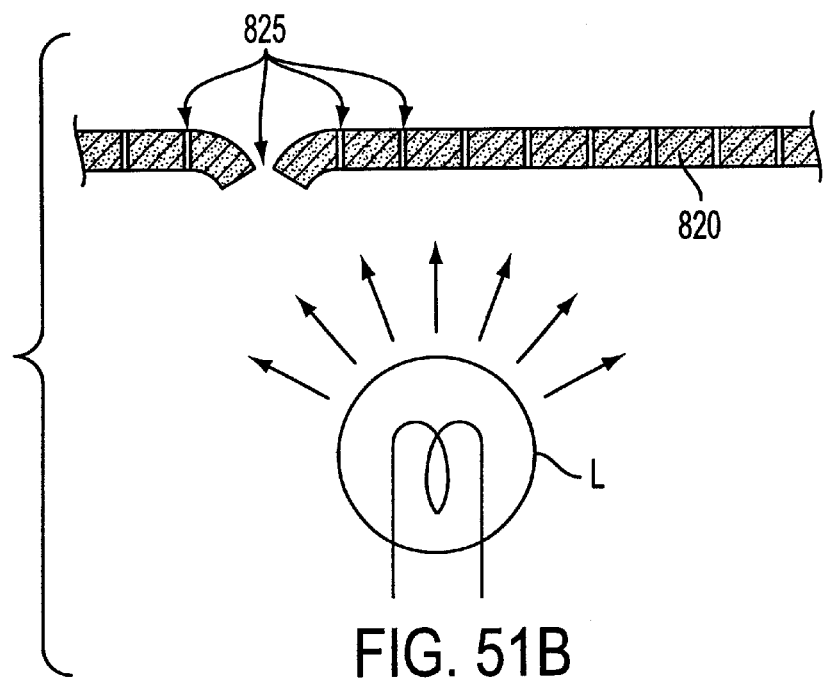
Figure 51C:
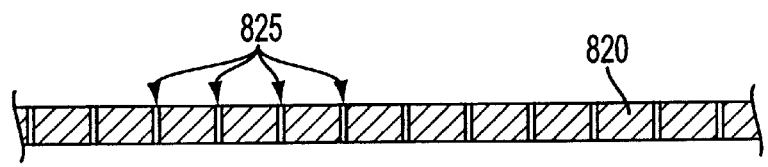

FIGS. 51A to 51C show a method for recycling a used stencil printing plate 802. As shown in FIGS. 51A to 51B, when the ink on the surface of the stencil printing plate 802 and in the through-holes is washed and removed. Then, the overall surface of the plate material 820 is heated by a lamp L (or a heater), so that the overall plate material 820 shifts to the rubber state. Then, by not applying a fluid pressure, the through-holes of a size that allows the permeation of the ink returns to the original size, due to the shape recovery characteristic of the shape memory resin (FIG. 51C). Thus, the stencil printing plate 802 returns to the plate material 820, that is to the states before the pattern is formed. Then, by repeating the process for manufacturing the stencil printing plate 802 (FIGS. 50A to 50C), the stencil printing plate 802 with a desired pattern formed thereon can be made.

Figure 52:
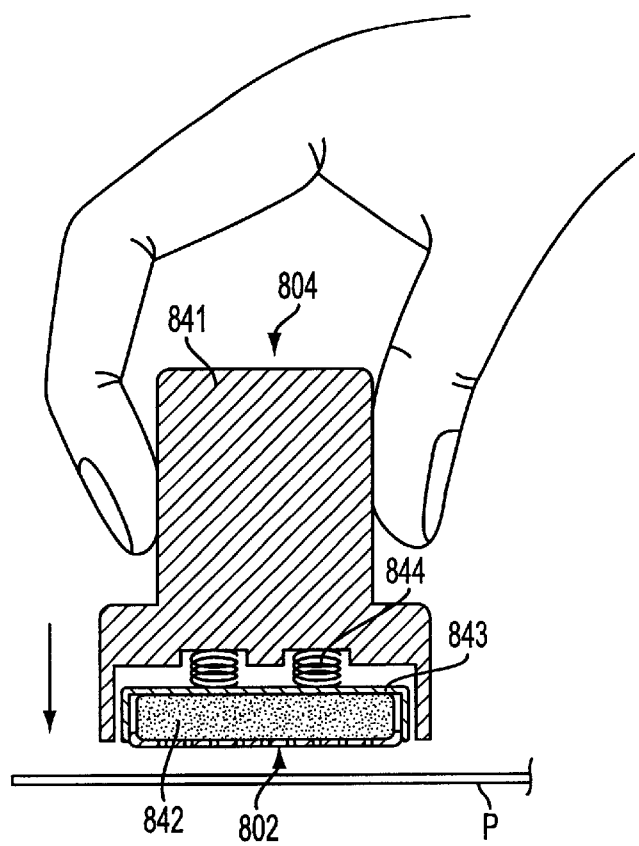
FIG. 52 is a side sectional view showing a stamp that uses a stencil printing plate.

FIG. 52 shows one example of a stamp that uses the stencil printing plate 802. A stamp 804 includes a stamp body 841 which is approximately rectangular-shaped, with a sponge 842 attached to the bottom end thereof. The ink is impregnated in the sponge 842. The stencil printing plate 802 is adhered to the bottom surface of the sponge 842. The sponge 842 is held by a case 843 with an open bottom surface. A spring 844 is provided between the case 843 and the stamp body 841 to press the stencil printing plate 802 and the sponge 842 against the recording sheet P with a predetermined pressure.

In this arrangement, when a user holds the stamp body 841 and presses the stencil printing plate 802 against the recording sheet P, the ink contained in the sponge 842 permeates through the through-holes 825 in the stencil printing plate 802 and transferred to the recording sheet P.

Thus, the desired print pattern is transferred to the recording sheet P as an ink image.

Figure 53:
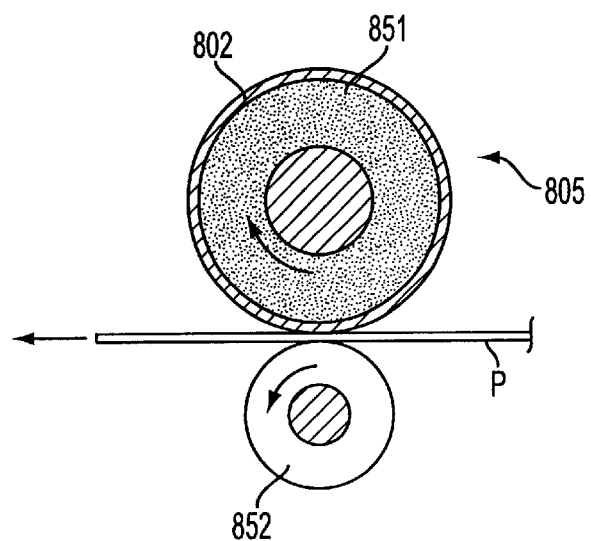
FIG. 53 is a schematic drawing showing a stencil printing plate printing apparatus.

FIG. 53 shows an example of a printing apparatus 805 that uses the stencil printing plate 802. The printing apparatus 805 includes a holding roller 851 with the stencil printing plate 802 wrapped around its outer circumference, and a platen roller 852 faced in parallel to the holding roller 851 so that the recording sheet can be pressed between the stencil printing plate 802 and the platen roller 852. The holding roller 851 and the platen roller 852 are rotated in synchronization in the direction shown by the respective arrows in the figure and the recording sheet P is accordingly fed right to left in the figure.

The holding roller 851 is formed of a relatively elastic porous body such as a sponge and contains ink. The holding roller 851 is pressed against the platen roller 852 via the stencil printing plate 802 and the recording sheet P, which causes a permeation pressure. Thus, the ink contained in the roller 851 is forced to permeate through the stencil printing plate 802. Due to this arrangement, when the holding roller 851 and the platen roller 852 are rotated, the ink permeate through the through-holes in the stencil printing plate 802 and transferred to the recording sheet P. Thus, the desired print pattern is transferred to the recording sheet P as an ink image.

Although the through-holes 825 in the plate material 820 are formed by punching in this embodiment, the plate material 820 may be formed of a porous material. In this case, the pores of the porous material may be used as the through-holes 825. In the process for recycling the used stencil printing plate 802 (FIG. 51), the thermal head H or scanning laser used for the pattern formation process in FIG. 50 may be used instead of the lamp L used to heat the entire surface of the stencil printing plate 802.

A variation of the seventh embodiment is described.

Figure 54A:
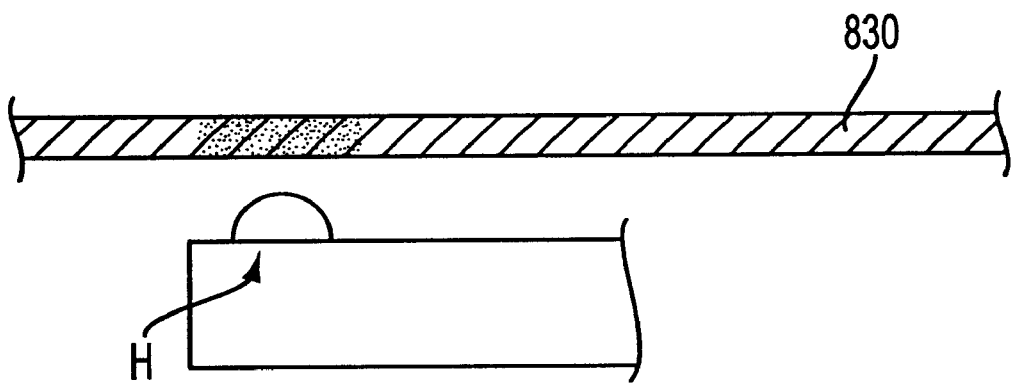
FIGS. 54A, 54B and 54C show a method for manufacturing a relief printing plate or an intaglio printing plate according to a variation of the seventh embodiment.
Figure 54B:
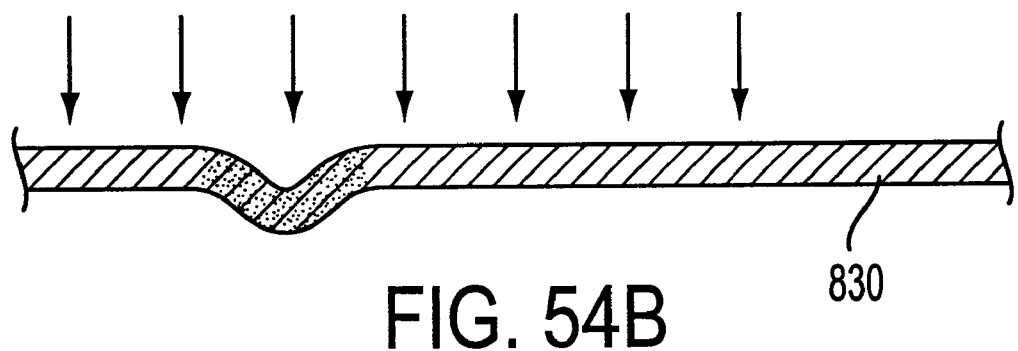
Figure 54C:
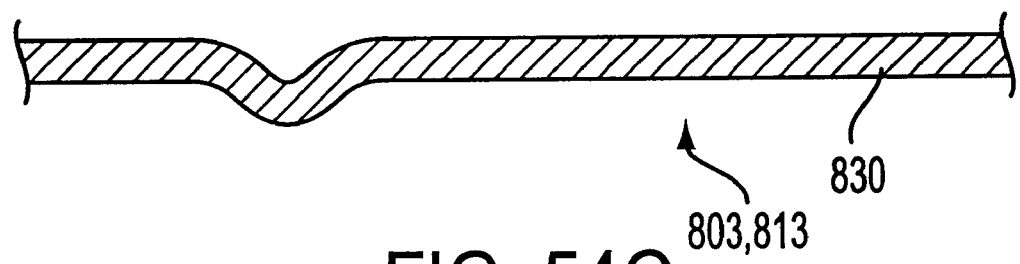

In this variation of the seventh embodiment, an intaglio printing plate (or a relief printing plate) with recessed and protruding parts is formed instead of the stencil printing plate. FIGS. 54A to 54C show a method for manufacturing a printing plate (an intaglio printing plate or a relief printing plate). A plate material 830 in this variation includes a shape memory resin similar to the plate material 820 in the seventh embodiment, but has no through-holes formed therein as in the seventh embodiment.

As shown in FIG. 54A, the plate material 830 is heated according to a desired print pattern so as to be locally changed to the rubber state. When a fluid pressure (a wind, an oil, or a water pressure) is applied to one surface of the plate material 830 as shown in FIG. 54B, the part of the plate material 830 which has been heated and changed to the rubber state is deformed and becomes a concave. When cooled, this part is changed to the glassy state with its shape unchanged. The part (of the plate material 830) that has not been heated in FIG. 54A do not change even when the fluid pressure is applied, because the part remains in the glassy state. Thus, by using the top surface of the plate material 830 as a printing surface, an intaglio printing plate 803 with recessed portions according to a print pattern can be obtained. By using the bottom surface of the plate material 830 as a printing surface, a relief printing plate 813 can be obtained.

As in the seventh embodiment, a used intaglio printing plate 803 and relief printing plate 813 can be recycled. That is, when the ink on the intaglio printing plate 803 is washed and removed and the overall surface of the intaglio printing plate 803 is heated by the heater H (or a lamp), the overall intaglio printing plate 803 changes to the rubber state. Then, by not applying the fluid pressure, the recessed and protruding parts of the intaglio printing plate 803 return to the original flat surface. Thus, the intaglio printing plate 803 returns to the plate material 830, that is, the state before the pattern is formed. Then, by repeating the process in FIGS. 54A to 54C, the intaglio printing plate 803 with a desired print pattern formed thereon can be recycled.

Figure 55:
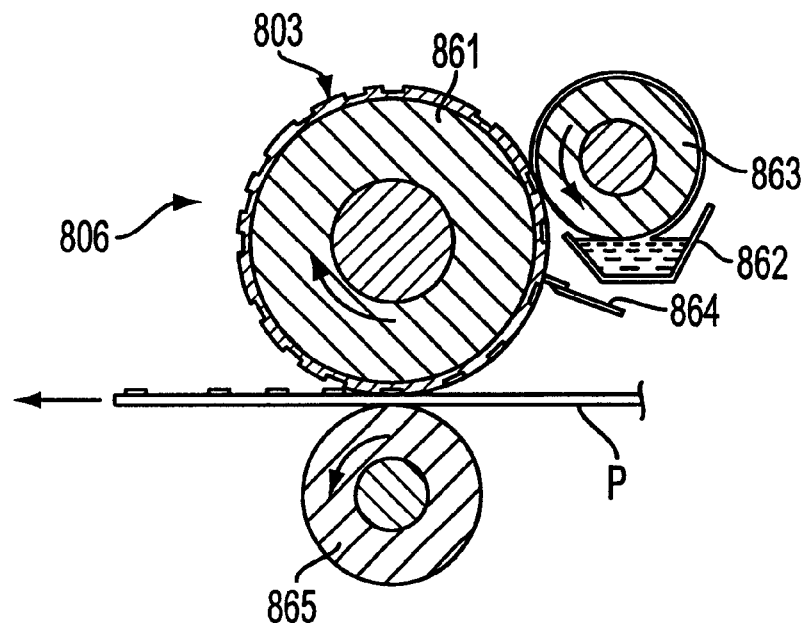
FIG. 55 is a schematic drawing showing one example of an intaglio printing apparatus.

FIG. 55 shows an intaglio printing apparatus that uses an intaglio printing plate. An intaglio printing apparatus 806 includes a drum roller 861 holding the intaglio printing plate 803 around its outer circumference. An ink reservoir 862 in which ink is stored, an ink supply roller 863 that supplies ink from the ink reservoir 862 to the intaglio printing plate, a blade 864 that scrapes off extra ink transferred to the intaglio printing plate 803 and a platen roller 865 that presses the recording sheet P against the intaglio printing plate 803 are disposed along the outer circumference of the drum roller 861. By the rotation of the platen roller 865 and the drum roller 861, the recording sheet is fed between the rollers from right to left in the figure.

The ink supply roller 863 is rotated in synchronization with the drum roller 861 to transfer the ink from the ink reservoir 862 to the recessed portions and surface of the intaglio printing plate 803. The extra ink supplied to the part of the intaglio printing plate 803 other than the recessed portions is scraped off by the blade 864, with the ink held in the recessed portions remaining therein. The ink held in the recessed portion of the intaglio printing plate 803 is transferred to the recording sheet P between the drum roller 861 and the platen roller 865. Thus, an image of the desired print pattern is formed on the recording sheet P.

Figure 56:
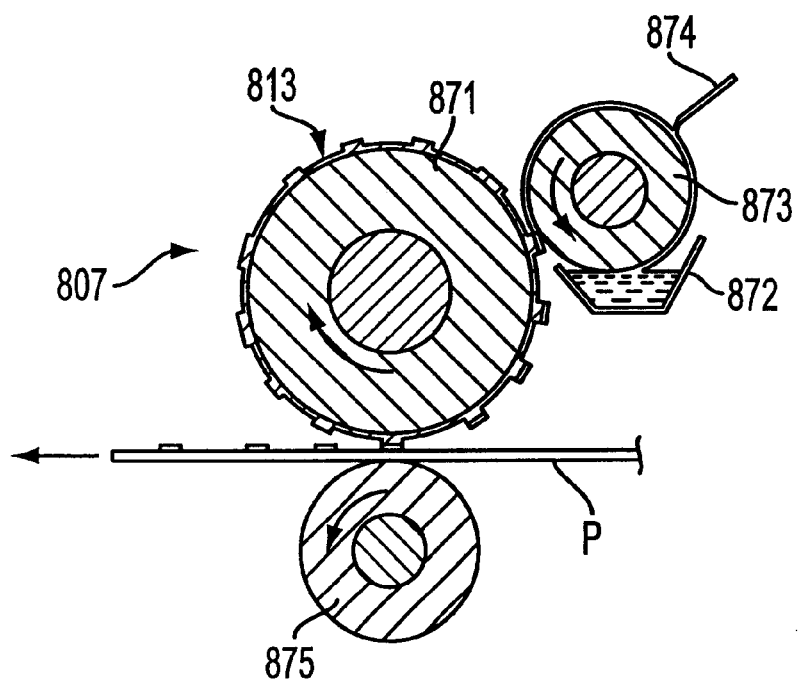
FIG. 56 is a schematic drawing showing one example of a relief printing apparatus.

FIG. 56 shows a relief printing apparatus that uses a relief printing plate 813. A relief printing apparatus 807 includes a drum roller 871 holding the relief printing plate 813 around its outer circumference. An ink reservoir 872 in which ink is stored, an ink supply roller 873 that supplies ink from the ink reservoir 872 to the relief printing plate 813 and a platen roller 875 that presses the recording sheet P against the relief printing plate 813 are disposed along the outer circumference of the drum roller 871.

The ink supply roller 873 is rotated in synchronism with the drum roller 871 to transfer the ink from the ink reservoir 872 to the relief printing plate 813. A blade 874 is provided along the outer circumference of the ink supply roller 873 so that the rotation of the ink supply roller 873 can control the film thickness of the ink drawn from the ink reservoir 872. The interval between the relief printing plate 813 and the ink supply roller 873 is set so that the ink of the above film thickness on the ink supply roller 873 is transferred only to the protruding parts of the relief printing plate 813. With this arrangement, the ink is transferred from the ink supply roller 873 to the protruding parts of the relief printing plate 813 and further to the recording sheet P between the drum roller 871 and the platen roller 875. Thus, an image of the desired print pattern is formed on the recording sheet P.

Although the structure and operation of a scanner is described herein with respect to the preferred embodiments, many modifications and changes can be made without departing from the spirit and scope of the invention.

The present disclosure relates to subject matter contained in Japanese Patent Application Nos. HEI08-174309 filed on Jun. 13, 1996, HEI08-324673 filed on Nov. 20, 1996, HEI08-324674 filed on Nov. 20, 1996, HEI08-324675 filed on Nov. 20, 1996, HEI08-358261 filed on Dec. 27, 1996, HEI08-358262 filed on Dec. 27, 1996, HEI09-96548 filed on Mar. 31, 1997 and HEI09-106750 filed on Apr. 22, 1997, which are expressly incorporated herein by reference in its entirety.

What is claimed is:

1. A printing plate manufacturing method for manufacturing a printing plate having through-holes allowing the permeation of ink disposed according to a desired print pattern,
   said printing plate using a plate material formed of a shape memory resin having a plurality of through-holes of a size such that the permeation of said ink is prevented, said method comprising:
   selectively heating a part of said plate material according to a desired print pattern to change the heated part to a rubber-state part; and
   cooling the material while applying a fluid pressure to one of the surfaces of the plate material to widen said through-holes in said rubber-state part to a size allowing the permeation of said ink.

2. A printing plate manufacturing method according to claim 1, wherein said through-holes in said plate material are formed by punching.

3. A printing plate manufacturing method according to claims 1, wherein said plate material is formed of a porous resin and wherein said through-holes in said plate material comprise pores in said porous resin.

4. A printing plate manufacturing method according to claim 1, wherein said heating is provided by one of a thermal head and a laser irradiation device.

5. A printing plate manufactured method according to claim 1, wherein said fluid pressure comprises one of a air pressure, oil pressure, and water pressure.

6. A printing plate manufacturing method according to claim 1, further comprising:
   heating the printing plate used for printing said desired print pattern, thereby returning the used printing plate to the condition in which said plate material was prior to said formation of the print pattern.

7. A printing plate manufactured by a printing plate manufacturing method according to claim 1.

8. A printing apparatus using a printing plate according to claim 7, comprising:
   a holding roller which holds said printing plate on its outer circumference;
   an ink supply disposed in the holding roller to supply ink to said printing plate from the interior; and
   a transfer member which contacts a recording sheet to said printing plate to transfer the ink which has permeated through said printing plate to the recording sheet.

9. A printing apparatus according to claim 8, wherein said holding roller comprises a porous body impregnated with ink.

10. A printing apparatus according to claim 8, wherein said transfer member comprises a platen roller facing said holding roller and parallel to said holding roller.

11. A printing plate manufacturing method for manufacturing a printing plate having recessed portions and projecting portions according to a desired print pattern, said method comprising of:
   providing a plate material made of a shape memory resin;
   selectively heating a part of the plate material according to a desired print pattern to change the heated part to a rubber-state part; and
   cooling the material while applying a fluid pressure to one of the surfaces of the plate material to deform said rubber-state part.

12. A printing plate manufacturing method according to claim 11 further comprising:

when said one of the surfaces is employed as a printing plate surface, using said printing plate as an intaglio printing plate; and when the surface opposite said one of the surfaces is employed as a printing plate surface, using said printing plate as a relief printing plate.

13. A printing plate manufacturing method according to claim 11, wherein said heating is provided by one of a thermal head and a laser irradiation device.

14. A printing plate manufactured using a printing plate according to claim 11, wherein said fluid pressure comprises one of air pressure, oil pressure, and water pressure.

15. A printing plate manufacturing method according to claim 11, wherein a plurality of through-holes in said plate material correspond to a single printing dot.

16. A printing plate manufacturing method according to claim 11, further comprising:

heating the printing plate used for printing said desired print pattern, thereby returning the used printing plate to the condition in which said plate material was prior to said formation of the print pattern.

17. A printing plate manufactured by said printing plate manufacturing method according to claim 11.

18. A printing apparatus using a printing plate according to claim 17, said apparatus comprising:

a drum roller around which said printing plate is wrapped;

an ink supply for supplying ink to a surface of said printing plate; and a transfer member which contacts a recording sheet to said printing plate to transfer the ink which has permeated through said printing plate to the recording sheet.

19. A printing apparatus according to claim 18, wherein said transfer member comprises a platen roller facing said drum roller and parallel said drum roller.

* * * * *